United States Patent
Weiss et al.

(10) Patent No.: US 11,870,890 B2
(45) Date of Patent: Jan. 9, 2024

(54) DYNAMIC CHANGE IN ADMINISTRATIVE RIGHTS FOR CONTROLLING SECRET DATA STORED FOR USER GROUPS

(71) Applicant: MICROSOFT TECHNOLOGY LICENSING, LLC, Redmond, WA (US)

(72) Inventors: Alexander Weiss, Seattle, WA (US); Eric Scott Albright, Sammamish, WA (US); Dustyn J. Tubbs, Redmond, WA (US); Paresh Lukka, Redmond, WA (US); Andrew V. Spiziri, Seattle, WA (US); Lawrence Fubini Waldman, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/863,384

(22) Filed: Jul. 12, 2022

(65) Prior Publication Data
US 2023/0037051 A1    Feb. 2, 2023

Related U.S. Application Data

(63) Continuation of application No. 16/702,307, filed on Dec. 3, 2019, now Pat. No. 11,424,914.

(51) Int. Cl.
H04L 9/08    (2006.01)

(52) U.S. Cl.
CPC .......... *H04L 9/0825* (2013.01); *H04L 9/0833* (2013.01); *H04L 9/0866* (2013.01); *H04L 9/0894* (2013.01)

(58) Field of Classification Search
CPC ... H04L 9/0825; H04L 9/0833; H04L 9/0866; H04L 9/0894; H04L 9/321; H04L 9/14; H04L 9/0822
See application file for complete search history.

(56) References Cited

U.S. PATENT DOCUMENTS

2003/0079120 A1 * 4/2003 Hearn .................. G06F 21/10
                                                   713/150
2013/0294284 A1 * 11/2013 Popa .................. H04W 12/06
                                                   370/254

(Continued)

FOREIGN PATENT DOCUMENTS

WO    WO-0165545 A2 *  9/2001  ......... G06F 21/6209

OTHER PUBLICATIONS

Andrea et al( "A Logical Key Hierarchy Based Approach to Preserve Content Privacy in Decentralized Online Social Network;". IEEE Transactions on Dependable and Secure Computing,, No. 1, Jul. 20, 2017 (Jul. 20, 2017). po. 2-21. XP011755142, ISSN: 1545-5971 (Year: 2020).*

*Primary Examiner* — Mohammed Waliullah
(74) *Attorney, Agent, or Firm* — Scott Y. Shigeta; Newport IP, LLC

(57) ABSTRACT

A system can control access to encrypted data shared by a group of users by the use of a vault key that is associated with a group of users. The encrypted data can include encrypted secret data generated from the secret data using a secret key, an encrypted secret key can be generated from the secret key by the use of a vault key, and an encrypted vault key generated from the vault key by the use of a public key associated with a user of the group of users. The system can allow users to store and access the encrypted data only if the user is a current member of the group. The system can verify the user's membership status from a group manager, such as a system managing a channel or chat session. Users added to the group are also granted permission to grant access to new users.

20 Claims, 46 Drawing Sheets

(56) References Cited

U.S. PATENT DOCUMENTS

2016/0119292 A1* 4/2016 Kaseda ............... H04L 9/14
                                                    713/165
2019/0043010 A1* 2/2019 Smith ................ H04L 9/0833
2019/0182042 A1* 6/2019 Ebrahimi ............ H04L 9/3231

* cited by examiner

Obtain User Private Key at Login

STORAGE OF ENCRYPTED DATA WITH NEW KEY(S)

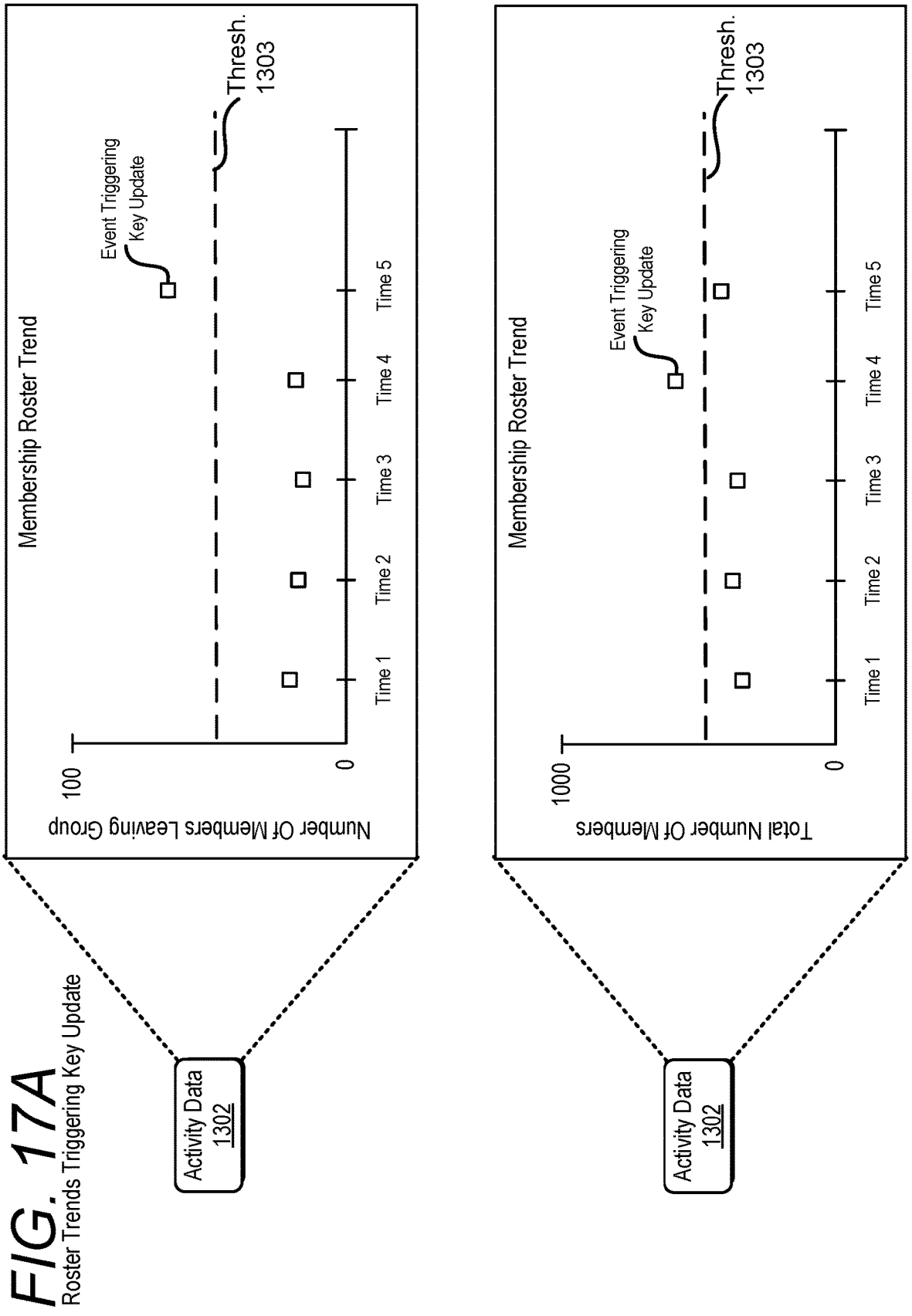

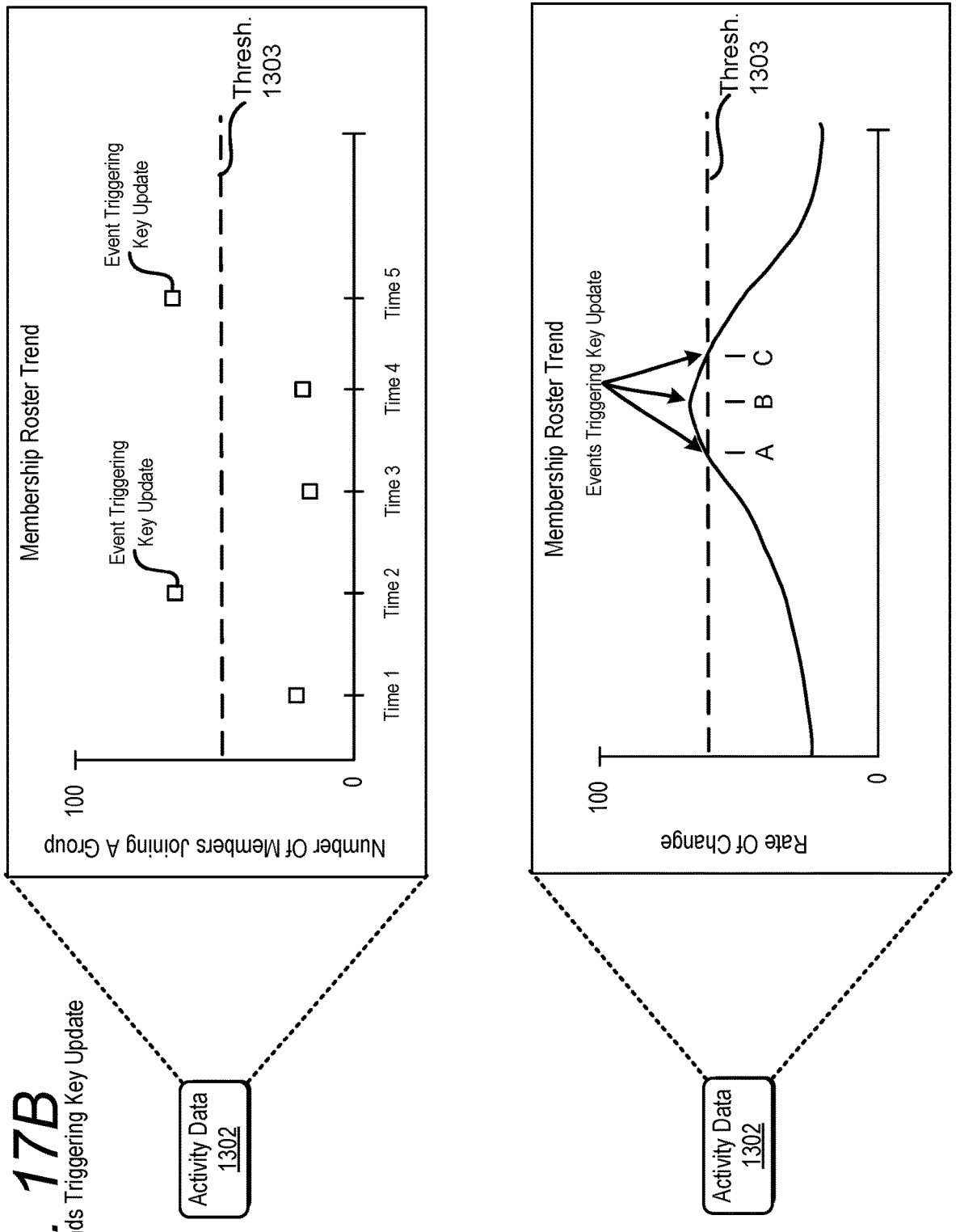

Examples: Activity Data For Triggering A Key Update

DYNAMIC CHANGE IN ADMINISTRATIVE RIGHTS FOR CONTROLLING SECRET DATA STORED FOR USER GROUPS

PRIORITY APPLICATION

The present application is a continuation of U.S. patent application Ser. No. 16/702,307 filed on Dec. 3, 2019, entitled "ENHANCED SECURITY OF SECRET DATA FOR DYNAMIC USER GROUPS", the content of which application is hereby expressly incorporated herein by reference in its entirety.

BACKGROUND

The resources required to manage a system storing secret data can present challenges for companies of all sizes. If not administered correctly, human error or improperly managed maintenance tasks can cause security issues. Administrative costs and the exposure to various forms of risk can increase significantly when data centers provide services for large user groups. Security risks can be increased further when such systems have a high user attrition rate.

Additional challenges may arise when a third-party entity is used to store secret data. For instance, a particular company may use a third-party service to store secret data. Although such services may provide higher levels of security with respect to certain types of threats versus self-managed turnkey systems, there may be a number of drawbacks for companies that wish to maintain a high level of security against malicious users or even the administrators of the third-party service.

It is with respect to these and other considerations that the disclosure made herein is presented.

SUMMARY

The techniques disclosed herein provide improved security for secret data shared between members of a group. Users can share secret data while they are members of a collaborative group activity, such as, but not limited to, a channel, chat session, meeting, or a communication session. A system storing the secret data can utilize an individual vault key that is associated with a particular group of users. When users join or leave a group, as they might with a channel or a chat session, the system can utilize the individual vault key to control access to the secret data shared by the group. In some configurations, individual vaults key can be associated with individual group of users. For instance, a system may provide a vault key for each channel that is created within applications such as MS Teams or Slack. The vault key can be used in a sequence of encryption steps that involve encrypting secret data using a security key, encrypting the security key using a vault key, and encrypting the vault key using a public key associated with a user. The system can store the encrypted data in a vault and grant access to those who are part of a group. Participation of a group can be verified by the use of a verification request to a group management system, such as MS Teams or Slack. Any user can become an administrator of a secret data store if they are member of a particular group activity, such as a Channel, Team, Chat, etc. By joining a group, any person who is added to the group and thus granted permission to the data vault, is also granted permissions to become an administrator to control access to a secret data store for new users of the group. So, the system does not rely on one person to manage access. This allows transitions between people to act as administrators without manual steps to transfer this authority. By the use of the vault key and by leveraging the benefits of a group management system, a storage system can mitigate the administrative overhead required to manage a system that has dynamic user groups having a high attrition rate of users. The system can also improve security by only storing the encrypted data, which is generated on remote client computers.

The techniques disclosed herein separate "user authentication" and "access control" into two processes. In some configurations, the user authentication is delegated to a trusted service, such as Active Directory, to authenticate that a user is a member of a group and has full privileges of the group. Before each member is granted access to the vault, the group vault service takes dependency from this trusted authentication service and trusts the vouch from the authentication service regarding a requesting member to access the vault being a valid member of the group and therefore the group vault. In some aspects, a notable benefit of such techniques is the ability to provide a user to access a group vault from multiple devices associated with an authenticated user by the use of a single vault key.

In some configurations, a system can receive encrypted data, including encrypted secret data, an encrypted secret key, and encrypted vault key. The encrypted secret data can be generated from the secret data using a secret key. The encrypted secret key can be generated from the secret key by the use of a vault key that is associated with a group of users. The system can receive or generate the encrypted vault key, which is generated from the vault key by the use of a public key associated with a user of the group of users. The system can be configured to store the encrypted data only if the user is a current member of the group. The system can verify the user's membership status from a group manager, such as a system managing a channel or chat session. In response to verifying that the user is a current member of the group, the system can store the encrypted data in a storage vault associated with the group of users. The encrypted data can be shared with any member of the group. Each time a group member accesses the encrypted data, the system can verify a user's status with respect to a group. A group manager can provide information regarding each user's membership status and also provide permission definitions for each member. Thus, a vault can provide specific read/write privileges based on information received from a group manager.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to individual items or instances. Generic references to the items may use the specific reference number without the sequence of letters.

FIG. 17A shows aspects of activity data having a first set of characteristics that cause a computing device to control one or more key updates.

FIG. 17B shows aspects of activity data having a second set of characteristics that cause a computing device to control one or more key updates.

DETAILED DESCRIPTION

Figure 1:
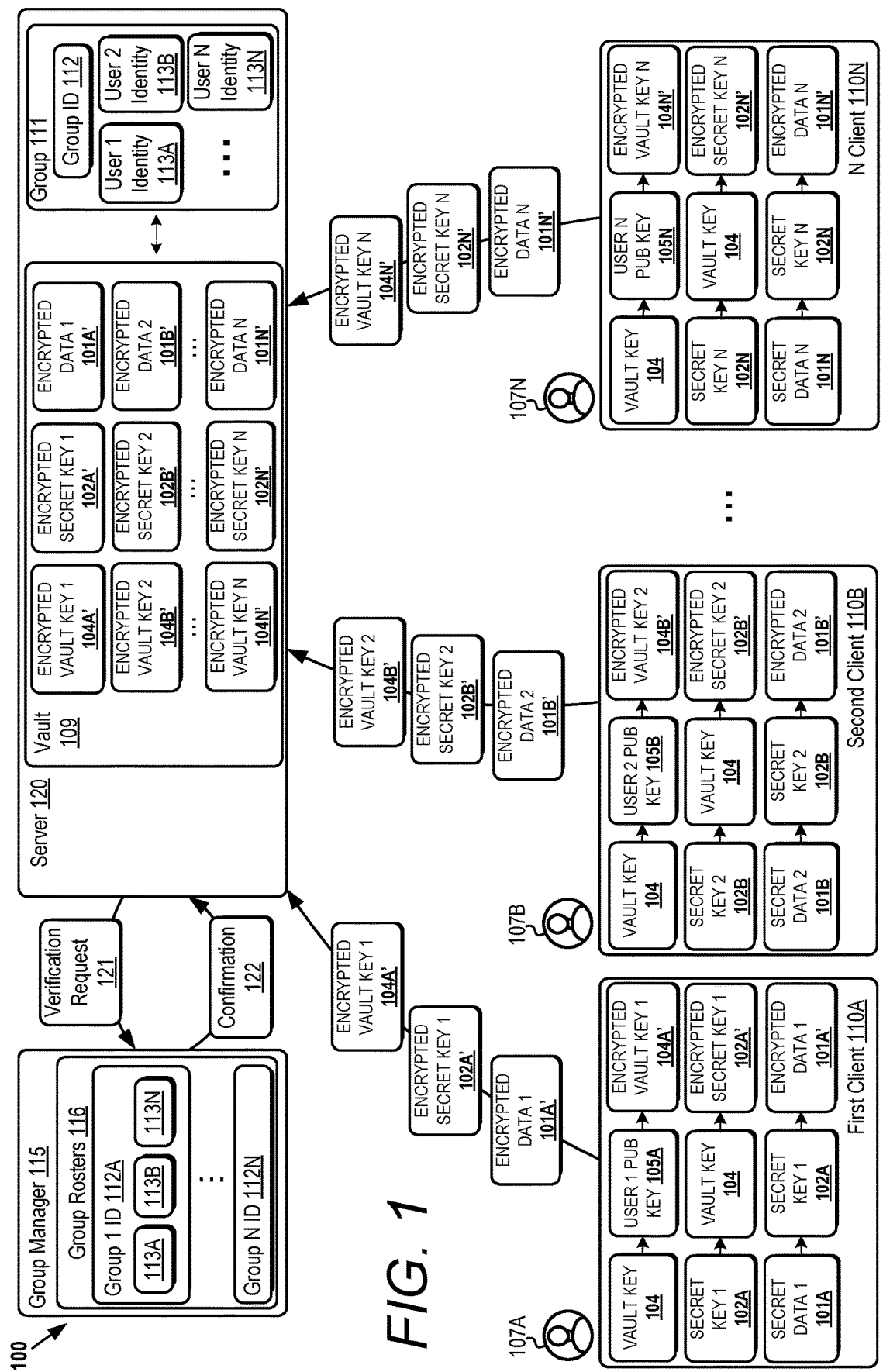
FIG. 1 is a block diagram showing several example components of a system for providing enhanced security for encrypted data using a vault key for a group of users.

The following Detailed Description is directed to techniques for providing enhanced security for encrypted data. In some configurations, a system can provide enhanced security for secret data shared by groups of users by the use of a single vault key that is associated with individual user groups. When users dynamically join or leave a group, such as a chat session, group meeting, channel, or other forms of communication sessions, the system can utilize an individual vault key to control access to secured data shared by the group. For instance, a system may associate a vault key for each channel that is created within a user group collaboration application, such as MS Teams or Slack. The vault key can be used in a sequence of encryption steps that can allow a storage system to efficiently control access to shared data for user groups that have high attrition rates. As will be described in more detail below, the use of vault keys that are associated with user groups mitigate the administrative overhead that is traditionally required to manage access rights to secured data. Additional details of a storage system utilizing a vault key are described below and shown in the examples described in association with FIGS. 1-13. Additional details of administrative tools for adding users to a group are described below and shown in the examples described in association with FIGS. 19A-20.

The system can also provide enhance security for encrypted data by the use of encryption key updates that are based on user group activity. Embodiments disclosed herein utilize a vault key and a combination of other security keys to control access to secret data shared by members of a group. The vault key allows a system to control access to secret data with users that join a particular group while immediately restricting access from users that leave the group. Updates to the keys are initiated based on the activity of the members of a group, which can include, but is not limited to, a threshold change in a number of group members, a total number of group members, an amount of data shared between the group members, and/or an age of one or more keys used to secure data shared by the group. Additional details regarding key updates are described below and shown in the examples described in association with FIGS. 14-18.

While the subject matter described herein is presented in the general context of program modules that execute in conjunction with the execution of an operating system and application programs on a computer system, those skilled in the art will recognize that other implementations may be performed in combination with other types of program modules and/or other types of devices. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced security for encrypted data.

FIG. 1 illustrates a system 100 that can be utilized to implement the techniques disclosed herein. The system 100 can include a group manager 115, a server 120, and an N number of client devices 110. The server 120 can be in communication with the client devices 110 (individually referenced as 110A-110N), each of which can be operated by respective users 107 (individually referenced as 107A-107N). The server 120 can manage one or more services for storing secret data received from the client devices 110. The secret data, which can include encrypted secret data 101', encrypted secret keys 102', and encrypted vault keys 104', can be stored in association with a vault 109. The vault 109 can be associated with a user group 111 having a group identifier 112 and a listing of user identities 113 for each member of the group 111.

The server 120 can also be in communication with a group manager 115 configured to manage collaborative sessions for individual groups 111 of users 107. For example, a group manager 115 (also referred to herein as a "group management system 115") can manage the communication between users of a group that are participating in a chat session, channel, meeting, conference call, or any other collaborative exchange of data. Examples of features of the group manager can include features provided by Slack, Google Hangouts, or Microsoft Teams. Examples of entities that may provide the features of the system 100 can include Amazon, Oracle, Salesforce, or Facebook. In some configurations, the group manager 115 can maintain a group roster 116 identifying each group with a group identifier 112 and identities 113 of each group member. Users can be added to, or dropped from, a group 111 by a member of the group. In some configurations, some users may also have independent control to add themselves to a group or remove themselves from a group. The server 120 can send verification request 121 to the group manager 115, and in response to the request, the group manager 115 can send a confirmation 122 to the server 120 to verify if a particular user 107 or a group of people are as part of a group 111. The group manager 115 can also send roster data to the server 120 without requiring a request from the server 120.

The system 100 enables users of a group to share secret data with other members of the group. Access to the secret data stored on the server 120 is based on a user's membership status with a particular group associated with the secret data. Thus, as users join a particular group, the group members are able to gain access, e.g., read and/or write permissions, to the secret data that is stored in association with that group. When users leave the group, the server 120 can communicate with the group manager 115 to verify each member's status. When it is verified that a user has left a group, the server 120 can restrict access and prevent that user from accessing, e.g., reading and/or writing, secret data stored on the server 120 in association with that group.

To store secret data within a vault 109, each group member can encrypt secret data 101 using a secret key 102 on a client device 110 to generate encrypted data 101'. In some configurations, the secret key 102 can include a symmetric key. Each group member can also utilize a vault key 104 to encrypt the secret key 102 to generate an encrypted secret key 102'. In addition, each group member can also encrypt the vault key 104 using a public key from a public-private key pair to generate an encrypted vault key 104'. Each user can then communicate their respective encrypted data 101', encrypted secret key 102', and encrypted vault key 104' to the server 120 for storage in the vault 109. When the user desires to retrieve the stored data, each user can obtain the vault key 104 by the use of their corresponding private key of the public-private key pair to decrypt the encrypted vault key 104'. Then each user can utilize the vault key 104 to access the secret key 102 and ultimately access the secret data 101.

For illustrative purposes, a "vault" can include a data store that is dedicated to storing information shared by a specific group of users. Access rights to a vault are based on a membership roster that can be verified by a reliable resource, such as a group manager 115. Access rights to a vault can be granted to a number of users that are currently participating in a group. The group manager can grant rights by communicating identities of each user to a system managing a vault, such as Google Drive, OneDrive, iCloud, etc. A vault can be constructed as an autonomous data store that is independent of other vaults. Thus, a user that is a member of a group having access to a first vault is not granted access to read data from, or write data to, a second vault that is associated with another group. The data stored in each vault can include encrypted secret data and encrypted security keys. In some configurations, the vault key 104 can be generated by the server 120 and communicated to each client device associated with members of a particular group. In other configurations, a client device 110 can be used to generate a vault key 104.

In some configurations, the techniques disclosed herein can separate the user authentication and access control into two unique processes and each process can be performed by two entities. For instance, the access to the data in the vault may be managed by a first entity, e.g., Google Drive, Amazon Web Services (AWS), Oracle Cloud, Salesforce Service Cloud, Facebook Cloud, etc. The group vault service takes a dependency, and can benefit, from this trusted authentication service and trusts the verification from the authentication service regarding a requesting member to access the vault. The process of determining if people are current members of a group, can be managed by a second entity, e.g., Slack, Microsoft Teams, etc.

Figure 2A:
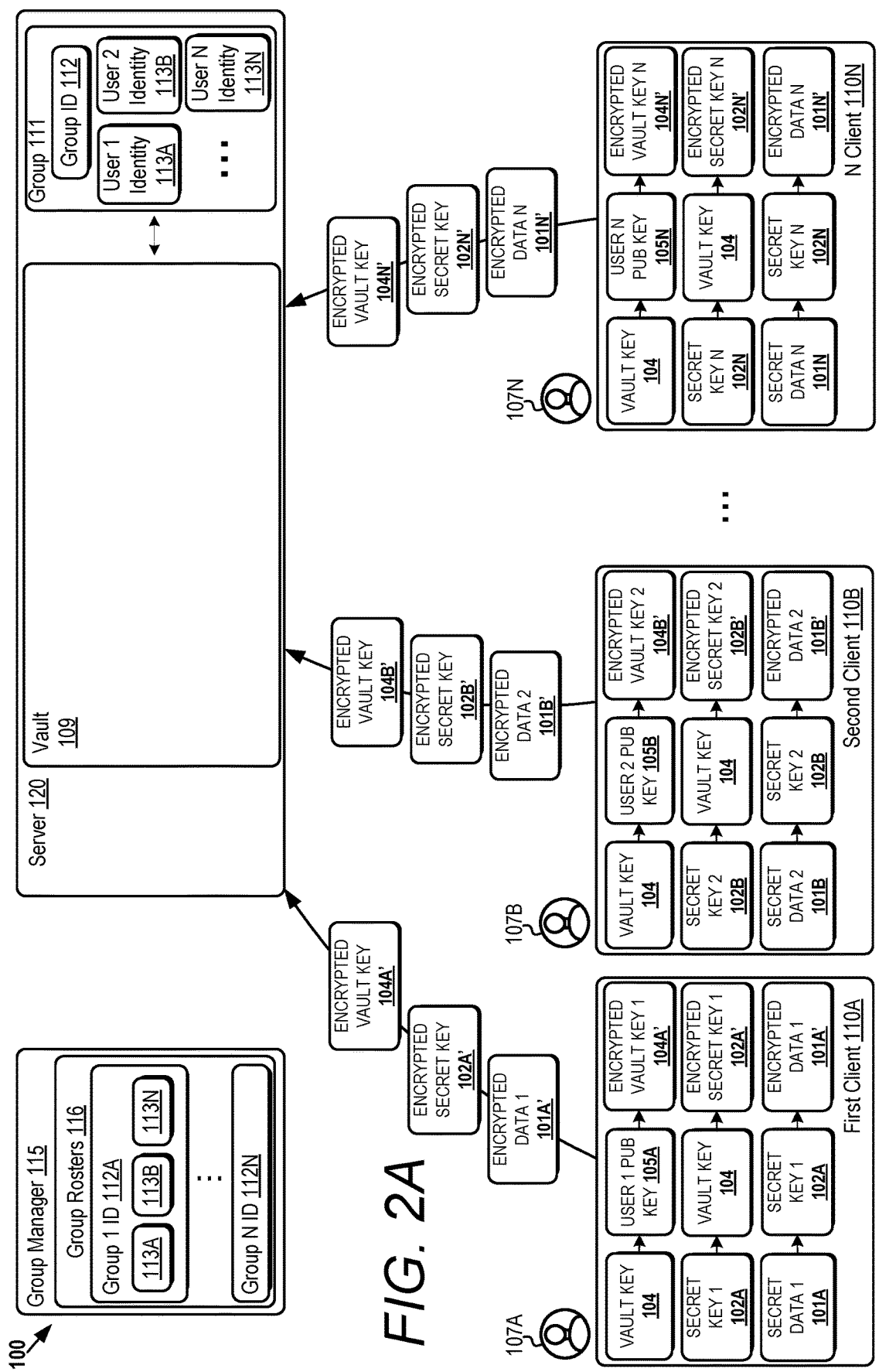
FIG. 2A is a block diagram showing a stage of a process for storing encrypted data using a vault key for a group of users defined by a roster of a communication system.

Referring now to FIG. 2A through FIG. 2G, aspects of a process for storing encrypted data using a vault key for a group of users is shown and described below. In this example, each user is a member of a group 111 that is associated with a vault 109. FIG. 2A illustrates an example where the users are utilizing corresponding client devices 110A-110N to generate encrypted data. For instance, the first user 107A utilizes the first client device 110A to encrypt Secret Data 1 101A using a Secret Key 1 102A to generate Encrypted Data 1 101A'. The first client device 110A can use the Vault Key 104 associated with the group 111 to encrypt the Secret Key 1 102A to generate an encrypted Secret Key 1 102A'. In addition, first client device 110A can encrypt the Vault Key 104 using a Public Key 1 105A from a first public-private key pair associated with first user to generate an Encrypted Vault Key 1 104A'. The other client devices 110B-110N associated with the other users 107B-107N can generate the other encrypted data, e.g., Encrypted Data 2 101B', Encrypted Secret Key 2 102B', Encrypted Vault Key 2 104B', Encrypted Data N 101N', Encrypted Secret Key N 102N' and Encrypted Vault Key N 104N', utilizing a similar process using their respective public-private key pairs. The encrypted data can then be communicated to the server 120 for storage in the vault 109.

Figure 2B:
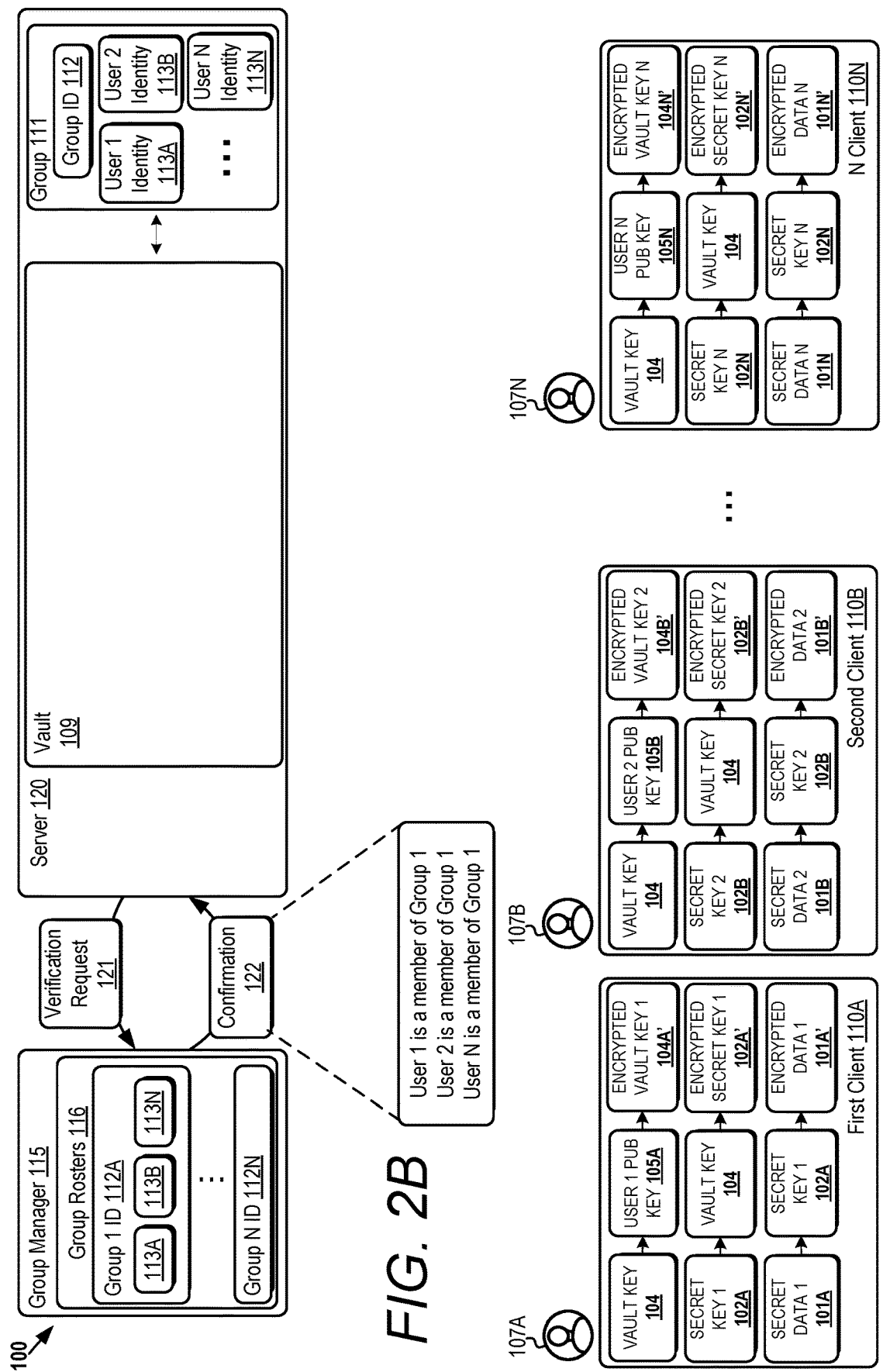
FIG. 2B is a block diagram showing a process for verifying membership of a particular group of users.

As shown in FIG. 2B, in response to receiving the encrypted data, or in response to receiving a request (also referred to herein as a "write request") to store the encrypted data in a vault 109 associated with the group 111, the server 120 determines if each user requesting to store encrypted data is a member of the group 111. In one illustrative example, the server 120 can send a verification request 121 to the group manager 115 to verify the membership status of each requesting user. In response to the verification request 121, the group manager 115 can access records, such as a group roster 116 defining the members of each group, to determine if one or more users are current members of a group. Individual records may indicate a Group ID 112 and User IDs 113 for each member. Individual records may also indicate specific permissions and roles for each User ID. Thus, in response to the verification request 121, the group manager 115 may respond by sending a confirmation 122 back to the server 120. In the present example, the confirmation 122 indicates that the first user 107A (User 1) is still a member of the group (Group 1), the second user (User 2) is still a member of the group (Group 1), and the Nth user (User N) is still a member of the group (Group 1).

The verification request 121 can be in a number of different forms. In one example, the verification request 121 can include the Group ID 112. In response to such a request, the group manager 115 can send a confirmation 122 including a list of all members of the group. In another example, the verification request 121 can include the Group ID 112 with a number of User IDs 113. In response to such a request, the group manager 115 can send a confirmation 122 that includes the specific User IDs 113 indicated in the request 121 with an indication of their membership status, e.g., currently a member, not a member, not a member as of a particular date and time, etc.

In yet another example, the verification request 121 can include the Group ID 112, a number of User IDs 113, and other metadata indicating a request to verify one or more permissions. In response to such a request, the group manager 115 can send a confirmation 122 that includes the Group ID, specific User IDs 113 of current members, and one or more permissions associated with each User ID 113. The permissions may indicate a level of access or roles for each user, e.g., administrator rights versus regular user rights. The permissions may also indicate specific access rights, e.g., read and/or write permissions. In other embodiments, the permissions may also indicate specific access rights, e.g., read and/or write permissions, that apply to individual files or groups of files. Based on the permissions defined in the confirmation 122, the server 120 can determine if each user can write data to the vault 109.

Figure 2C:
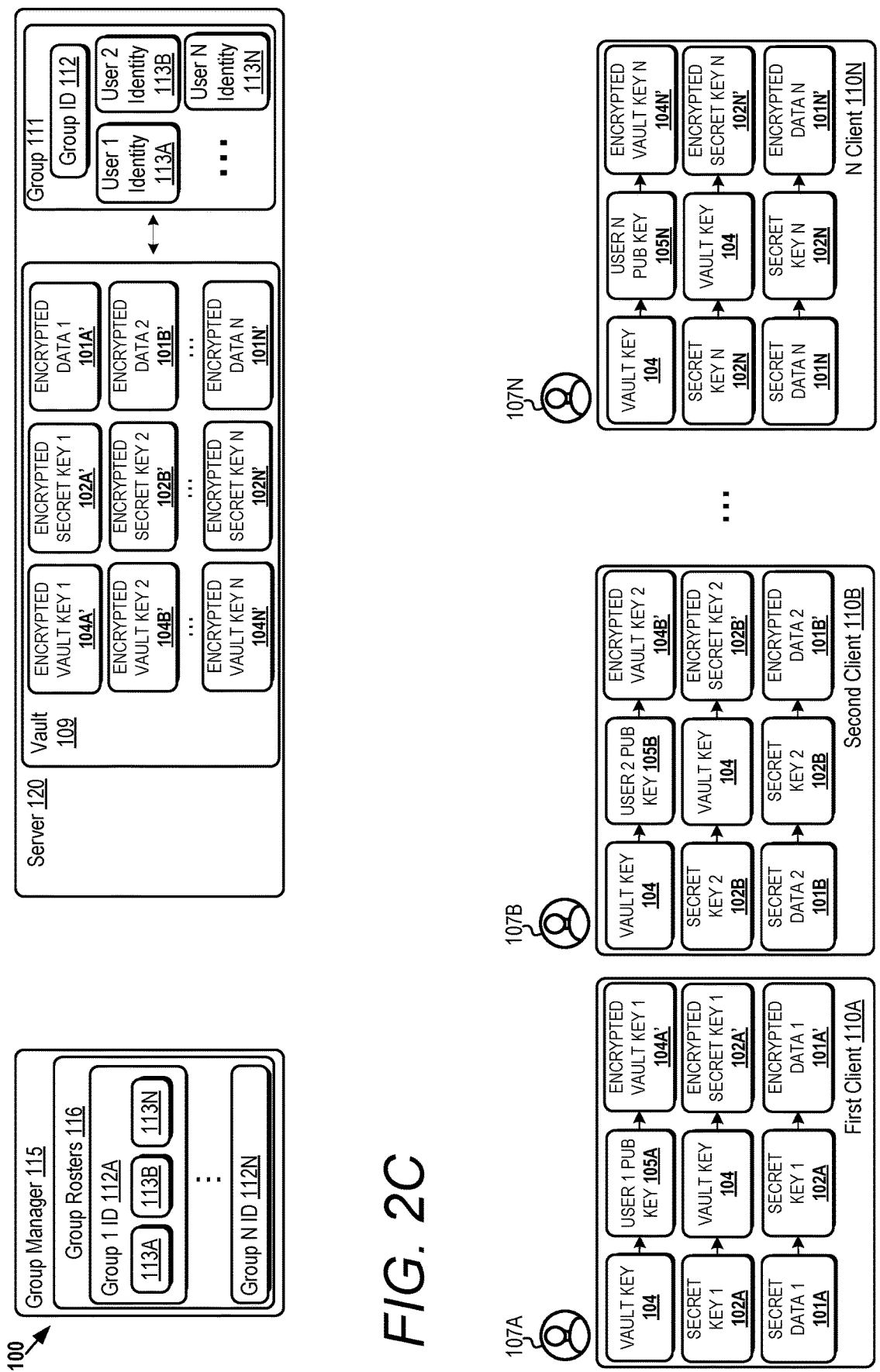
FIG. 2C is a block diagram showing the state of a server storing encrypted data using a vault key for a group of users.

As shown in FIG. 2C, the server 120 can store the received encrypted data in a vault 109 in association with a particular group 111 for each person that is a member of the group associated with the vault, e.g., each user is a part of a chat session or channel managed by the group manager 115. In some configurations, the server 120 can associate the vault 109 with a group ID 112 and the server 120 can associate the group ID 112 with individual User IDs 113A-113N for each member of the group 111. Users who are not current members of the group, e.g., no longer part of a chat session or channel, are restricted from writing data to the vault. Thus, in the example shown in FIG. 2B, if the confirmation 122 indicated that User 2 was not part of the group 111, the server would deny User 2 from storing data in the vault 109. Thus, in such an example, the server 120 would not store the Encrypted Data 2 101B', Encrypted Secret Key 2 102B', Encrypted Vault Key 2 104B' in the vault in response to determining that User 2 is not part of the group 111.

Figure 2D:
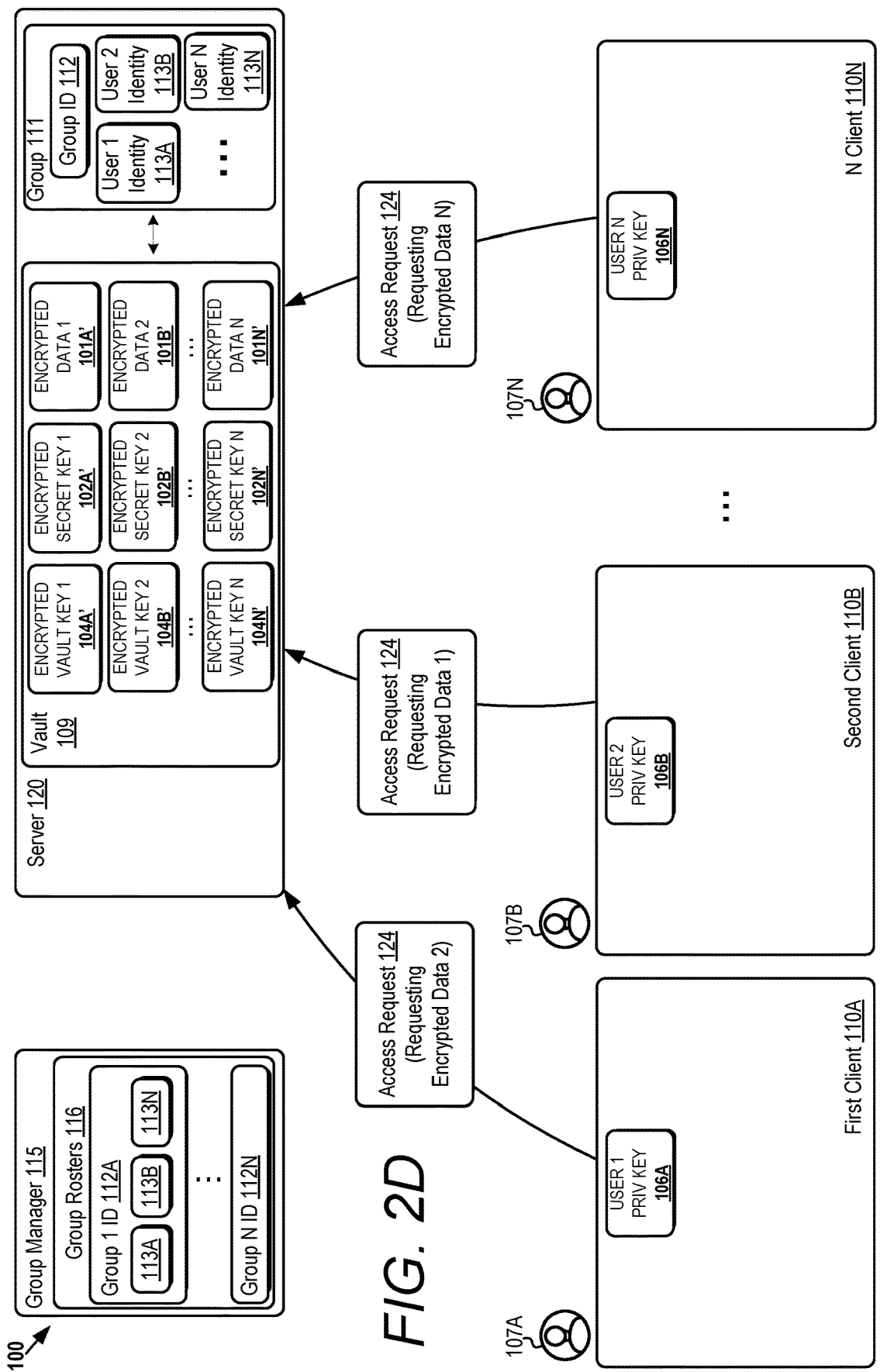
FIG. 2D is a block diagram showing a stage of a process for requesting access to encrypted data that is stored using a vault key for a group of users.

Once the encrypted data is stored in the vault, any current member of the group can access the encrypted data stored in a vault. FIG. 2D shows aspects of a process where users are requesting access to encrypted data that is stored in a vault for a particular user group 111. In this example, to illustrate aspects of how data can be shared between group members, the first user 107A sends an access request 124 requesting a copy of the Encrypted Data 2 102B', e.g., the secret data that was originally stored by the second user 107B using the second computing device 110B. At the same time, in this example, the second user 107B sends an access request 124 requesting a copy of the Encrypted Data 1 102A', e.g., the secret data that was originally stored by the first user 107A using the first computing device 110A. Also, in this example, a user 107N sends an access request 124 requesting a copy of the Encrypted Data N 102N', e.g., the secret data that the user originally stored at the server 120.

Figure 2E:
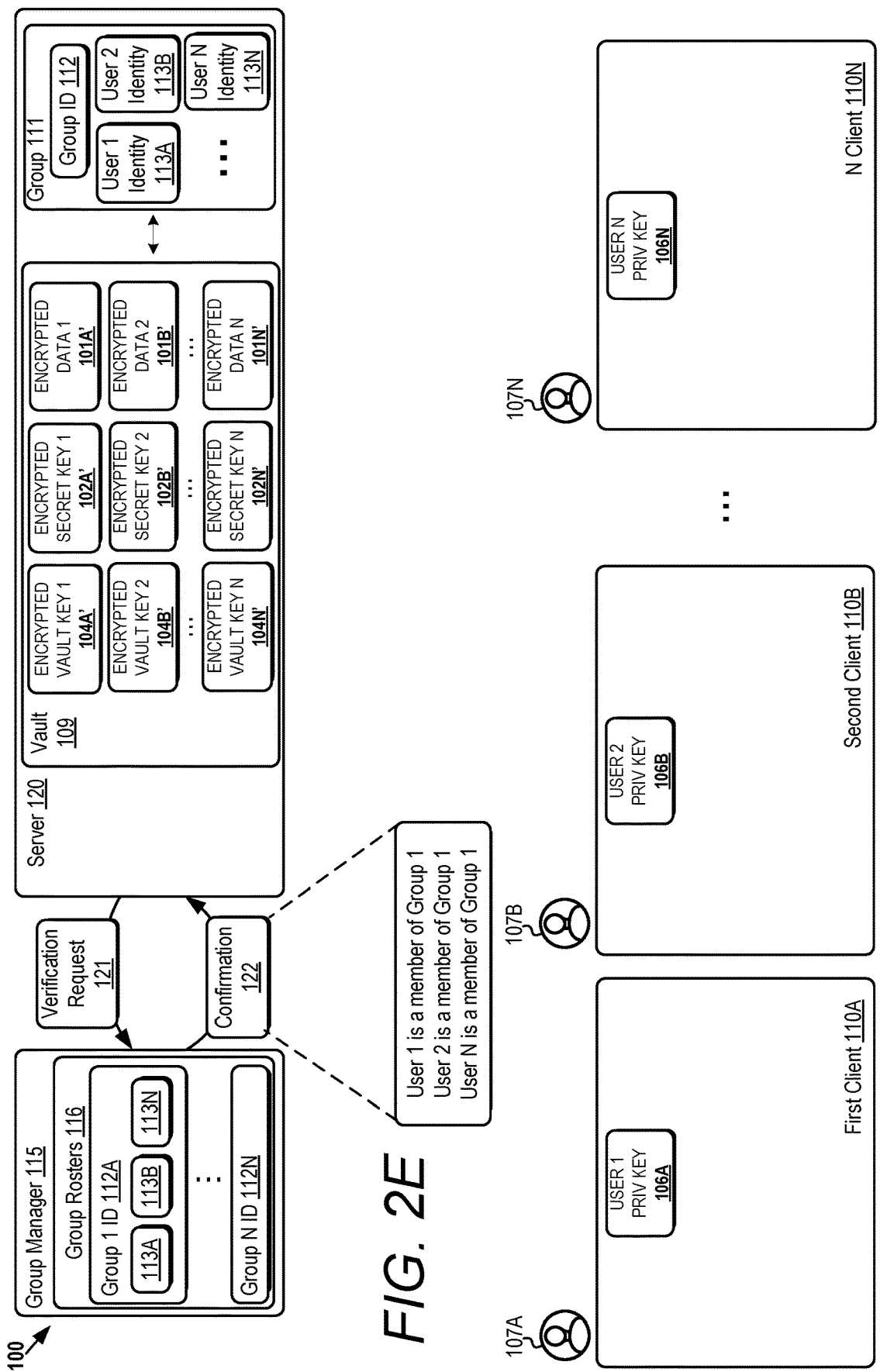
FIG. 2E is a block diagram showing a process for verifying membership of a particular group of users.

In response to the access requests 124, as shown in FIG. 2E, the server 120 can determine if each requesting user is still a member of the group. In one illustrative example, the server 120 can send a verification request 121 to the group manager 115 to verify the membership status of each requesting user. In response to the verification request 121, the group manager 115 can access records, such as a group roster 116 defining the members of each group. Individual records may indicate a Group ID 112 and User IDs for each member. Individual records may also indicate specific permissions and roles for each User ID. Thus, in response to the verification request 121, the group manager 115 may respond by sending a confirmation 122 back to the server 120. In the present example, the confirmation 122 indicates that the first user 107A (User 1) is still a member of the group (Group 1), the second user (User 2) is still a member of the group (Group 1), and the Nth user (User N) is still a member of the group.

Figure 2F:
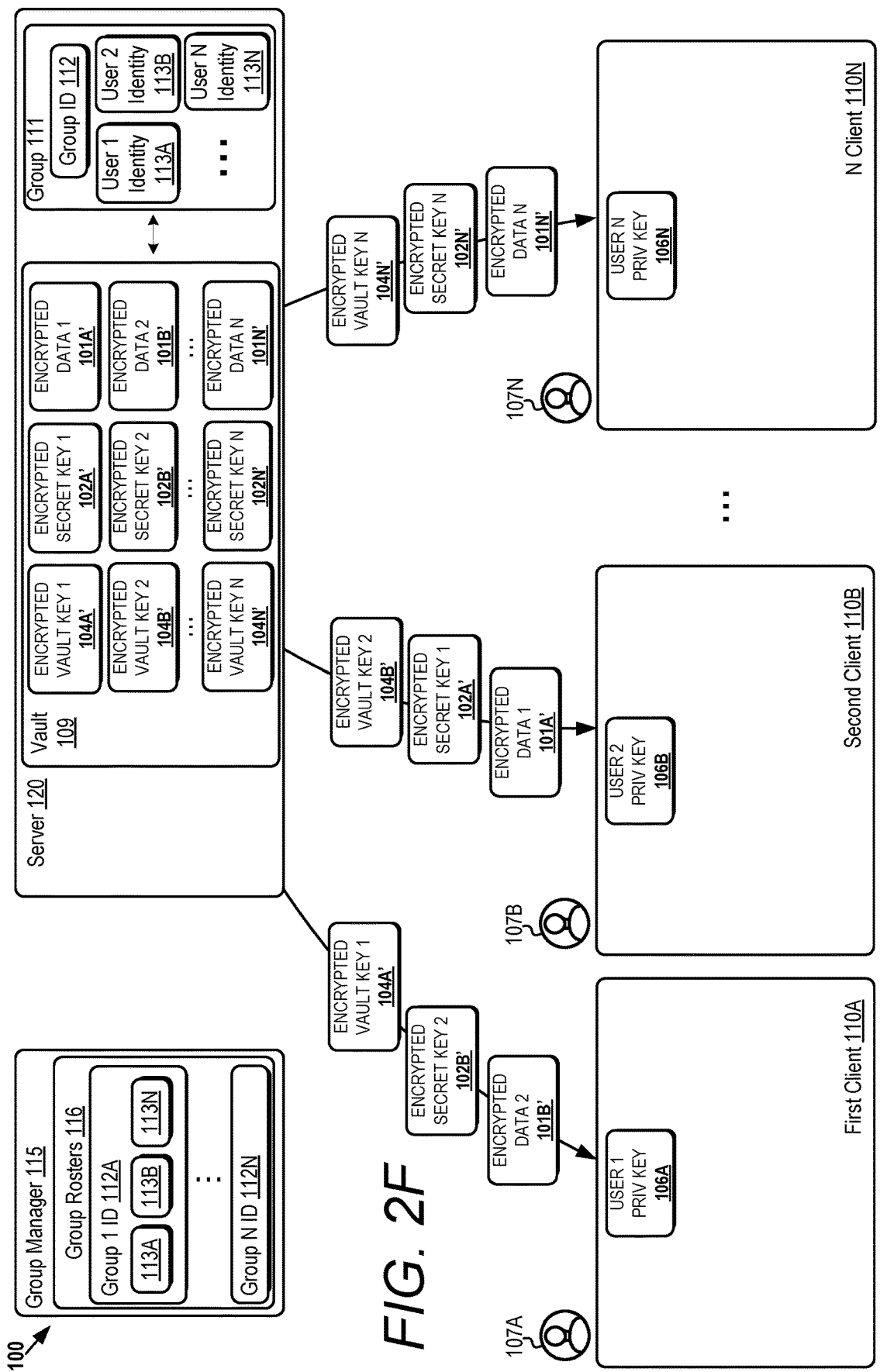
FIG. 2F is a block diagram showing another stage of a process for requesting access to encrypted data that is stored using a vault key for a group of users.

With reference to FIG. 2F, since the confirmation 122 indicated that each of the requesting users are current members of the group, the server 120 communicates the requested data to each client device 110. Specifically, the server 120 communicates Encrypted Vault Key 1 104A', Encrypted Data 2 101B' and Encrypted Secret Key 2 102B' to the first client device 110A. The server 120 also communicates Encrypted Vault Key 2 104B', Encrypted Data 1 101A' and Encrypted Secret Key 1 102A' to the second client device 110B, and the Encrypted Vault Key N 104N', Encrypted Data N 101N' and Encrypted Secret Key N 102N' to the Nth client device 110N. As shown, in response to an access request, each requesting user receives the encrypted data 101' and an encrypted secret key 102' they requested along with an encrypted vault key 104' that is associated with the public-private key pair that they utilized to encrypt the vault key 104.

Figure 2G:
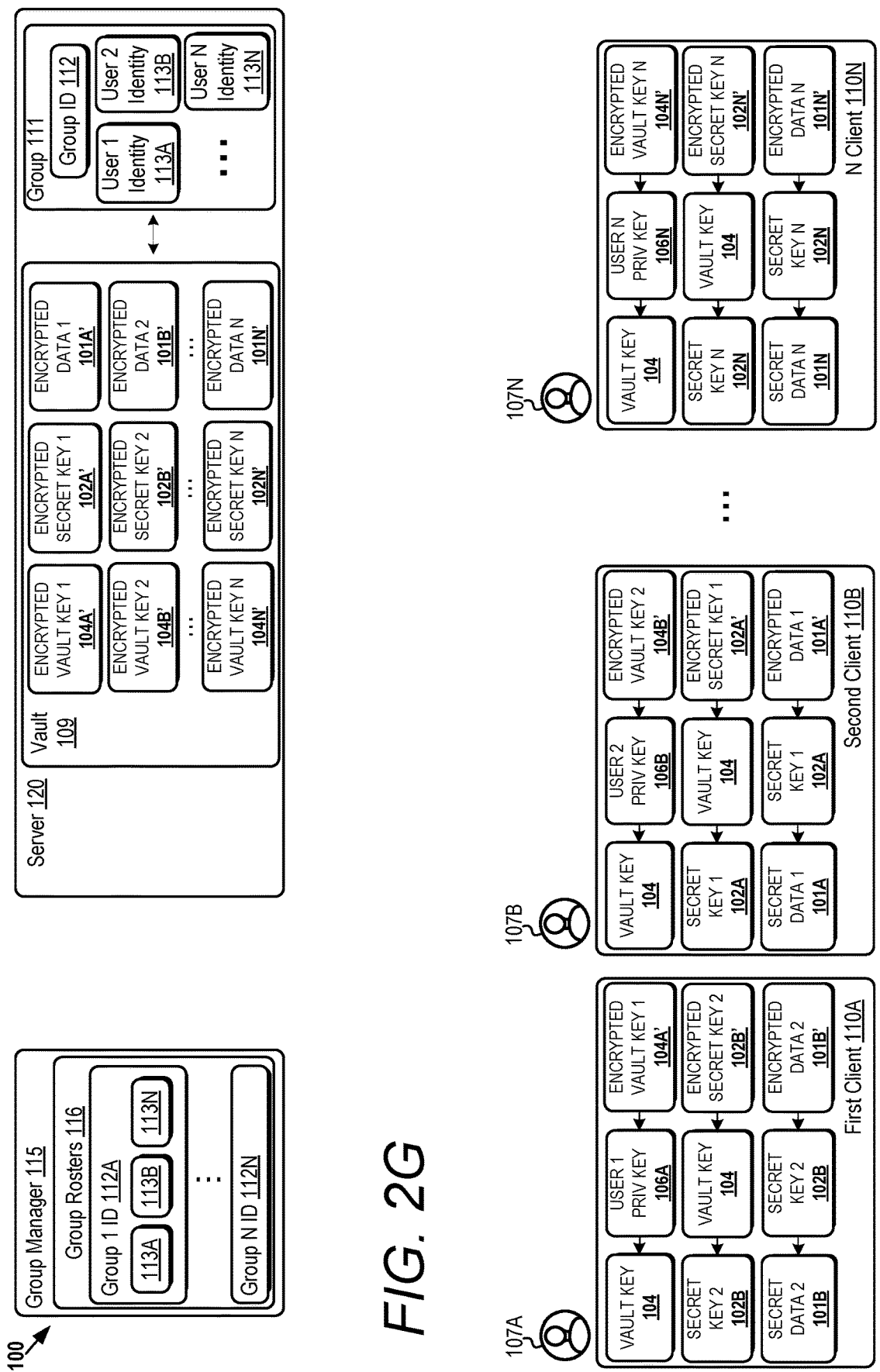
FIG. 2G is a block diagram showing the state of a number of client computers after accessing secret data from a server.

As shown in FIG. 2G, each client device 110 can decrypt the received data utilizing a private key 106 that corresponds to the public key used by each user to encrypt the vault keys 104. Specifically, the first user 107A utilizes the first client device 110A to decrypt the Encrypted Vault Key 1 104A' using the first user's private key (User 1 Private Key 106A) to produce the Vault Key 104. The first client device 110A can then decrypt the Encrypted Secret Key 2 102B' using the Vault Key 104 to produce the Secret Key 2 102B. The first client device 110A can then decrypt the Encrypted Data 2 101B' using the Secret Key 2 102B to produce the Encrypted Data 2 101B. The other client devices 110B-110N associated with the other users 107B-107N can decrypt the other received data in a similar fashion. As shown, the system 100 allows members of a group to share and retrieve secret data while they are members of a group.

Figure 3A:
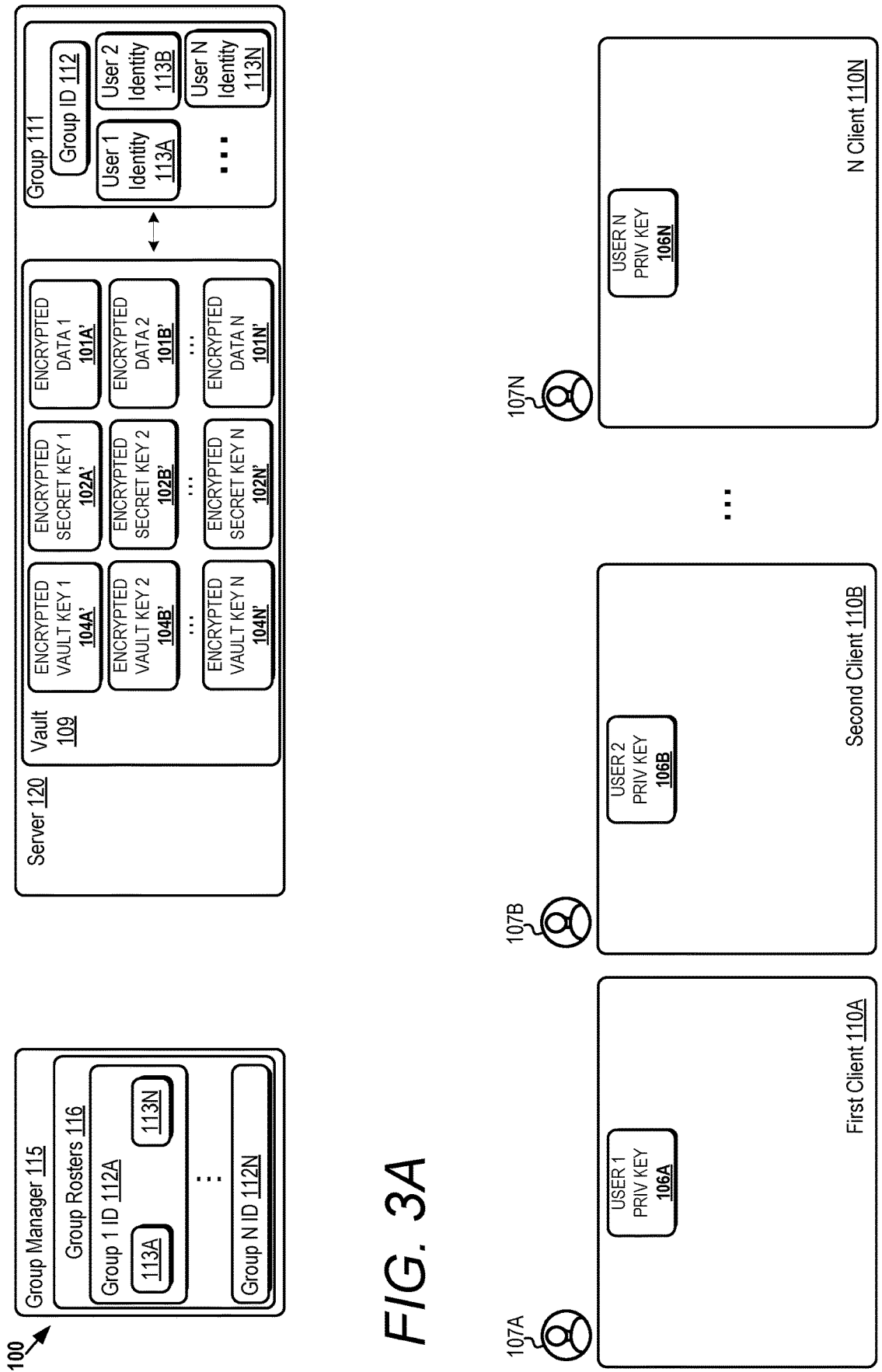
FIG. 3A is a block diagram showing aspects of a system for controlling access to stored data that is secured using a vault key for a group of users.

Referring now to FIGS. 3A-3G, another user scenario is shown and described below. This example illustrates how the system 100 can be utilized to restrict access for members who are not, or no longer, part of a group. Also, this example shows how the system 100 may be used to allow users to update stored data. As shown in FIG. 3A, it is a given that each client device 110 starts with a private key 106 prior to sending an access request.

Figure 3B:
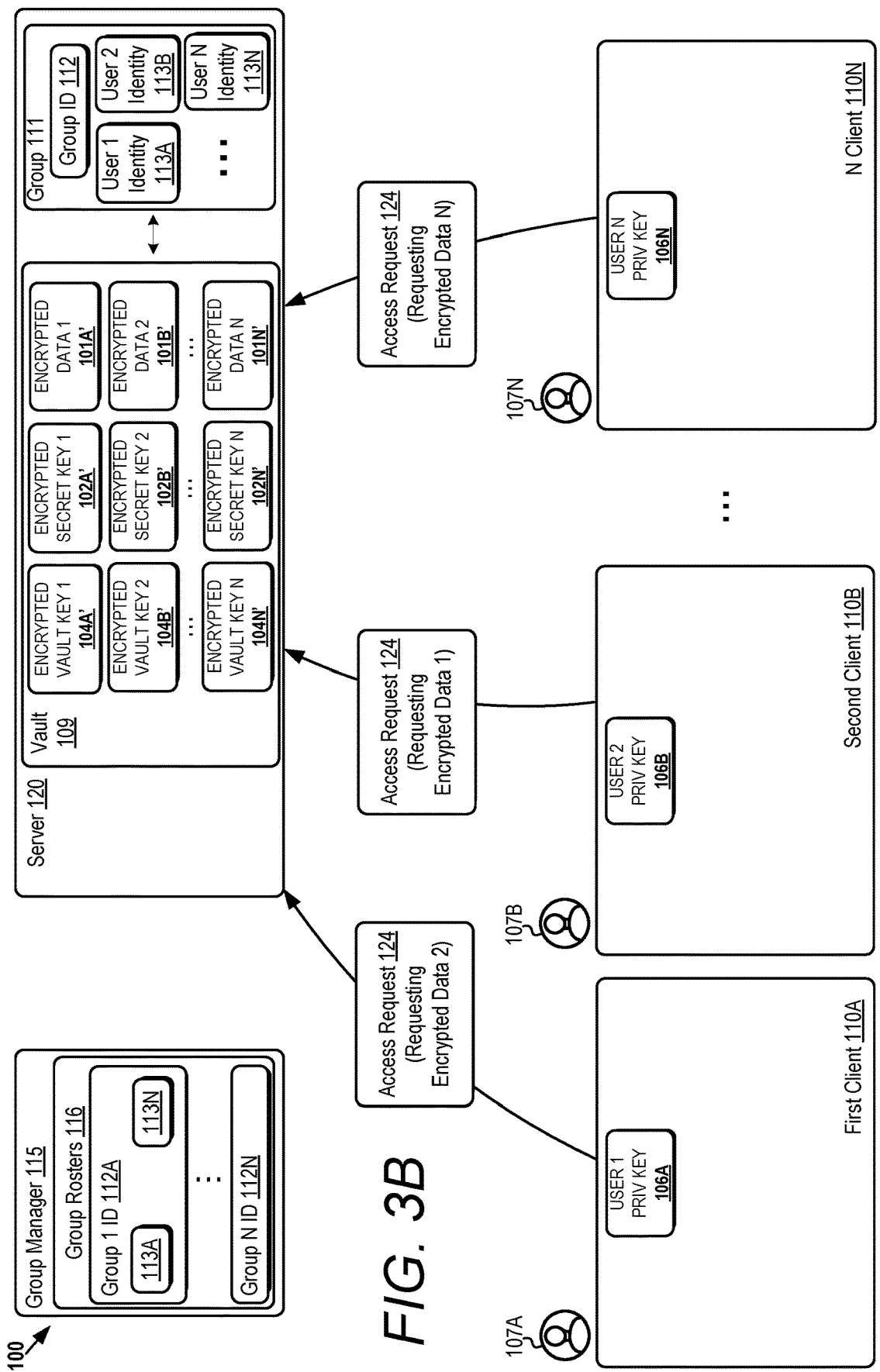
FIG. 3B is a block diagram showing aspects of a process for controlling access to stored data that is secured using a vault key for a group of users.

FIG. 3B shows aspects of the access requests 124. In this example, the first user 107A sends an access request 124 requesting a copy of the Encrypted Data 2 102B', e.g., the secret data that was originally stored by the second user 107B using the second computing device 110B. The second user 107B sends an access request 124 requesting a copy of the Encrypted Data 1 102A', e.g., the secret data that was originally stored by the first user 107A using the first computing device 110A. Also, similar to the prior example, a user 107N sends an access request 124 requesting a copy of the Encrypted Data N 102N', e.g., the secret data that the user originally stored at the server 120.

Figure 3C:
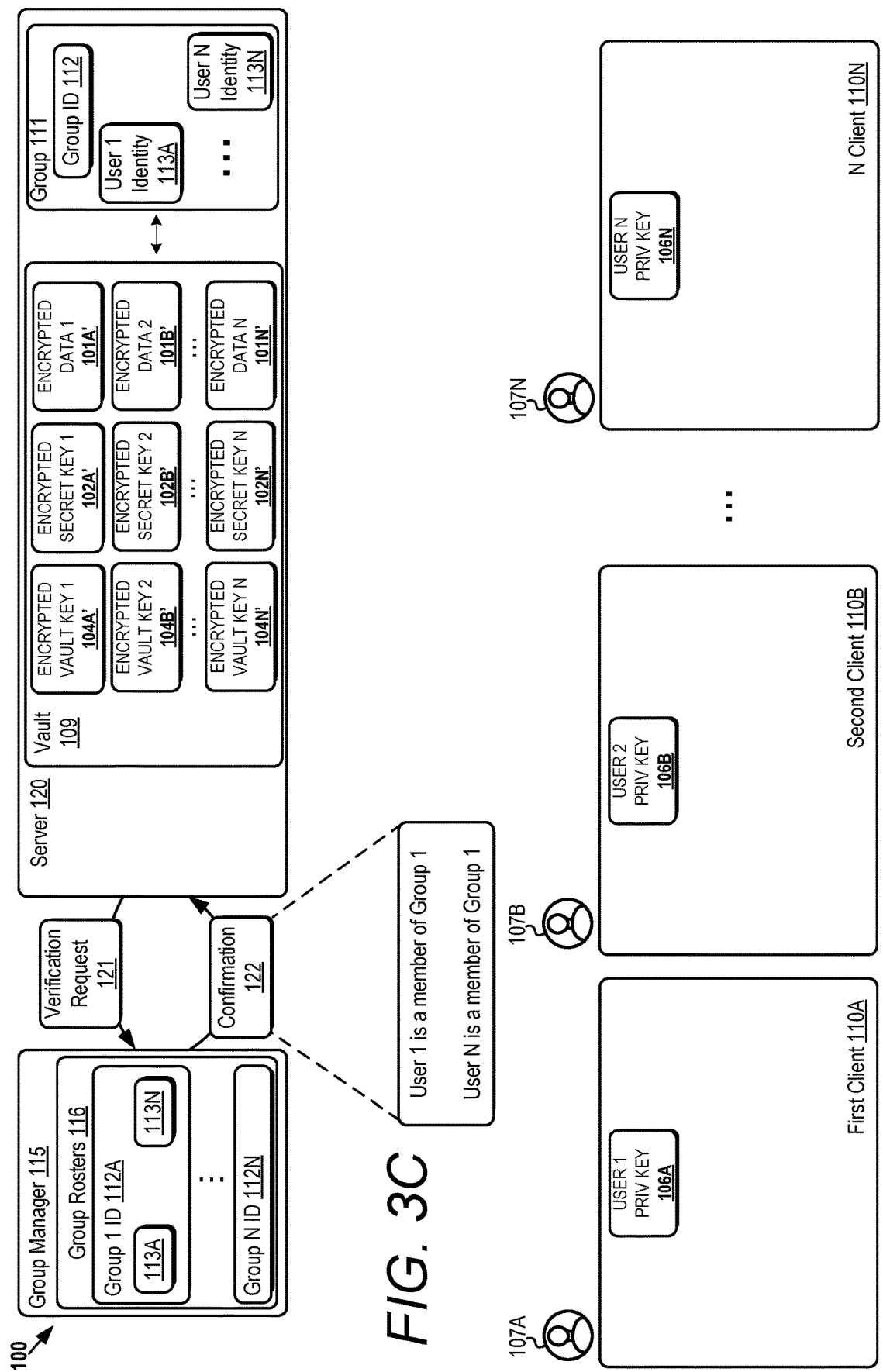
FIG. 3C is a block diagram showing aspects of a group manager that is used to confirm membership of a group.

In response to the access requests 124, as shown in FIG. 3C, the server 120 determines if each requesting user is a member of the group by the use of a verification request 121. In this example, the second user 107B has been dropped from the roster of the group as indicated by the data stored at the group manager 115. Thus, in response to the verification request 121, the group manager 115 responds by sending a confirmation 122 back to the server 120 indicating that the first user 107A (User 1) and the Nth user (User N) are still a member of the group (Group 1), and that the second user (User 2) is no longer a member of the group (Group 1).

Figure 3D:
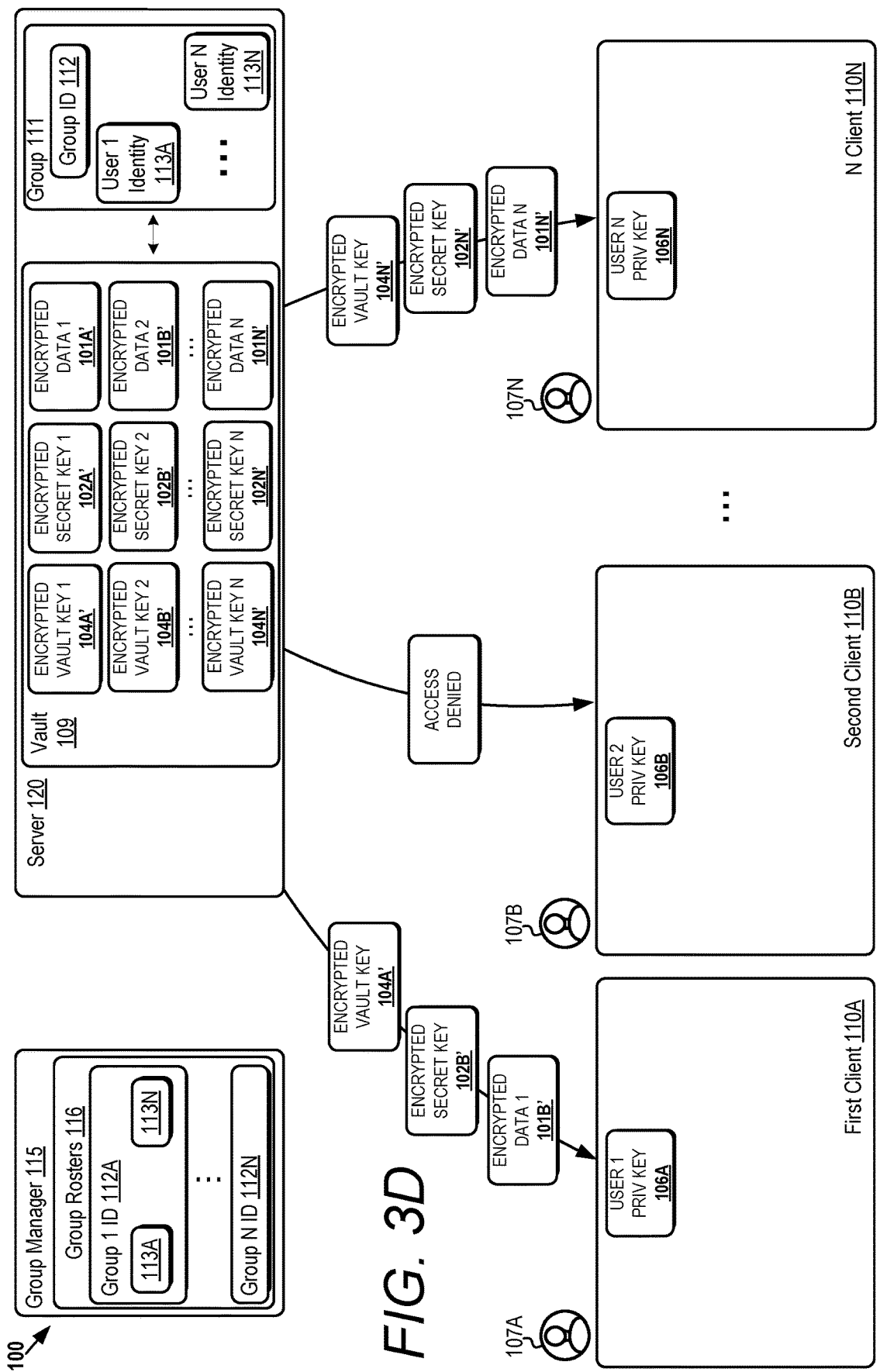
FIG. 3D is a block diagram of other aspects of a process for controlling access to stored data that is secured using a vault key for group of users.
Figure 3E:
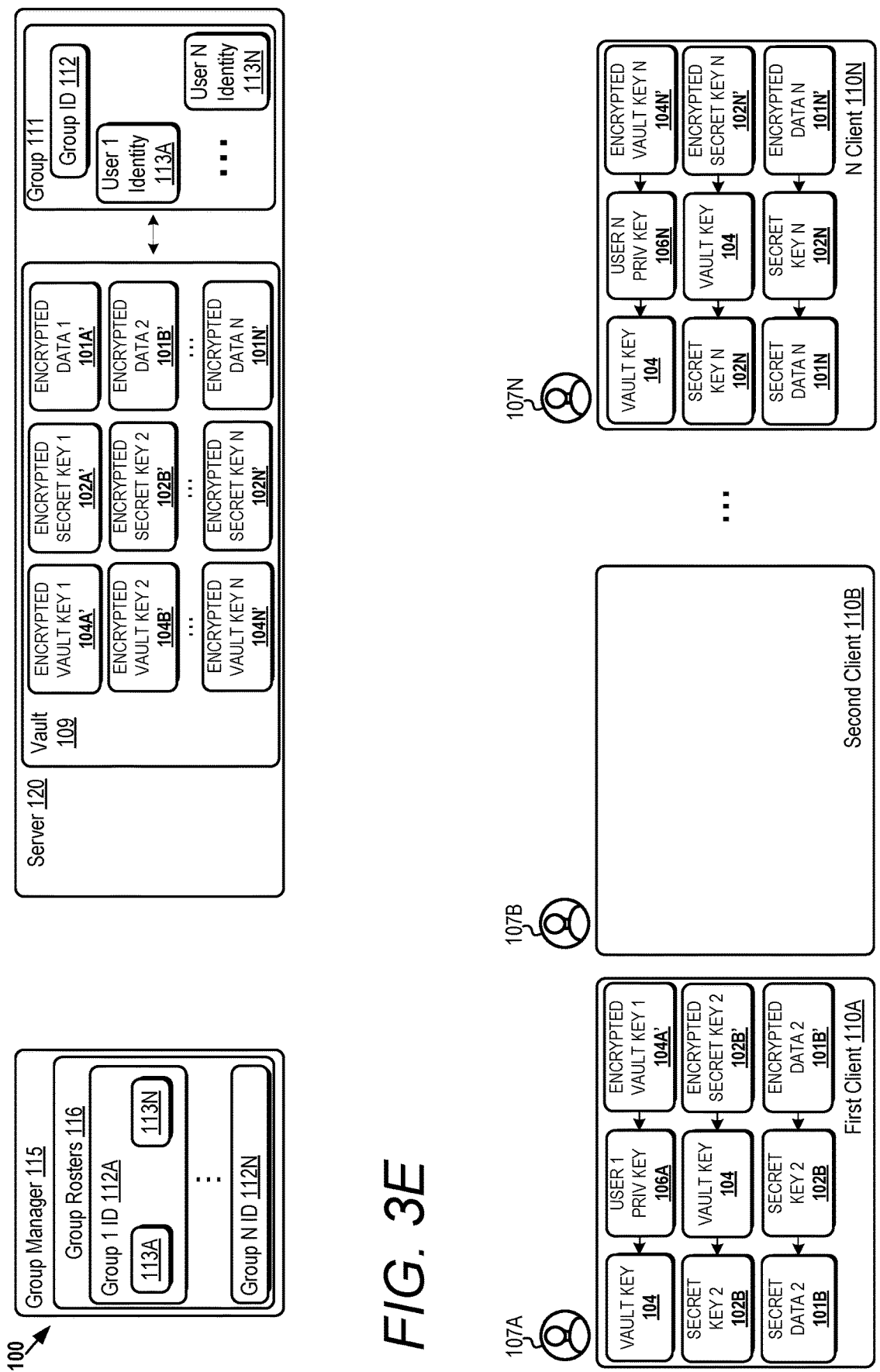
FIG. 3E is a block diagram showing the results of a process where client computers are decrypting received data.

As shown in FIG. 3D, the server 120 responds to the confirmation 122 by allowing the communication of encrypted data to be sent to the first user 107A and the Nth user 107N, while restricting access to the second user 107B. In such an embodiment the server 120 may send a notification to the client, such as the second client 110B, where the notification can indicate a status of the access request. The notification may indicate the user's status of the group, or provide a message indicating that the requested data is not available. As shown in FIG. 3E, the client devices of the first user 107A and the Nth user 107N can then utilize the corresponding private keys 106 to decrypt the received data using the techniques disclosed herein.

Figure 3F:
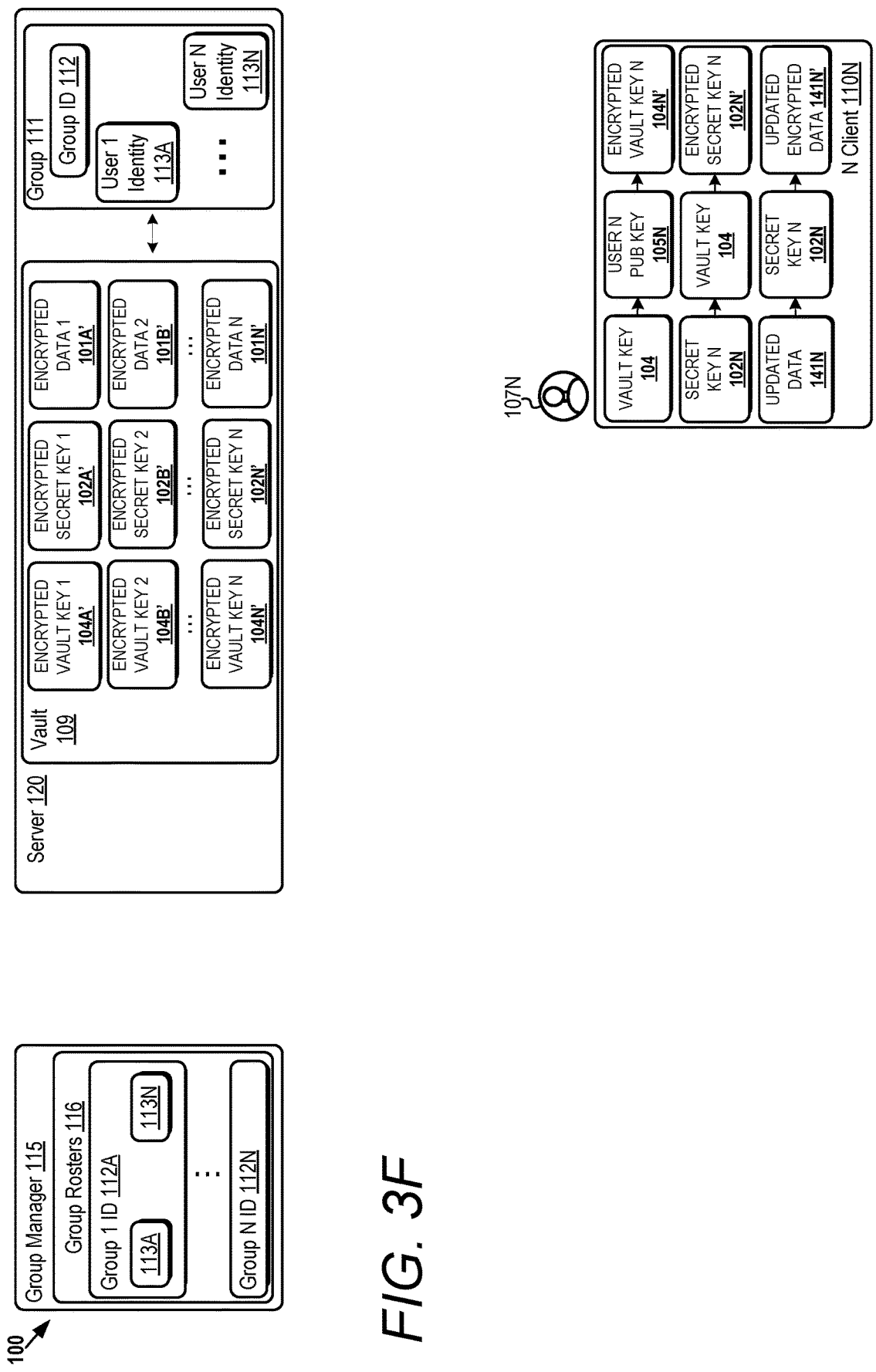
FIG. 3F is a block diagram showing aspects of a client computer encrypting updated data using a combination of keys including a vault key for a group of users.
Figure 3G:
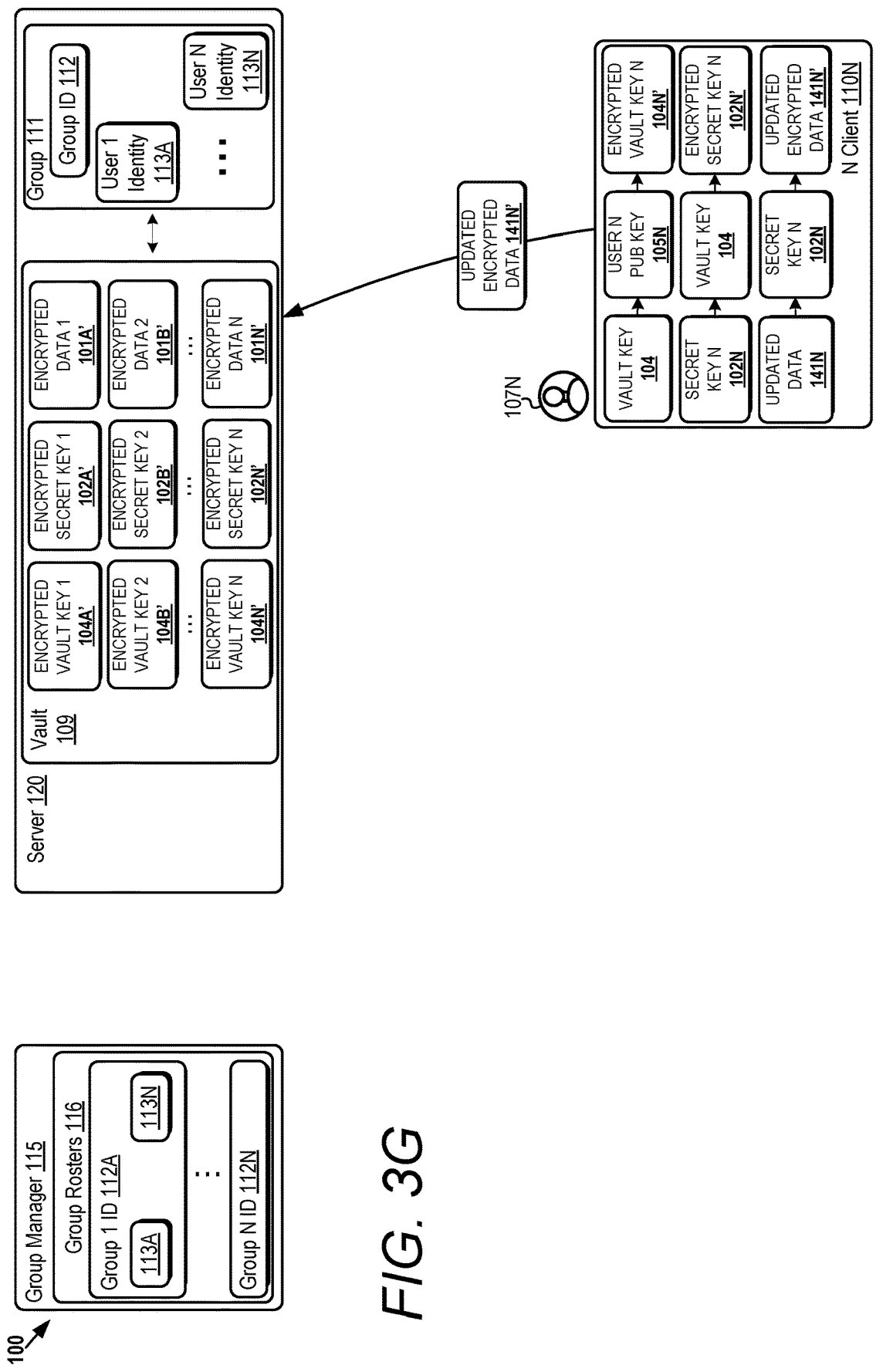
FIG. 3G is a block diagram showing a client computer providing updated data to a server for storage.
Figure 3H:
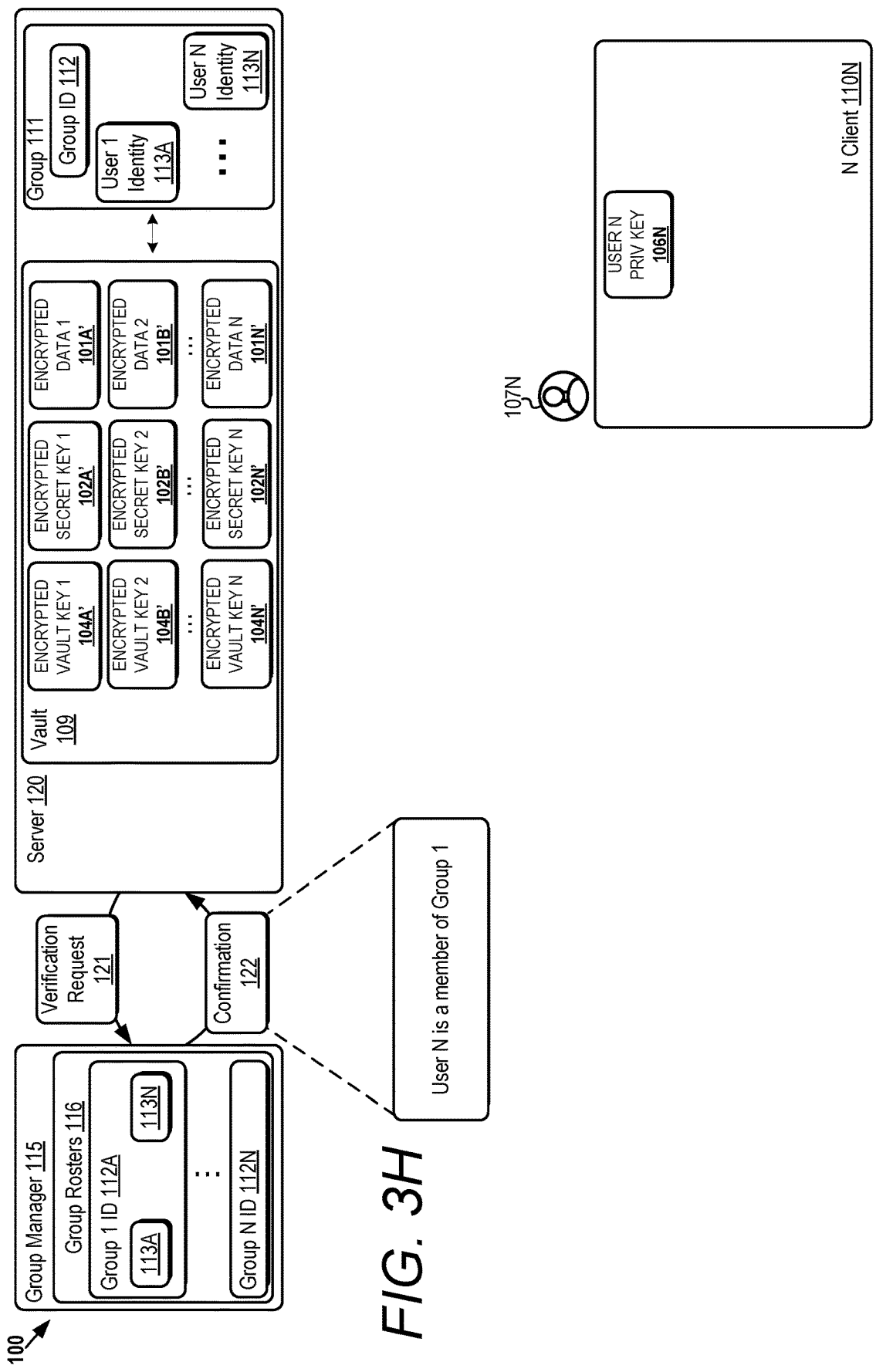
FIG. 3H is a block diagram showing a verification process to determine if a user is a member of a group.
Figure 3I:
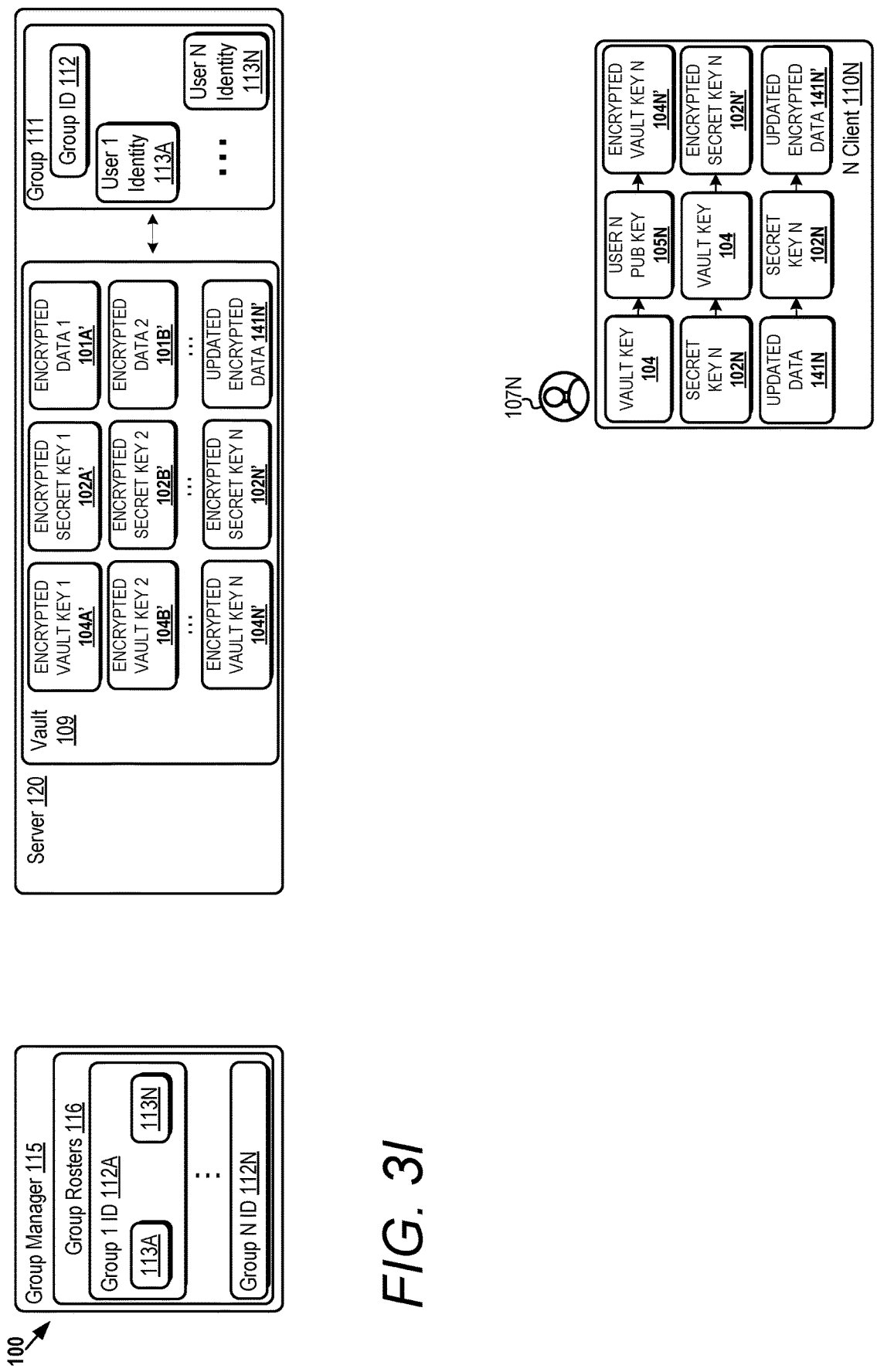
FIG. 3I is a block diagram showing results of a server writing data to a vault in response to a membership verification of a user.

As summarized herein, the techniques disclosed herein allow users to update encrypted data stored in a vault. Aspects of this process are shown in FIGS. 3F-3I. As shown in FIG. 3F, the Nth client device 110N can generate updated data 141N. The Nth client device 110N can then encrypt the updated data 141N using a secret key 102N, and then encrypt the secret key 102N using the vault key 104. The vault key can be then encrypted using the user's public key 105N. As shown in FIG. 3G, the Nth device 110N can then communicate the updated encrypted data 141N' to the server 120. In response to receiving the encrypted data, as shown in FIG. 3H, the server 120 can verify the user's membership status with respect to the group. In this example, the group manager 115 confirms that the user is currently a member of the group. In response to the confirmation, as shown in FIG. 3I, the server 120 stores the updated encrypted data 141N' within the vault 109. If the confirmation from the group manager 115 indicated that the Nth user 107N is not a current member of the group, or that the Nth user 107N had restricted write permissions, the server 120 can deny any request from that user to write data to the vault 109.

In the example of FIGS. 3F-3I, the user can also provide updated encrypted secret data that is encrypted using a new secret key. In such an embodiment, the client device would also provide an updated encrypted secret key that is encrypted using the vault key. In addition, the user can also provide an updated encrypted vault key that is encrypted using a new public key from a new key pair. This encrypted data provided by the client can be stored in the vault upon verification of the user's membership with the group, or verification from a group manager that the user has write permissions to the vault.

In the examples provided herein, it can be appreciated that an encrypted vault key, also including an encrypted vault key that is updated using a new public key, can be generated at the server 120. In such embodiments, instead of communicating the encrypted vault key from the client to the server, the client can communicate the public key to the server 120 and allow the server 120 or another computer to generate an encrypted vault key using any received public key.

Figure 4:
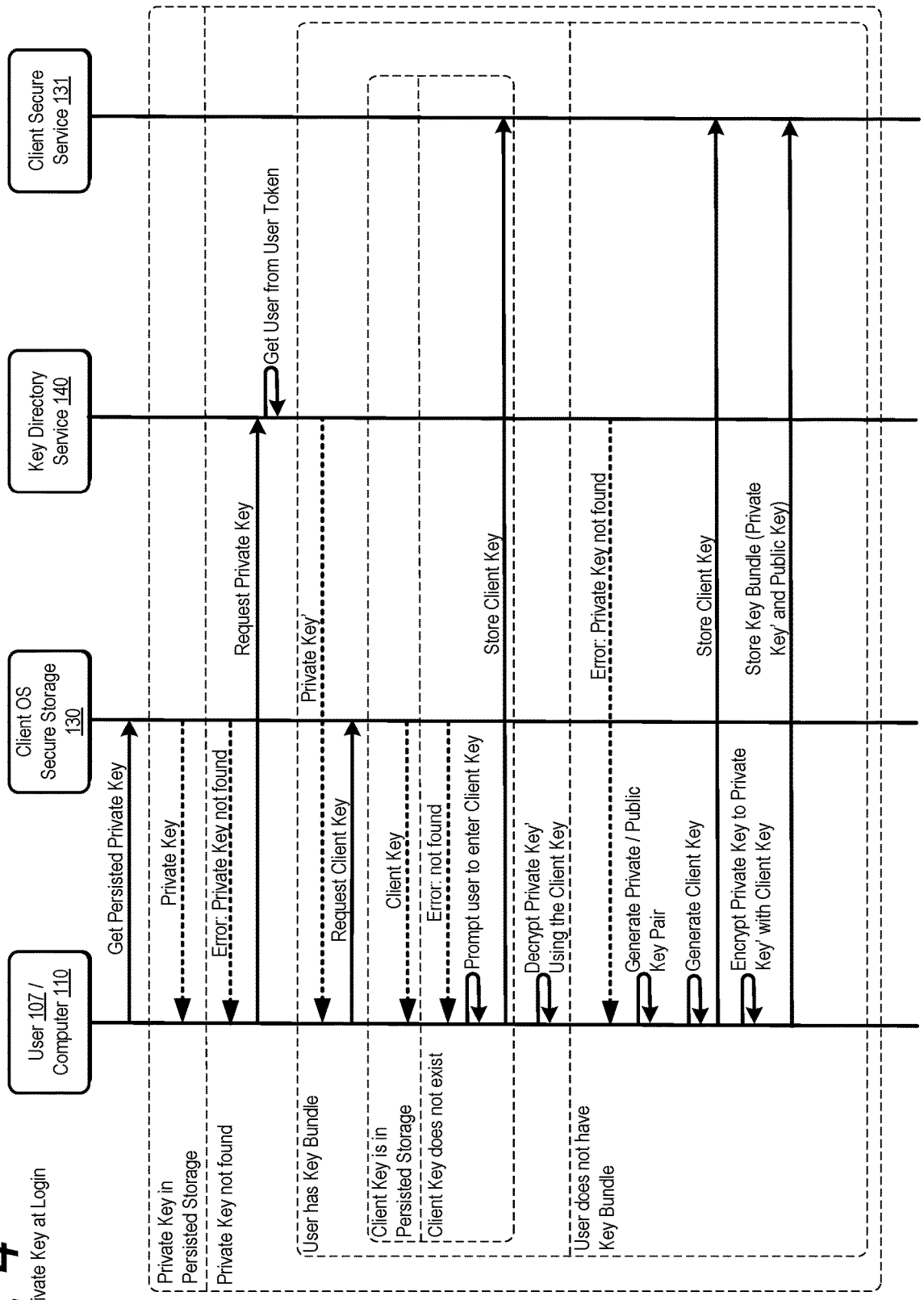
FIG. 4 is a flow diagram illustrating aspects of a process for obtaining a user private key.

FIG. 4 illustrates a process for obtaining a user's private key. At login, the client 110, which may be operated by a user 107 such as a first user 107A, can attempt to obtain the private key from a resource, such as the OS secure storage 130. If this is the first use of the client 110 or if the private key has been removed from the OS secure storage 130, the client 110 can obtain the user's private key from a key directory service 140. A key directory service can include a data store of security keys that can be accessed by users with appropriate credentials. If the key directory service 140 doesn't have a key bundle, an error is returned to the client 110. This error indicates that this is the first time this user 107 has logged in. The client 110 is thus tasked with the operation of generating a public/private key pair and uploading them. If the client 110 only uploaded the public key, then the system would have to find a way to share the private key between each client that the user logs into. In some configurations, the system can encrypt the private key with a symmetric key which can be much smaller in size and get equivalent security. The client 110 can also encrypt the private key and send that to a remote computer and then only the client key, such as a 128-bit symmetric encryption key, is shared between clients when a client is used for the first time. As in other descriptions herein, any encrypted data is noted by the use of an apostrophe, e.g., Vault Key 104' indicates an encrypted vault key.

If the private key exists in the directory service 140, it is downloaded to the client 110, and system can attempt to get the client key from the OS secure storage 130. If the client key does not exist, the client 110 can prompt the user to provide one since it is not a first use scenario but simply provisioning a client application for the first time.

With respect to the storage of a user's private keys, the storage can be managed using a number of different techniques. As described above, in some configurations, a private key can be stored in key directory service. However, when users wish to access their stored secrets using multiple devices, a user can encrypt a private key and then share that private key with other devices. As summarized herein, a user must have a private key in order to correctly decrypt the secrets that are received from a vault. However, in order to get access to the private key, it needs to be shared between devices that belong to a single user. To achieve this, one of the client devices can encrypt the private key using a symmetric key, e.g., AES-128, and upload the encrypted private key to a key directory service so that the size of the data that needs to be shared between devices (only 128 bits) is significantly less than the private key.

The symmetric key can be is saved to an operating system (OS) secure storage and is only retrieved when needed to transfer to a new device. The private key can be retrieved from the key directory service when the new client is being provisioned, then it is saved to the OS secure storage for future use.

Transferring a client key, such as a 128-bit shared client key, can be a one-time event for each new client. There are a few embodiments for transferring a client key. For instance, when an already provisioned device and the new device are both connected to the internet, a user could initiate a secure transfer process between the devices using conventional secure message transfer methods where each device creates its own public and private key pair. In another embodiment, a user can create a quick response (QR) code and display it on one device for the new device to capture and register. In another embodiment, a device can display a string that the user types into the other device. The user could also print a string and save it in a safe place so that the user doesn't need to access the old device.

In some embodiments, a client computer 110 can perform a process for sharing a single key with multiple devices for a single user. The client computer 110 can encrypt a private key of a private-public key pair using a symmetric key to generate an encrypted private key. The client computer can then communicate the symmetric key in a secure service executing on a remote device, wherein the secure service provides access to the symmetric key by the use of one or more credentials associated with the first user. The process can also include communicating the encrypted private key to a secure storage 130 associated with an operating system of one or more computing devices, wherein the encrypted private key is secured using the one or more credentials associated with the first user. The one or more computing devices can include the client device 110, the server 120 or another computer that can be accessed by the first user. It can be appreciated that the client operating system secure storage 130, the key service 140, and/or the client secure service 131 can reside on any suitable computing device including, but limited to the client device 110, the server 120, or any other remote device that is accessible by a user, such as the first user 107A.

Figure 5:
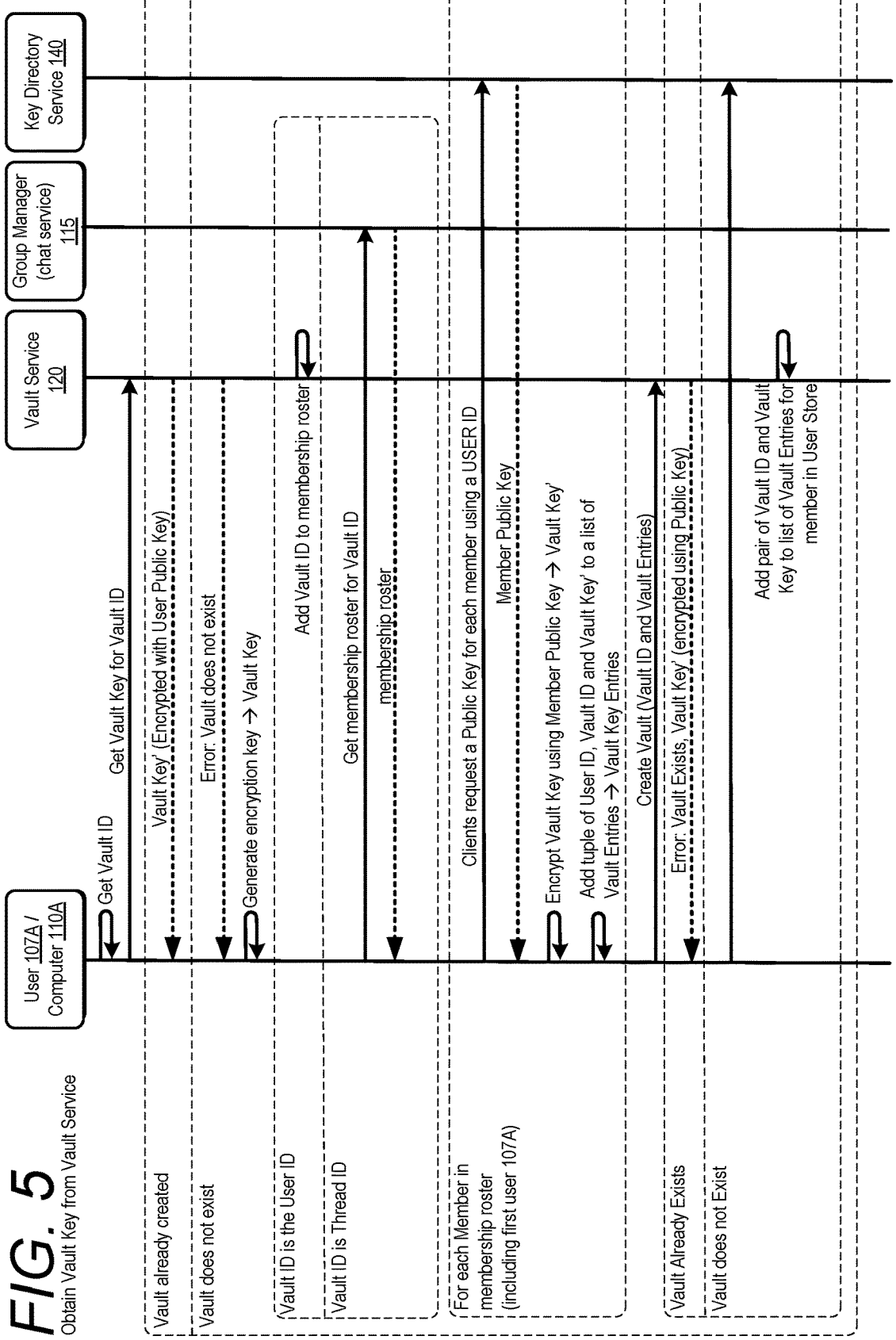
FIG. 5 is a flow diagram illustrating aspects of a process for obtaining a vault key from a vault service.

FIG. 5 illustrates a process for obtaining a vault key for a particular vault. When a vault key is requested, the vault service, e.g., the server 120, will return the vault key, which is encrypted with the user's public token. In some configurations, the user's token is an access token which is obtained by the client when a user logs in with their credentials, which may include Microsoft Account (MSA) or Azure Active Directory account (AAD) credentials. The token contains the user's ID and when validated can be trusted as representing the user's consent to undertake an action. If a vault has not already been provisioned, the vault service 129 can return an error and the vault SDK can generate a key, such as an AES-256 key, and encrypt it for each of the members of the group. Timing can impact the process. For instance, when the client 110 requests for a vault to be created, the vault service, e.g., the server 120, can either create the vault or if another client created the vault, then the server will return the encrypted vault key for the requestor.

This example is provided for illustrative purposes and is not to be construed as limiting. It can be appreciated that each system, including the server 120 or the group manager 115, e.g. the chat service 115, can utilize one or more techniques to authenticate users on each system, e.g., each system may use different authentication services and/or different credentials for each user. In some configurations, the server 120 can utilize an authentication process that is independent of the group manager 115. Alternatively, the server 120 can utilize an authentication process that is coordinated with the group manager 115, e.g., each system may use the same authentication services or credentials of each user. In some configurations, the group manager may not utilize credentials for some group members, particularly in configurations where users can join a group anonymously.

For illustrative purposes, personal vaults can simply include a group with a single member and the rest of the logic and select portions of the data is shared. The Vault ID for the personal vault is the User ID while the Vault ID for the Group Vault can be the Thread ID of a group communication session. When the vault has not yet been provisioned, the client 110 can poll the group manger 115, e.g., a chat service, to request the membership roster in the case of a group or sets the membership roster to the current user's ID in the case of a personal vault. In either case, the client 110 can then iterate through the membership roster and encrypt the Vault Key using each member's public key. The set of tuples of User ID, Vault ID, and encrypted vault keys (Encrypted Vault Keys') are then sent to the vault service 120 to create a vault. If the vault still does not exist, then the vault service 120 can store the data to a storage resource associated with the user, e.g., personal storage device or service. In the following diagrams, when a request is made for a vault key, it can be assumed that the vault has already been provisioned for illustrative purposes.

Figure 6:
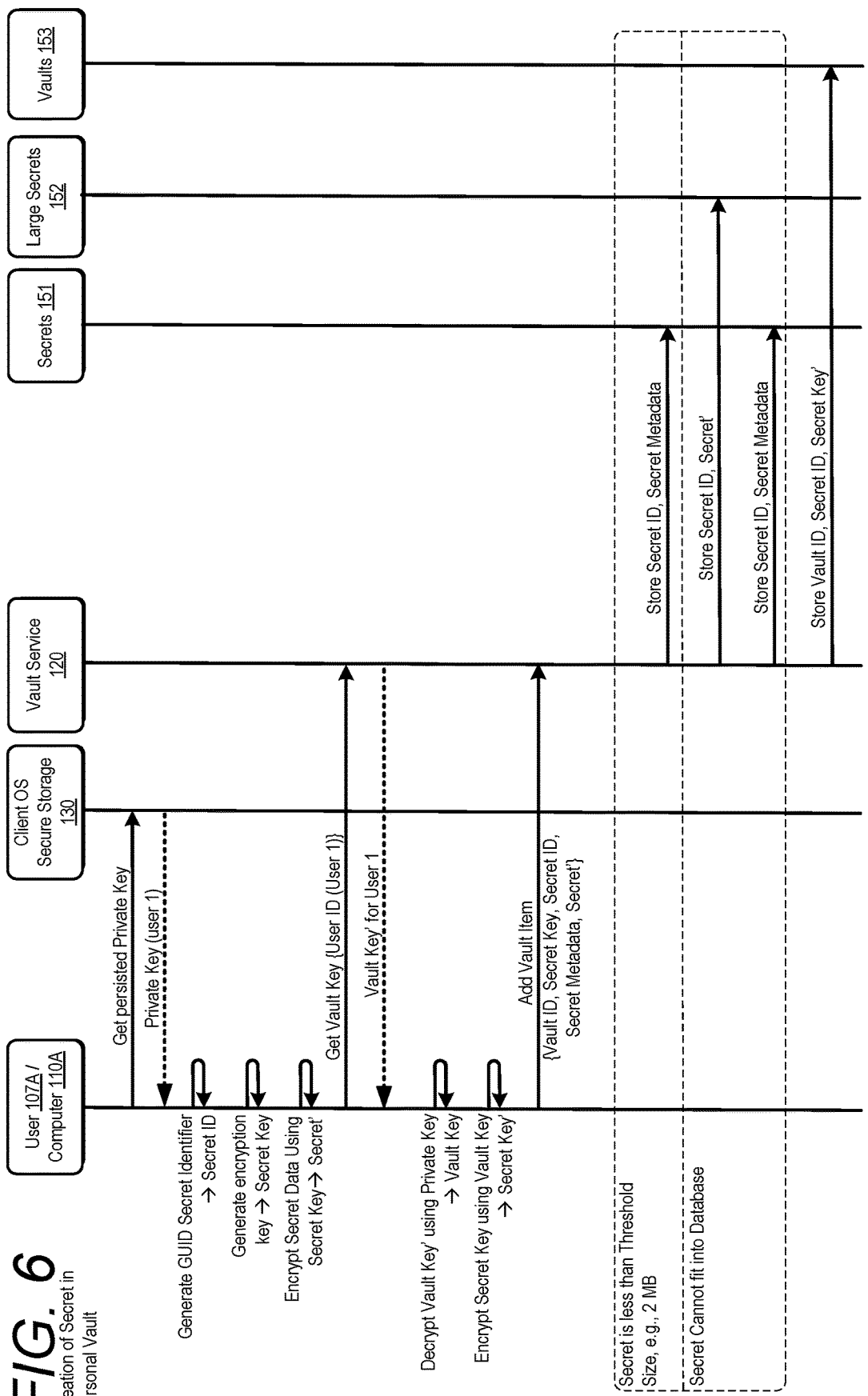
FIG. 6 is a flow diagram illustrating aspects of a process for creating secret data in a personal vault.

FIG. 6 illustrates a process for creating a secret in a personal vault. In this example, symmetric encryption, such as AES-256, is used to encrypt the secret and the encrypted secret is what is persisted to storage, such as the vault service 120. In some configurations, each secret can have its own unique secret key. The secret key may not be persisted on the client 110, rather it is encrypted using the vault key and the user only needs to use their public key to access the encrypted vault key to be able to read the chain all the way back to the secret. In that way, the personal vault is no different than a group vault. In this example, if the secret is less than a predetermined threshold, such as two megabytes, the vault service 120 can communicate the Secret ID and the secret metadata to a first resource for secrets 151. If the secret as above a threshold, or the secret cannot fit into a database, the vault service 120 can communicate the Secret ID and the encrypted secret to a second resource for large secrets 152. In some configurations, the vault service 120 can communicate the Vault ID, Secret ID, and the encrypted Secret Key (Encrypted Secret Key') to a third resource, one or more vaults 153.

Figure 7:
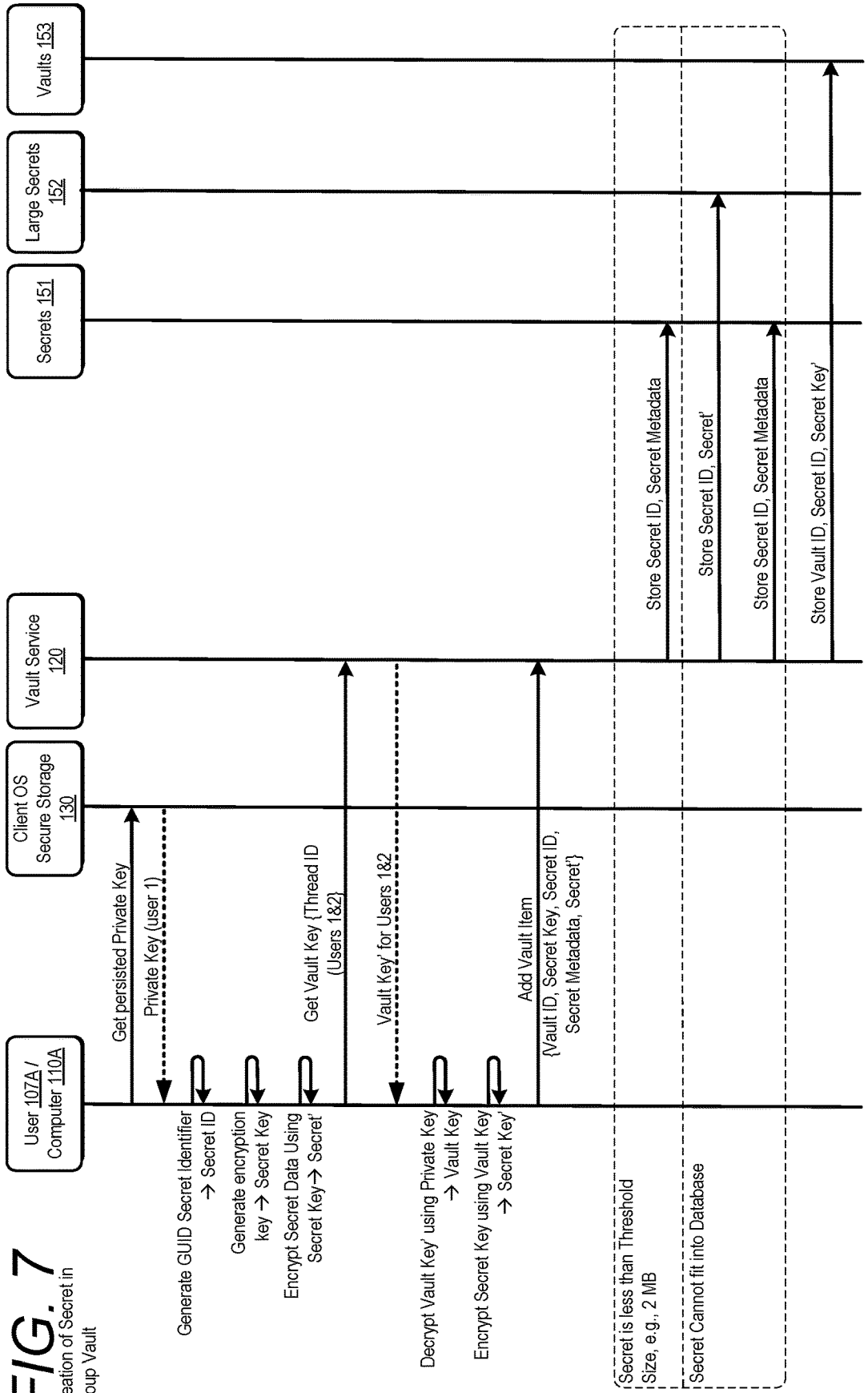
FIG. 7 is a flow diagram illustrating aspects of a process for creating secret data in a group vault.

FIG. 7 illustrates a process for creating a secret in a group vault. This example involves a first user 107A (Annika) that wants to share a secret, e.g., secret data, with a second user 107B (Bo). When Annika wants to share a secret with Bo, she encrypts the secret using a secret key, which can be a 256-bit secret key, to generate an encrypted secret. Annika also encrypts the secret key using the vault key for their shared vault and sends the encrypted secret and the encrypted secret key to the vault service 120. The difference in this example compared to the example of FIG. 6 is that the vault key is sent in association with the group's Thread ID instead of the User ID.

Figure 8:
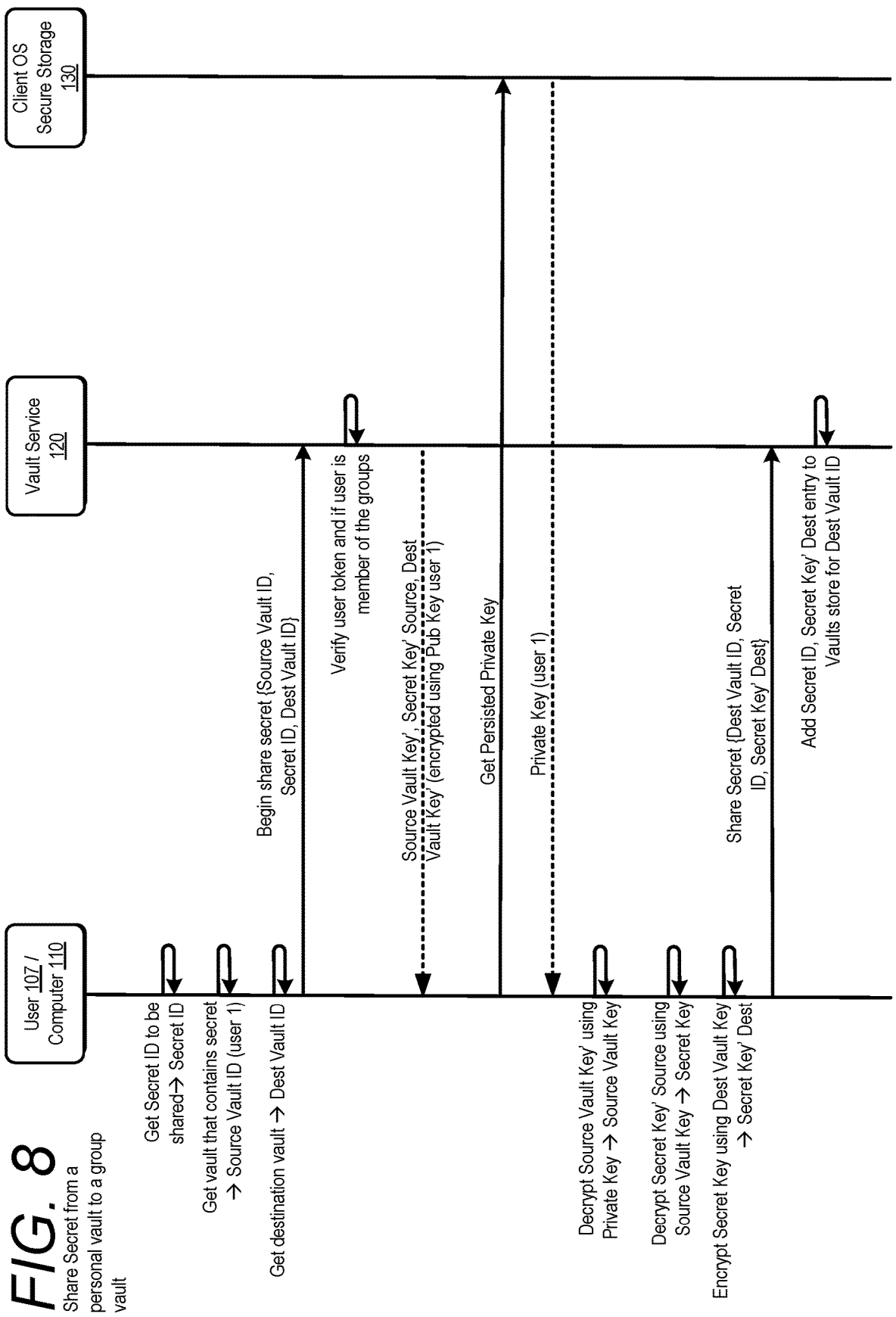
FIG. 8 is a flow diagram illustrating aspects of a process for sharing secret data from personal vault to a group vault.

FIG. 8 illustrates a process for sharing a secret from a personal vault to a group vault. In general, there are few limitations when it comes to sharing a secret between vaults. In some configurations, secrets can be shared from a personal vault to a group vault. Sharing a secret from a personal vault to a group vault can involve adding an additional record in the Vault store, however that can require a secret key. Since a server may not store unencrypted keys, a client computer 110 can open the encrypted secret key using his or her personal vault's private key and then re-encrypt it using the group vault's key. At the client 110 a secret ID can be obtained along with a Source Vault ID and a Destination Vault ID. Such information can be provided by the user 107 or any other computing resource. This data is then shared with the vault service 120, where the user's token is verified. This verification process may involve sending a query to a group manager, such as a chat service, and receiving a verification from the group manager indicating that a user is a member of a particular group. The server 120 can return an encrypted source vault key, and encrypted secret key for the source vault, and an encrypted destination vault key, which is encrypted using the public key of a user 107. The client 110 may request a private key from the client OS secure storage 130.

The client 110 can then decrypt the source vault key using the private key, decrypt the secret key for the source using the source vault key, and encrypt the secret key using the destination vault key. The client 110 can then share the secret with the vault service 120 by sharing the Destination Vault ID, Secret ID, and the encrypted Secret Key for the destination vault ("Secret Key' Destination"). The vault service 120 can then add the Secret ID, Secret Key' Destination entry to a vault for the Destination Vault ID.

Figure 9:
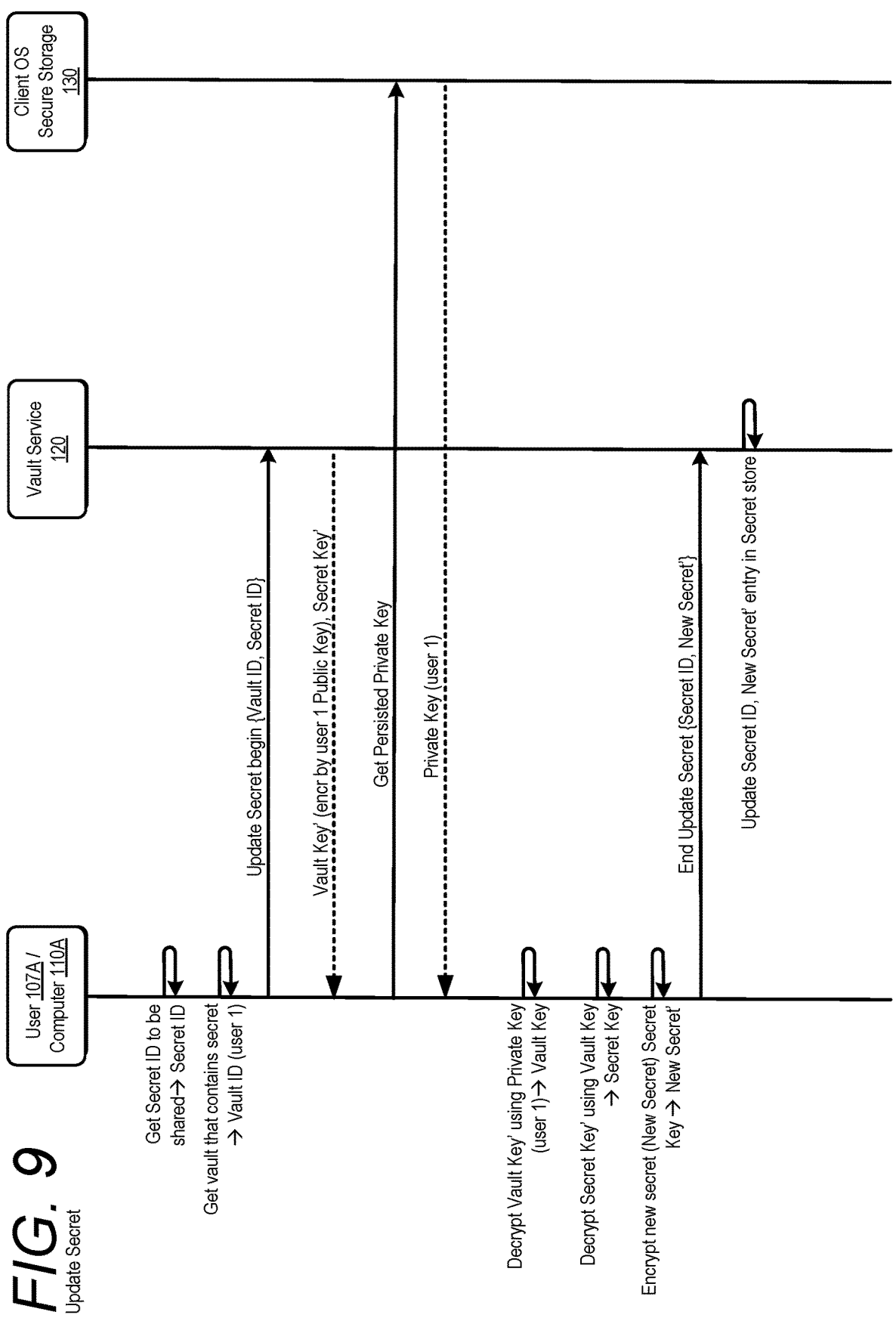
FIG. 9 is a flow diagram illustrating aspects of a process for updating secret data stored in a vault.

FIG. 9 illustrates a process for updating a secret. In some configurations, users can only update secrets that they own. A user owns a secret if they are a member of a group identified by a Thread ID that owns the vault for shared vaults or if the secret is in their personal vault. In such embodiments, both the client 110 and the server 120 can be configured to enforce this constraint.

When Annika wants to change the contents of a secret she owns, she simply replaces the secret with a new secret that has also been encrypted using the same secret key. To get the secret key to encrypt the new secret with, she must follow the process to retrieve a secret. Since the change is limited to the actual payload, there is no need to update Bo's encrypted secret key.

Figure 10:
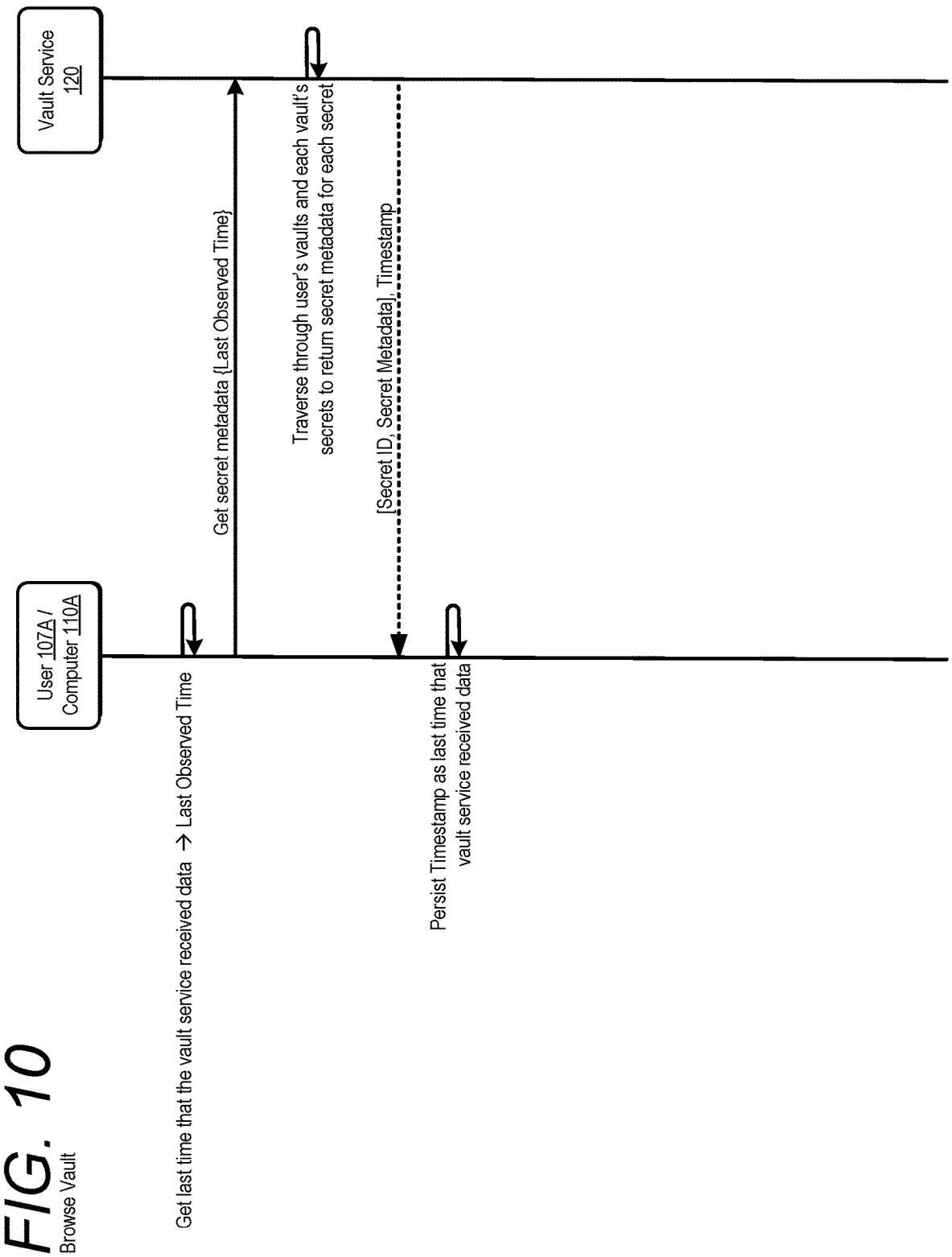
FIG. 10 is a flow diagram illustrating aspects of a process allowing users to browse data stored in a vault.

FIG. 10 illustrates an example process for allowing users to browse a vault. Generally described, the client 110 can receive updates to the secret metadata by requesting all the secret metadata changes since a given timestamp. The timestamp may be from the last time that the vault service received data, e.g., the last observed time. In response to the request, the vault service 120 can traverse through the user's vaults and each of the vault secrets. Vault service 120 can then return secret metadata and a Secret ID for each secret. The return value returns the current timestamp that can then be stored and used the next time a request is made. Sorting or filtering the secrets can be performed by the client 110. In some embodiments, the client 110 can use a filter by type or by vault. The secret metadata can provide summaries of the secret data, owners of the secret data, descriptions of the owners of the secret data, etc.

Figure 11:
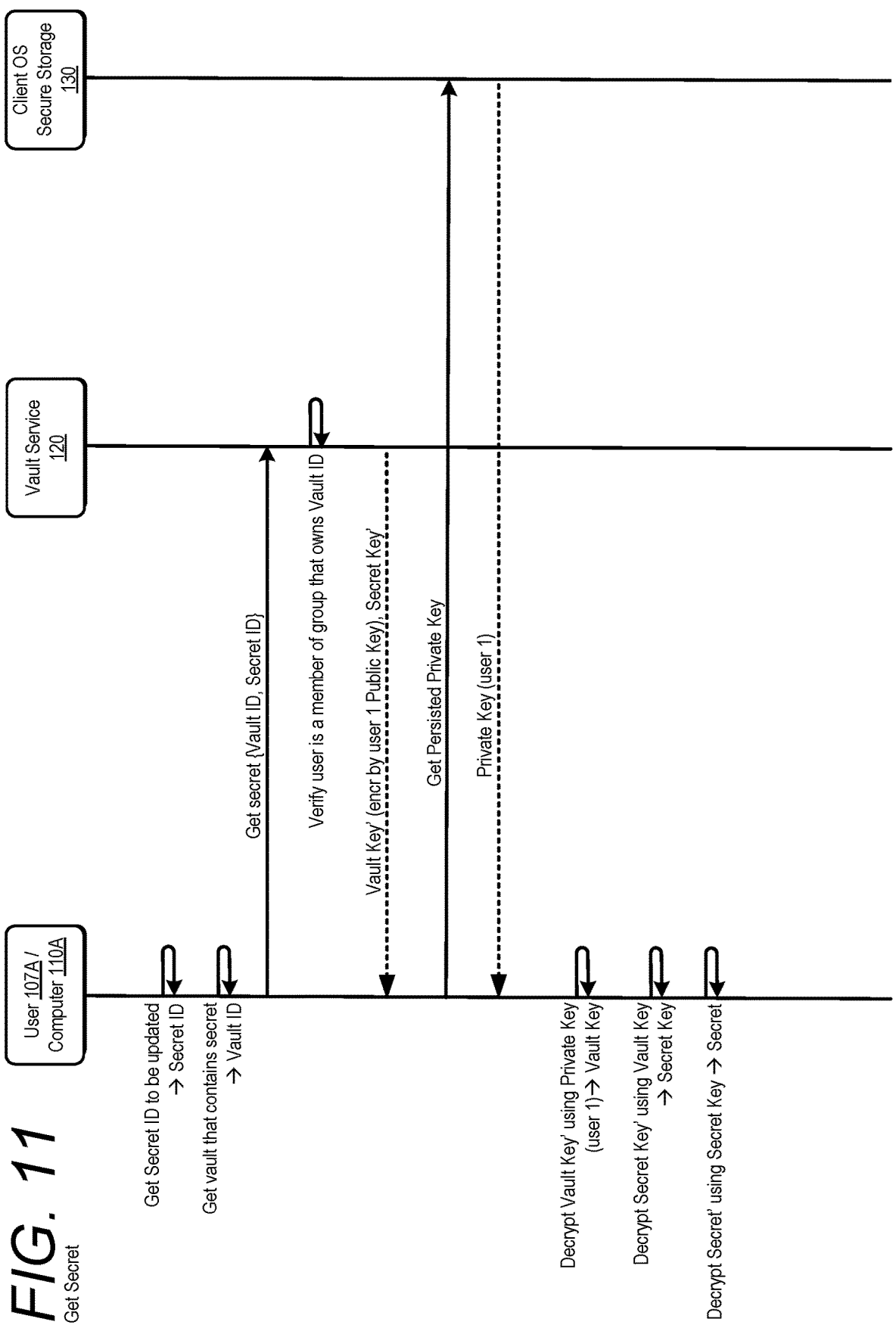
FIG. 11 is a flow diagram illustrating aspects of a process for obtaining secret data from a vault service.

FIG. 11 illustrates an example process for obtaining a secret. Generally described, when a user has identified a secret of interest by reading the metadata, the secret can be requested from the vault service. In some embodiments, the metadata can comprise a summary of the secret, related keywords, or any other information related to, or indicating, the secret. In some embodiments, the metadata may include timestamps, descriptions of user activity, etc.

The process illustrated in FIG. 11 can include operations for receiving a Secret ID to be updated and receiving an identifier of a vault that contains the secret, e.g. a Vault ID. The Secret ID and the Vault ID can be communicated to the vault service 120 within the request. In response, the vault service 120 verifies that the user is a member of the group. This process may involve communication with the group manager, such as Slack, MS Teams, etc. the vault service 120 can respond to the request by delivering an encrypted vault key, which may be encrypted using a public key of a user, and an encrypted secret key. In some configurations, the client 110 can send a request to the client OS secure storage 130 requesting a private key that is persistently stored. In response to receiving the private key, the client 110 can decrypt the encrypted vault key using a private key of the user and decrypt the encrypted secret key using the vault key. The system may also decrypt the encrypted secret using the secret key thereby generating the secret data.

Figure 12:
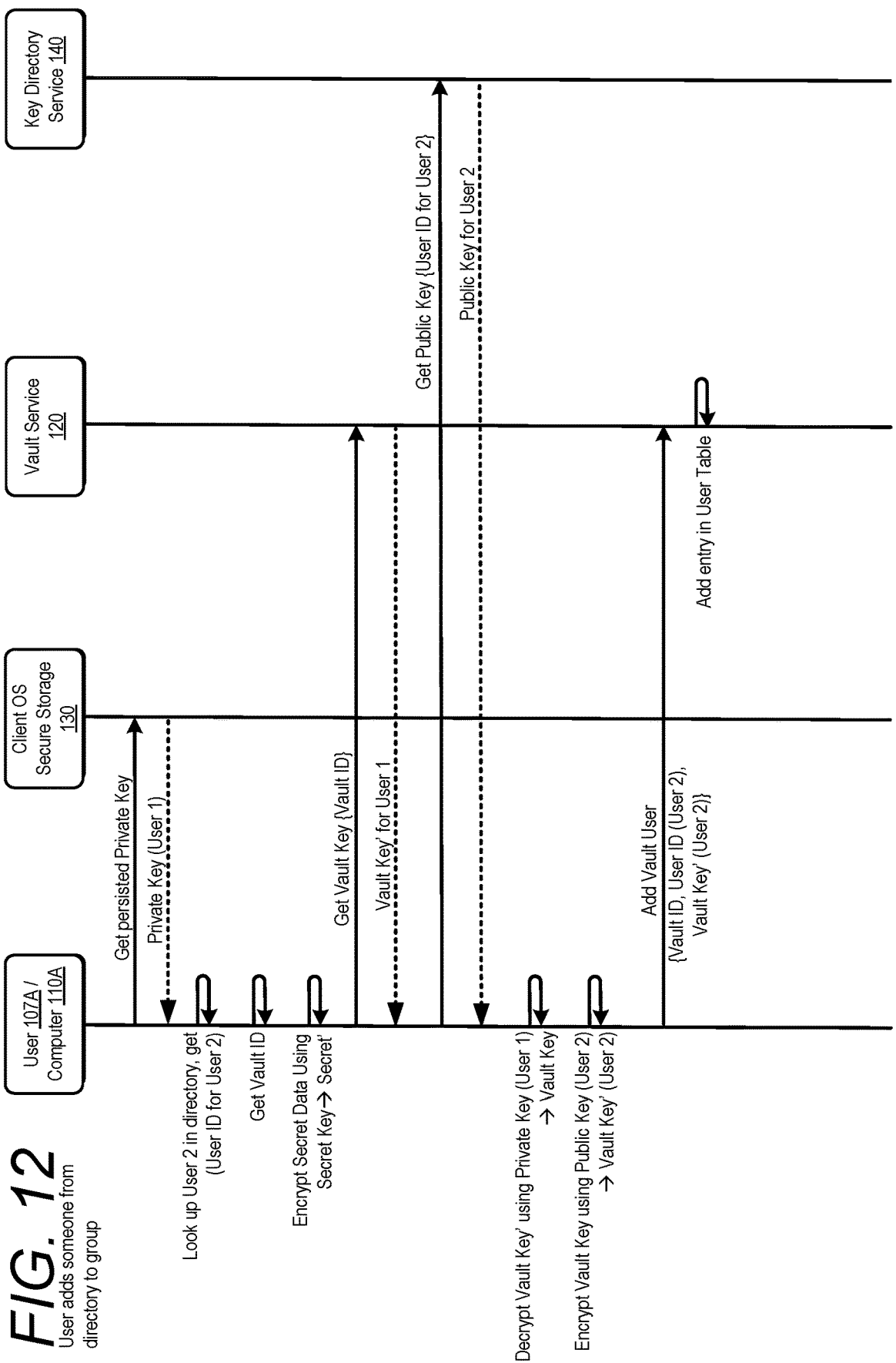
FIG. 12 is a flow diagram illustrating aspects of a process for adding users to a group associated with a vault.

FIG. 12 illustrates a process for allowing a user to add someone from a directory to a group. When a user adds a new member to a group, the new member will need to have the vault key encrypted with her public token so that the secrets can be decrypted. The vault service does not have data regarding the vault key so the vault service cannot automatically provision the new member with the key. The user who is adding the new member can get the vault key, so as part of adding a new member to a group, one or more clients 110 can also add the new member to the vault.

The process starts when a client requests a private key for a particular user, such as the first user. The client 110 can look up a second user in a directory and obtain a user ID of the second user. The client 110 can also obtain the Vault ID and encrypt one or more secrets using a secret key. The client 110 can send a request to the vault service 120 to obtain an encrypted vault key, which may be encrypted using the first users public key. A public key for the new user, e.g. the second user, can be obtained by the client by one or more resources such as a key service 140. The client 110 can then decrypt the encrypted vault key using the private key of the first user. The client 110 can then encrypt the vault key using the public key of the second user. The client 110 can then communicate the encrypted vault key, which is encrypted by the second users public key, to the vault service 120. In such a communication, the client 110 can also communicate the vault ID, the user ID of the second user with the encrypted vault key. In response, the vault service 120 can add an entry to the user table.

Figure 13:
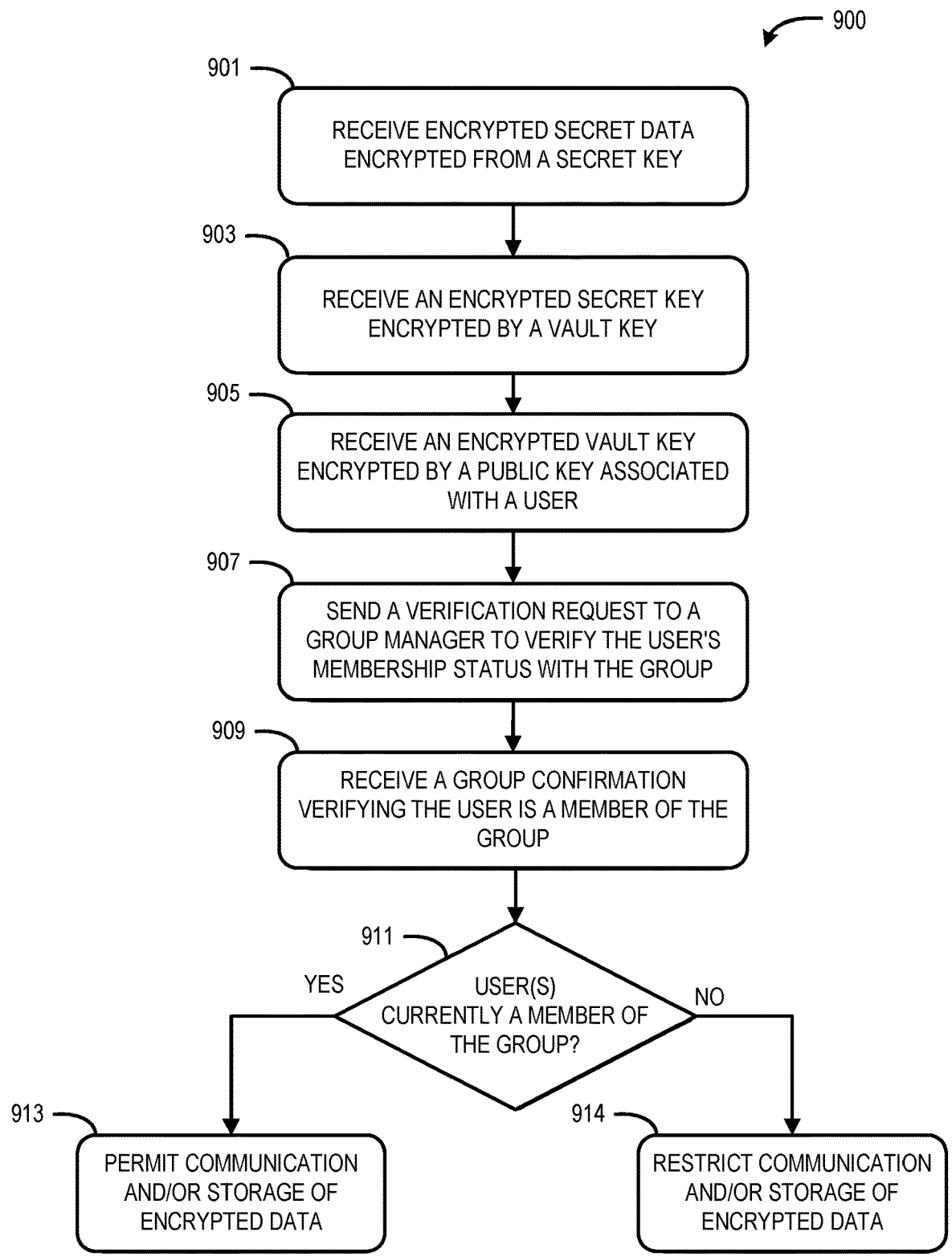
FIG. 13 is a process flow diagram illustrating aspects of a process for storing secret data in a vault and adding users to a group associated with the vault.

Turning now to FIG. 13, aspects of a routine 900 for providing enhanced security for encrypted data are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with the other figures, the operations of the routine 900 are described herein as being implemented, at least in part, by an application, such as the program module 623 of FIG. 19, which is also referred to herein as one or more program modules. Although the following illustration refers to the program module 623, it can be appreciated that the operations of the routine 900, or any other processes, methods or operations disclosed herein, may be also implemented in many other ways. For example, the routine 900 may be implemented as part of an operating system or as part of any other application. In addition, it can be appreciated that implementations of the system 100 may include more or fewer computing devices shown in FIG. 1. For instance, each of the software components and modules described above may be implemented in a single computing device configured with the same features. In other scenarios, some of which may include the use of a server farm, any number of computing devices may be used to implement the features and techniques described herein.

With reference to FIG. 13, the routine 900 begins at operation 901, where the program module 623 receives encrypted secret data 101A' generated from the secret data 101A using a secret key 102A. In some configurations, the encrypted secret data 101A' is generated on a remote computer, such as a client device 110 and communicated to a computer, e.g., the server 120, executing the program module 623.

At operation 903, the program module 623 receives an encrypted secret key 102A' generated from the secret key 102A by the use of a vault key 104 that is associated with a group 111 of users 107. In some configurations, the encrypted secret key 102A' is generated on a remote computer, such as a client device 110 and communicated to a computer, e.g., the server 120, executing the program module 623.

At operation 905, the program module 623 receives an encrypted vault key 104' generated from the vault key 104 by the use of a public key 105A associated with a first user 107A of the group 111 of users 107. In some configurations, the encrypted vault key 104' is generated on a remote computer, such as a client device 110 and communicated to a computer, e.g., the server 120, executing the program module 623.

At operation 907, the program module 623 sends a verification request to a group manager 115 to verify if one or more users are current members of the group 111. In some configurations, the verification request can include a Group ID and at least one User ID, e.g., the first user 107A. The verification request can be sent to a group manager 115 managing a service such as Slack, Google Hangouts, or Microsoft Teams.

Next, at operation 909, the program module 623 receives a confirmation from the group manager 115 indicating a membership status of one or more users. In one illustrative example, a confirmation can include a Group ID and a membership status of at least one User ID, e.g., that the first user 107A is current member, or that the first user 107A is not a current member. The confirmation can also include one or more permissions for each user. For instance, a confirmation (also referred to herein as a group confirmation 122) can include a User ID and indicate whether that user ID is associated with read and/or write permissions. The confirmation can also describe roles or other attributes associated with individual User IDs. In one illustrative example, with reference to FIG. 1, a computing device can receive group confirmation 122 from the group management system 115, and the group confirmation 122 can indicate a status of the first user 107 and one or more group identifiers 112.

Next, at operation 911, in response to receiving a group confirmation 112 indicating that a user, such as the first user 107A, is associated with a particular group, the routine 900 proceeds to operation 913 where the program module 623 can take a number of actions to permit the communication and/or storage of the encrypted data, e.g., the encrypted secret data 101A', encrypted secret key 102A', and the encrypted vault key 104'. However, if the group confirmation 112 indicates that a user, such as the first user 107A, is not associated with a particular group, the routine 900 proceeds to operation 914 where the program module 623 can take a number of actions to restrict the communication and/or storage of the encrypted data, e.g., the encrypted secret data 101A', encrypted secret key 102A', and the encrypted vault key 104'.

Referring now to FIGS. 14-18, techniques for controlling updates to the encryption keys of the system 100 is shown and described in more detail below. Generally described, updates to one or more encryption keys are invoked when specific types of activity with respect to a user group meets one or more criteria. For example, the system 100 can cause one or more client computers to update to one or more keys when a size of a user group exceeds or drops below one or more thresholds. The system 100 can cause one or more client computers to update to one or more keys when an attrition rate exceeds or drops below one or more thresholds. The system 100 can cause one or more client computers to update to one or more keys when the system detects one or more keys exceeding an age threshold. The system 100 can cause one or more client computers to update to one or more keys when stored data or data usage exceeds or drops below one or more thresholds. For illustrative purposes, FIG. 14 through FIG. 18 show aspects of a process for managing updates for one or more encryption keys based on user activity of a group vault storage system.

Figure 14:
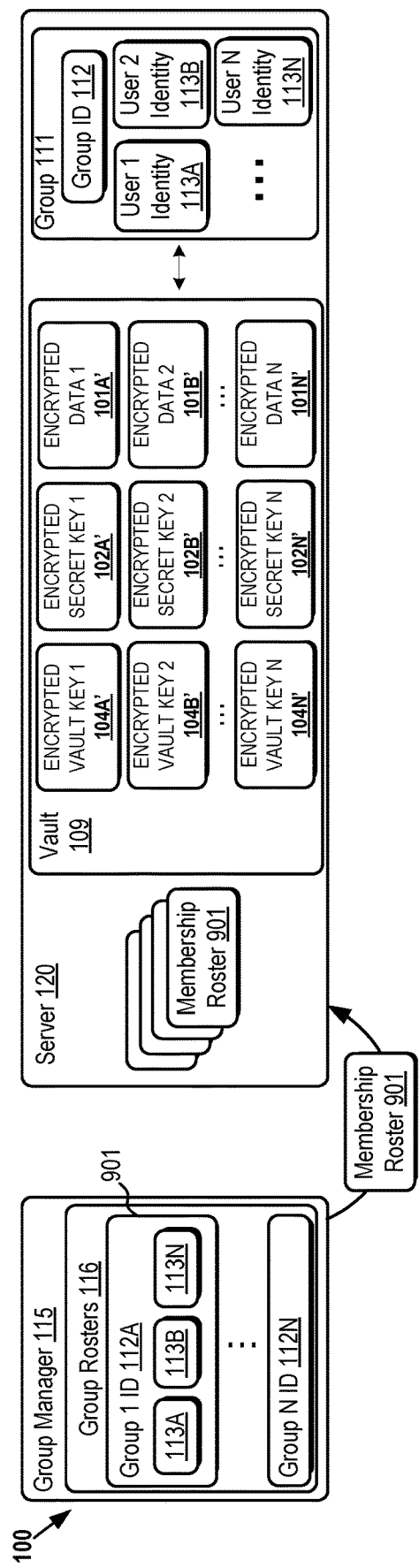
FIG. 14 is a block diagram showing aspects of a process for obtaining activity data for controlling key updates for a group vault storage system.

As shown in FIG. 14, a group manager 115 can maintain a membership roster 901 listing identities 113 of members of a group 111 of users. An individual membership roster 901 can list users who are participating in a communication session, such as a channel, chat session, meeting, or any other collaborative group activity used to exchange information. Users can be added or removed from a particular roster by joining or leaving a group, such as a channel, a meeting, etc. In some configurations, the group manager 115 can communicate an instance of a membership roster 901 or updates to a membership roster 901 to the server 120. Over time, the server 120 can collect and analyze a number of membership rosters 901 to detect the existence of one or more predetermined patterns of user activity.

Figure 15:
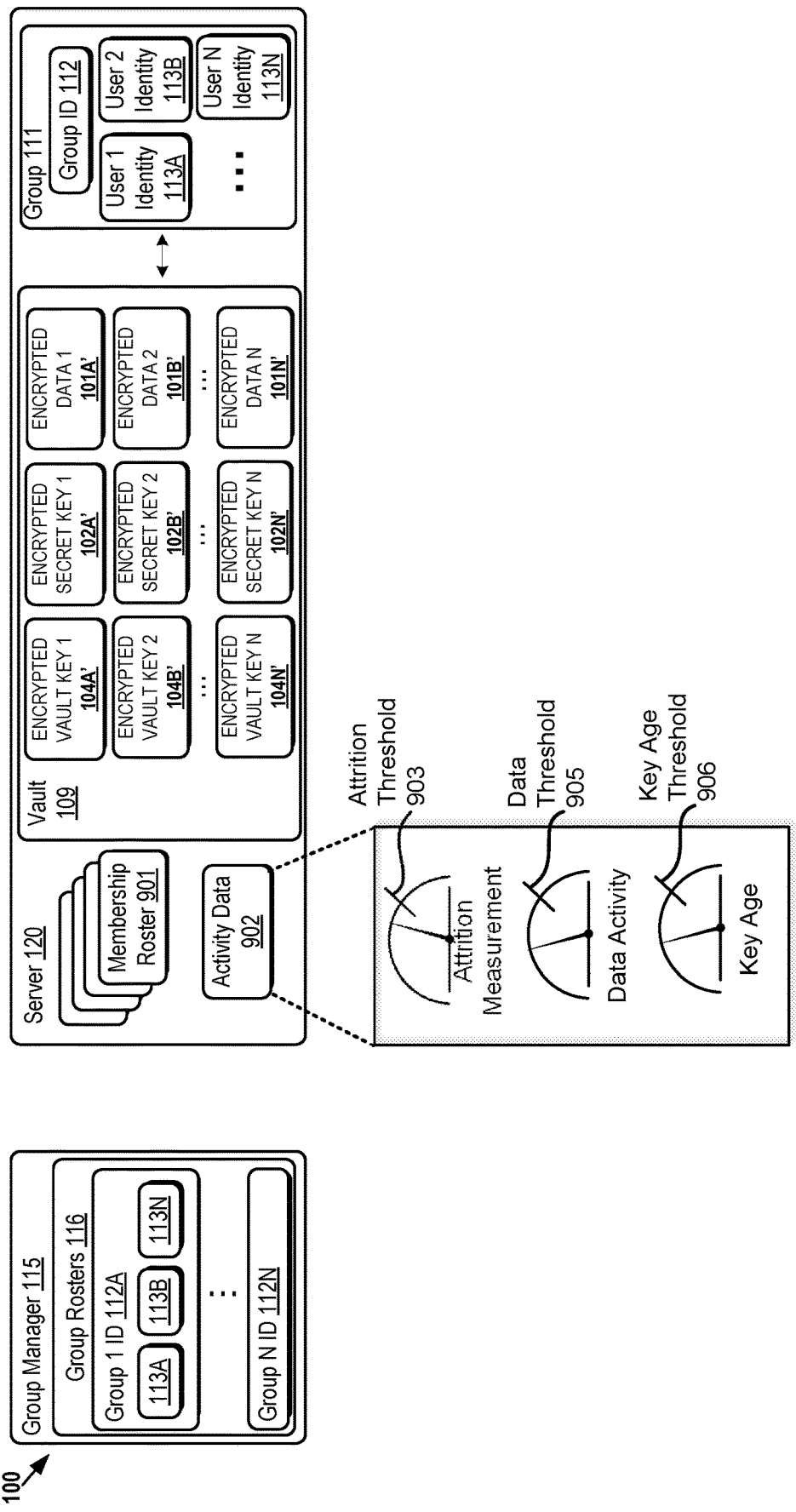
FIG. 15 is a block diagram showing aspects of activity data that can be used for controlling key updates for a group vault storage system.

As shown in FIG. 15, the server 120 can generate activity data 902 based on the analysis of one or more membership rosters 901 received over time to determine a number of different types of performance metrics. The performance metrics can include user attrition measurements, such as a number of users who have joined or left a group, a total number of members of a group, fluctuations in attrition rates, etc. The server 120 can also measure data usage parameters for individual groups, such as an amount of data shared by a group, fluctuations in the amount of data shared by a group, etc. In addition, the server 120 can measure different parameters with respect to an age of one or more encryption keys associated with a vault or a group of users, such as an age of a vault key, an age of a secret key, and/or an age of a public and private key pair. Combinations of performance metrics can also be measured, such as the amount of data shared by a group and an age of a particular key, the amount of user attrition measured for a group and an age of a particular key, an amount of data shared by a group and a number of users who have joined or left a group, etc.

Figure 16A:
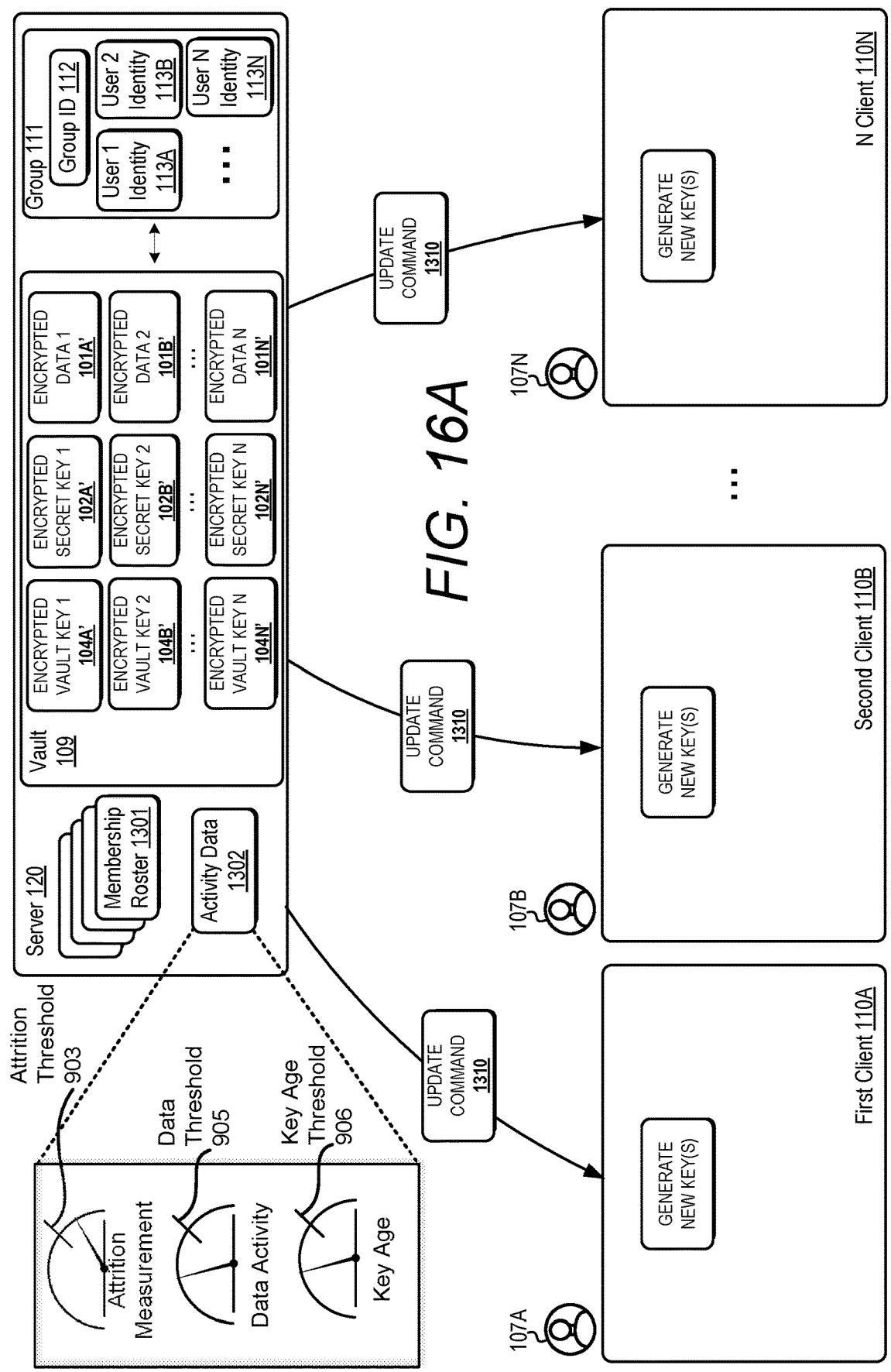
FIG. 16A is a block diagram showing aspects of a process for controlling key updates to be executed by a number of client computing devices.
Figure 16B:
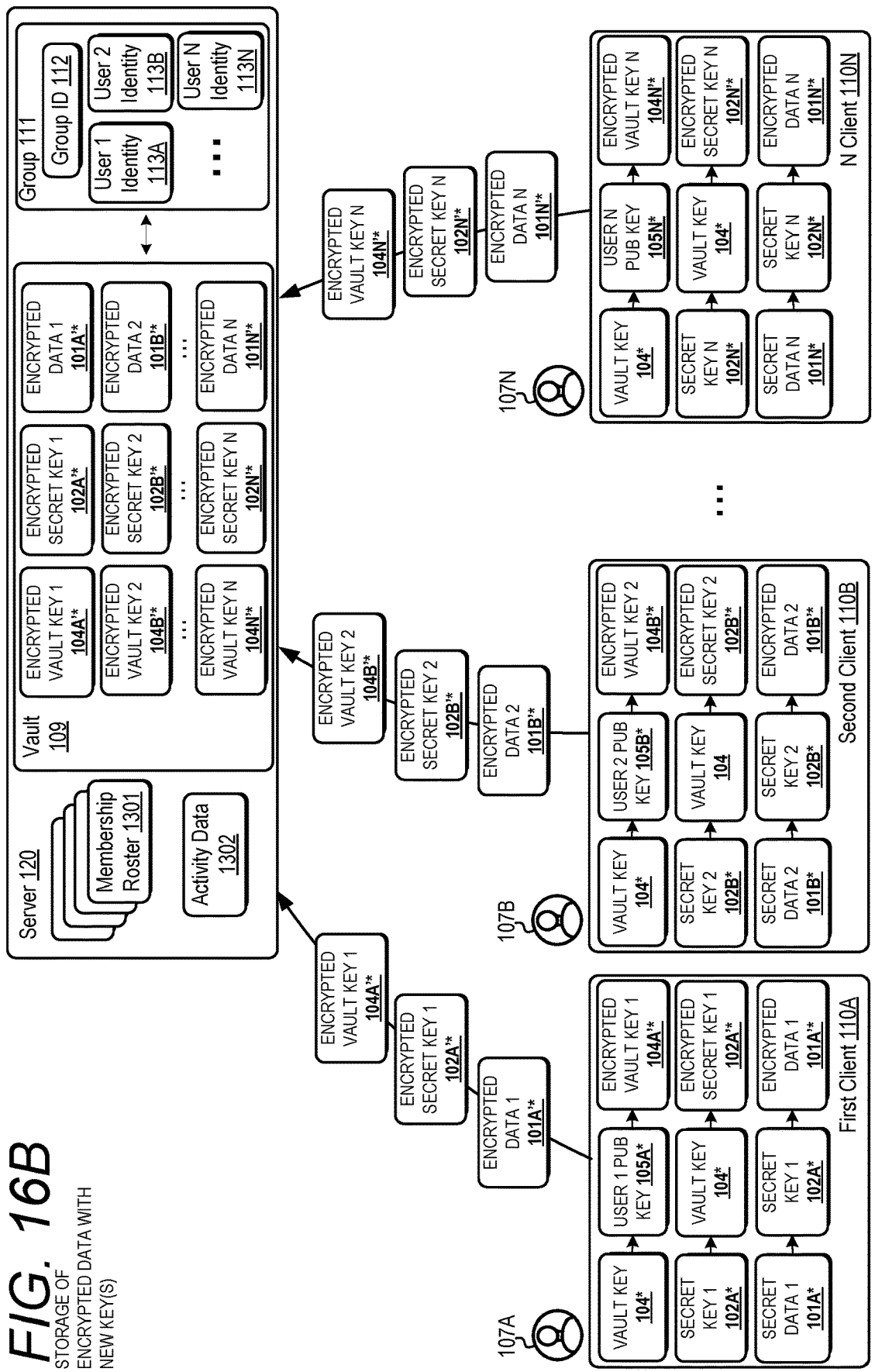
FIG. 16B is a block diagram showing aspects of a process for receiving data that is encrypted using updated keys.

In the example of FIG. 15, when one or more measurements are below one or more thresholds, e.g., an attrition threshold 903, a data activity threshold 905, and/or a key age threshold 906, the system may continue to monitor the activity data 902 without sending any update commands for updating one or more keys at a client device 110. However, as shown in FIG. 16A, when one or more of the measurements exceeds one or more thresholds, the sever 120 may communicate one or more updated commands 1310 to the client devices 110. In response to the update command 1310, as shown in FIG. 16B, a client device 110 can replace any existing key or any combination of existing keys with new keys. For instance, an update command 1310 can cause a client device 110 to update a secret key and/or a private-public key pair. In some configurations, a vault key for a particular group may be generated at the sever 120 and communicated to a client device 110. In some configurations, a vault key may be generated at a client device 110 in response to receiving an update command 1310. In such embodiments, one client device could generate a vault key, and other devices would receive a copy of the newly generated vault key via the server 120.

In some configurations, a single client device or a selected group of client devices can be selected to update one or more keys. The selection of devices used for updating one or more keys can be based on roles or permissions for each member, activity of a particular client device and/or hardware capabilities of a particular client device. For instance, if a user is a designated administrator for a group, that user and/or that user's corresponding device can be selected to update one or more keys. In some configurations, client devices can communicate with one another on a peer-to-peer basis and/or with the server to determine which device is to update one or more keys. The devices can be selected based on activity of a device and/or one or more capabilities of individual devices. For instance, if it is determined that a particular computing device remains online for a period of time versus other devices of a pool of devices, that particular computing device can be selected to update one or more keys. In another example, if it is determined that a particular computing device has an architecture that is more efficient at updating one or more keys or encrypting data, e.g., a desktop having a particular processor versus a mobile device having a low-power processor, that particular computing device can be selected over a pool of other candidate devices.

In the example shown in FIG. 16B, the update command 1310 causes each client device to update all of the keys for each client device. For illustrative purposes, drawing numbers noted with an asterisk notes a new key and drawing numbers noted with an apostrophe indicates encrypted data.

For example, the first device 110A can replace a vault key 104A and a secret key 102A with a new vault key 104A* and a new secret key 102A*. The update command 1310 can also cause the first client device 110A to encrypt secret data 101A using the new secret key 102A* to generate updated encrypted secret data 101A'*. The update command 1310 can also cause the first client device 110A to encrypt the new secret key 102A* using the new vault key 104A* to generate an updated encrypted secret key 102A'*. The update command 1310 can also cause the first client device 110A to encrypt the new vault key 104A* using a new public key 105A* to generate an updated encrypted vault key 104A'*.

This example is provided for illustrative purposes and is not to be construed as limiting. It can be appreciated that any combination of encryption keys can be replaced with new encryption keys, and in some embodiments, a client device can use any existing key in the aforementioned process. For example, an update command 1310 can cause the first client device 110A to encrypt the new vault key 104A* using an existing public key 105A to generate an updated encrypted vault key 104A'*.

Once the client devices 110 generate the updated keys and the newly encrypted data, e.g., the updated encrypted secret data 101A'*, the updated encrypted secret key 102A'*, and the updated encrypted vault key 104A'*, the newly encrypted data can be communicated to the server 120 for storage in a vault 109 associated with a group identifier 112, and ultimately a number of user identities 113 associated with the group 111. The process can also be repeated for each client device 110 that is associated with a user 107 that is a member of the group 109.

Figure 17C:
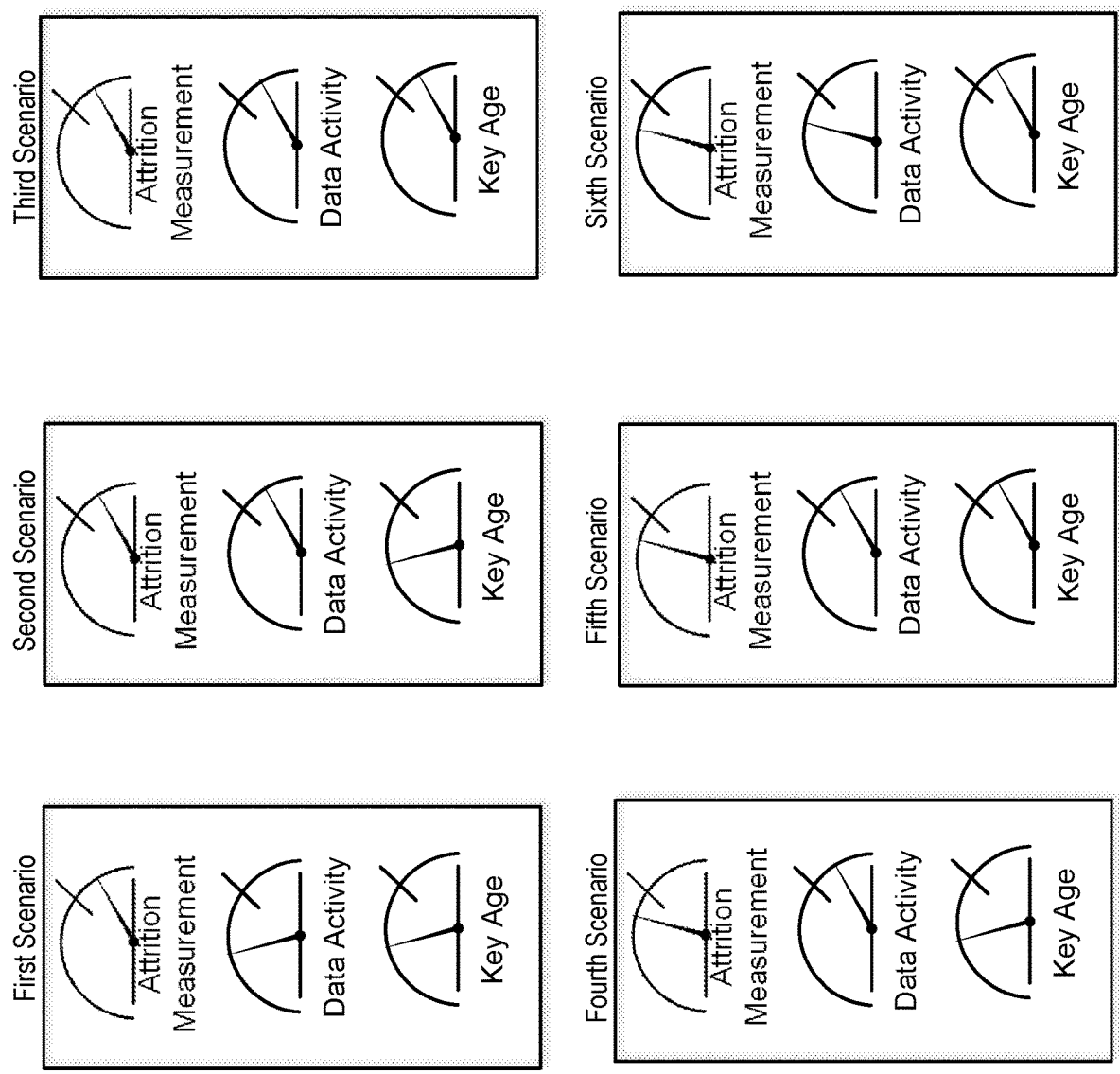
FIG. 17C shows aspects of activity data having other characteristics that cause a computing device to control one or more key updates.

FIGS. 17A-17C illustrate a number of example scenarios where certain patterns of user activity 1302 causes an update of one or more encryption keys of a vault storage system. In the first example shown in FIG. 17A, a roster trend shows a number of members leaving a group over time. In this example, a number of measurements are taken over a period of time. When a measurement, such as the measurement at the fifth sample, exceeds a threshold 1303, the sever 120 can communicate an update command causing one or more client devices to update one more encryption keys for storage on the sever 120. In the second example shown in FIG. 17A, a roster trend shows a total number of members of a group over time. In this example, a number of measurements are taken over a period of time. When a measurement, such as the measurement at the fourth sample, exceeds a threshold 1303, the sever 120 can communicate an update command causing one or more client devices to update one or more keys for storage on the sever 120.

In the first example shown in FIG. 17B, a roster trend shows a number of members joining a group over time. In this example, a number of measurements are taken over a period of time. When one or more measurements, such as the measurements at the second and fifth samples, exceed a threshold 1303, the sever 120 can communicate an update command causing one or more client devices to update one or more encryption keys for storage on the sever 120.

In the second example shown in FIG. 17B, a roster trend shows a rate of change of a membership roster, e.g., a derivative of the total number of members of a group over time. In this example, a number of measurements are taken over a period of time. When a measurement exceeds a threshold 1303, e.g., at time A, or when a measurement drops below the threshold, e.g., at time C, the sever 120 can communicate an update command causing one or more client devices to update one more keys for storage on the sever 120.

These examples are provided for illustrator purposes and is not be construed as limiting. It can be appreciated that other variations to these techniques applied to the scope of the presence closure. For instance, although the thresholds 1303 are shown as a constant over time, it can be appreciated that the thresholds 1303 can vary over time. Francis, a threshold may be lower during peak hours of a system vs a threshold during nonpeak hours. In yet another variation, the server may also communicate an update command when a rate of change meets one or more conditions. For example, at time B in the second chart of FIG. 17B, the system may identify a particular slope, or a particular change in slope, to be a triggering event for an update command to be communicated to one or more client devices.

FIG. 17C illustrates a number of scenarios that may cause the server 120 to communicate an update command to a client device. For example, in the first scenario, an update command may be communicated to a client device in response to determining that an attrition measurement exceeds a threshold, a data usage activity measurement does not meet a threshold, and a key age does not meet a threshold. In the second scenario, an update command may be communicated to a client device in response to determining that an attrition measurement exceeds a threshold, a data usage activity measurement exceeds a threshold, and a key age does not meet a threshold. In the third scenario, an update command may be communicated to a client device in response to determining that an attrition measurement exceeds a threshold, a data usage activity measurement exceeds a threshold, and a key age exceeds a threshold. In the fourth scenario, an update command may be communicated to a client device in response to determining that an attrition measurement does not exceed a threshold, a data usage activity measurement exceeds a threshold, and a key age does not meet a threshold. In a fifth scenario, an update command may be communicated to a client device in response to determining that an attrition measurement does not exceed a threshold, a data usage activity measurement exceeds a threshold, and a key age exceeds meet a threshold. In a sixth scenario, an update command may be communicated to a client device in response to determining that an attrition measurement does not exceed a threshold, a data usage activity measurement does not exceed a threshold, and a key age meets a threshold.

Figure 18:
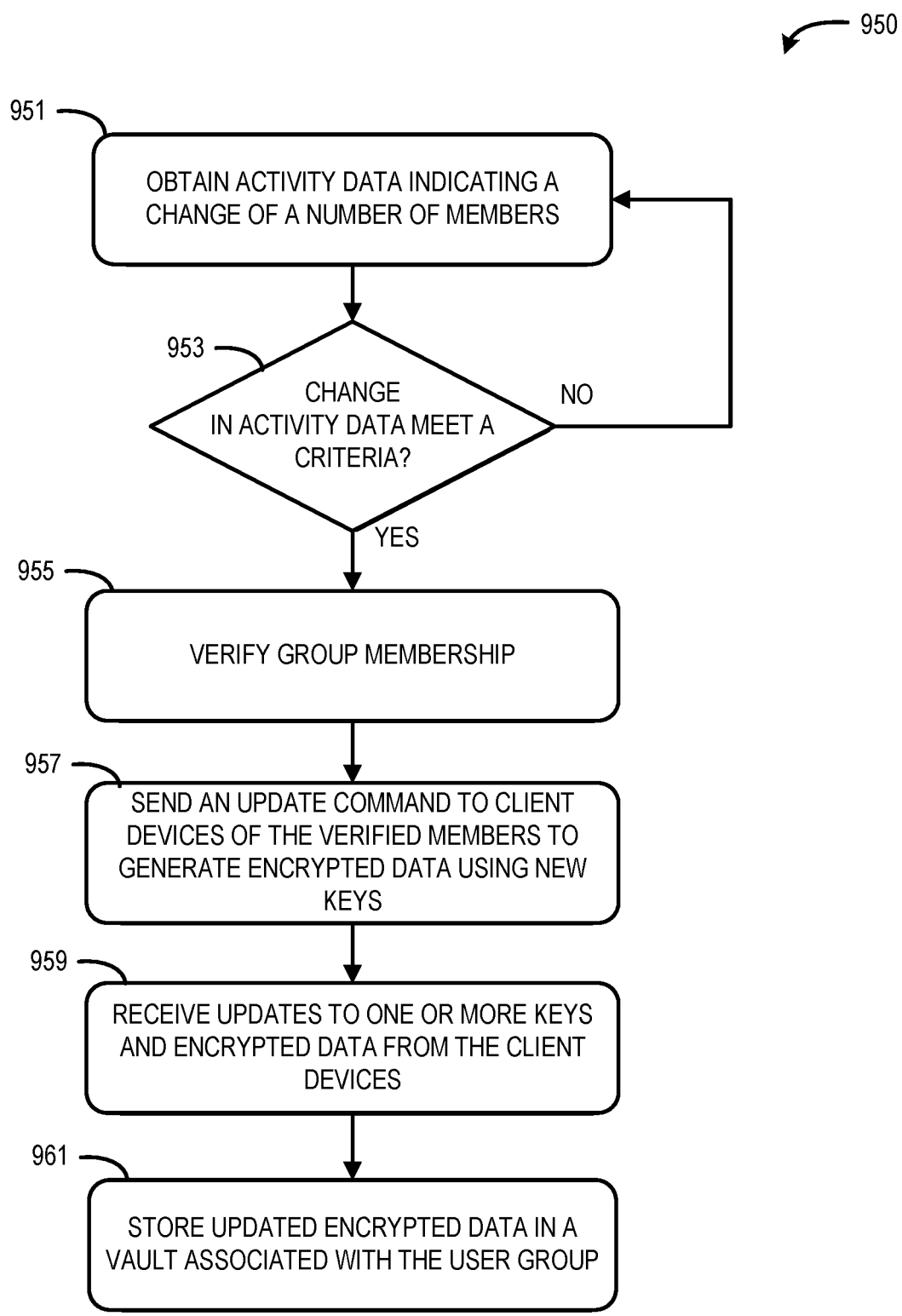
FIG. 18 is a process flow diagram illustrating aspects of a process for updating one or more encryption keys based on activity of a user group.

Turning now to FIG. 18, aspects of a routine 950 for controlling updates to the encryption keys are shown and described below. The routine 950 begins at operation 951 where one or more program modules receives activity data indicating a change with respect to a number of members of a group. The activity data can be generated by a computing device, such as the server 120. Alternatively, the activity data can be received by remote computing device, such as the group manager. The activity data can include measurements over a period of time including, but not limited to, a change with respect to a number of members, rates in which members are leaving or joining a group, etc. The activity data can also provide measurements with respect to a quantity of data shared by a group and/or data defining and age of an encryption key utilized by the client devices and stored on the server 120.

Next, at operation 953, the one or more program modules analyzes the activity data to determine if a change in the number of members or other activity data meets one or more criteria. As described herein, one or more measurements of a change in a number of members of a group, a quantity of data shared by a group, and/or an age of a key utilized by a group can be analyzed with respect to one or more thresholds. The one or more criteria can be determined to be met when the activity data meets or exceeds the one or more thresholds.

If the change in the number of members or other activity data does not meet the one or more criteria, the routine 950 returns to operation 951 where the one or more program modules receives updated activity data. The one or more program modules can continue to monitor the updated activity data until one or more measurements defined in activity data meets the one or more criteria. When the one or more measurements defined in activity data meets the one or more criteria, the routine 950 continues to operation 955 where the one or modules verifies the group membership. In this operation, a verification request may be sent from the server 120 to the group manager 115. The group manager 115 can verify via a confirmation 122, a current list of members of a particular group.

Next, at operation 957, the one or more program modules can communicate an update command to client devices associated with each member of the group. The update command can cause each of the client devices to update one or more keys on each client device. As described herein, the update command can cause each client device to replace existing keys, such as a secret key, a key pair, and/or a vault key, for new keys. In some configurations, the server 120 can generate a vault key and communicate the vault key to each client in association with the update command. The update command can cause each client device to generate encrypted data, including an encrypted payload of secret data, an encrypted secret key, and an encrypted vault key using the one or more updated keys.

Next, at operation 959, the one or more program modules can receive the newly generated encrypted data from the client devices. In some configurations, the server 120 can receive the newly generated encrypted data, such as the encrypted payload of secret data, an encrypted secret key, and an encrypted vault key using the one or more updated keys.

Next, at operation 961, the one or more program modules can store the encrypted data in a vault associated with the user group. Prior to the storage of the received data, and some configurations, the server 120 can verify each member of a group before data is stored for each group member. For instance, if a group includes members of a Channel, the server 120 can send a verification request to the group manager 115 with an identity of a user. If the group manager 115 responds with a confirmation 122 verifying that the user is still a member of the Channel, the server 120 can store the newly encrypted data in association with the user and the group.

Referring now to FIGS. 19A-19G techniques for managing access rights for secret data shared by a group of users is shown and described below. The techniques disclosed herein allow a storage service to coordinate with a group management system, such as MS Teams or Slack, to verify membership of user groups, e.g., channels, chat session, meetings. The two systems, which may be operated by separate entities, can automatically change access rights to stored data as users leave or join a group. The techniques disclosed herein can provide a number of technical benefits that can mitigate or eliminate the need for manual tasks for removing, adding, or modifying access permissions by leveraging data that is provided by a group manager.

Figure 19A:
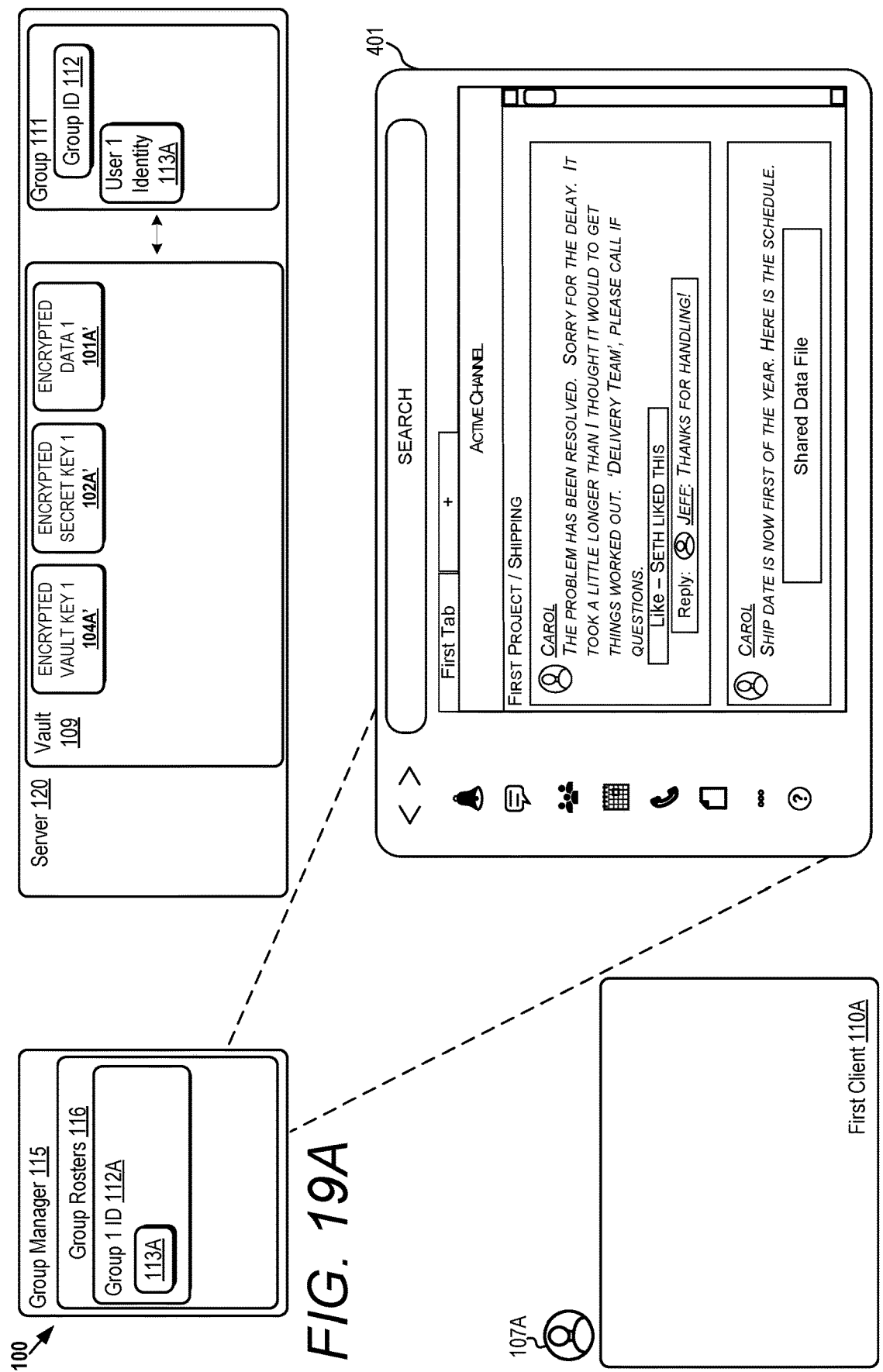
FIG. 19A is a block diagram showing aspects of a process for managing user rights on a storage system based on membership data provided by a group management system.

FIG. 19A illustrates aspects of the system 100 that allows a server 120 to control access to data stored within a vault 109 based on user activity of a group manager 115. The group manager 115 can manage a communication session between users of a group, such as a channel. For illustrative purposes, a channel includes a communication session that allows users to join public or private groups. Once a member, users can share messages and other forms of data with other members. An example user interface 401 of a channel is illustrated in FIG. 19A. In this example, the group, e.g., the channel, includes a single member 107A, Carol, who is associated with a user identity 113A, and that user identity is associated with a group ID 112A. At the server 120, the group ID is associated with a vault 109, and the user identity 113A is also associated with the group ID 112 at the server.

In this example, the server 120 also includes a vault 109 for storing encrypted data for current group members. The server 120 can control access to the vault 109 storing encrypted data, e.g., encrypted secret data 1 101A' generated by encrypting secret data 1 101A using a secret key 1 102A, an encrypted secret key 1 102A' generated by encrypting the secret key 1 102A using a vault key 104 that is associated with a user group 111, and an encrypted vault key 1 104' generated by encrypting the vault key 104 using a public key 1 105A of a first private-public key pair 157A associated with a first user 107A of the user group 111. As described in more detail below, access for individual users to the vault 109 is controlled based on a membership status with the user group 111.

Figure 19B:
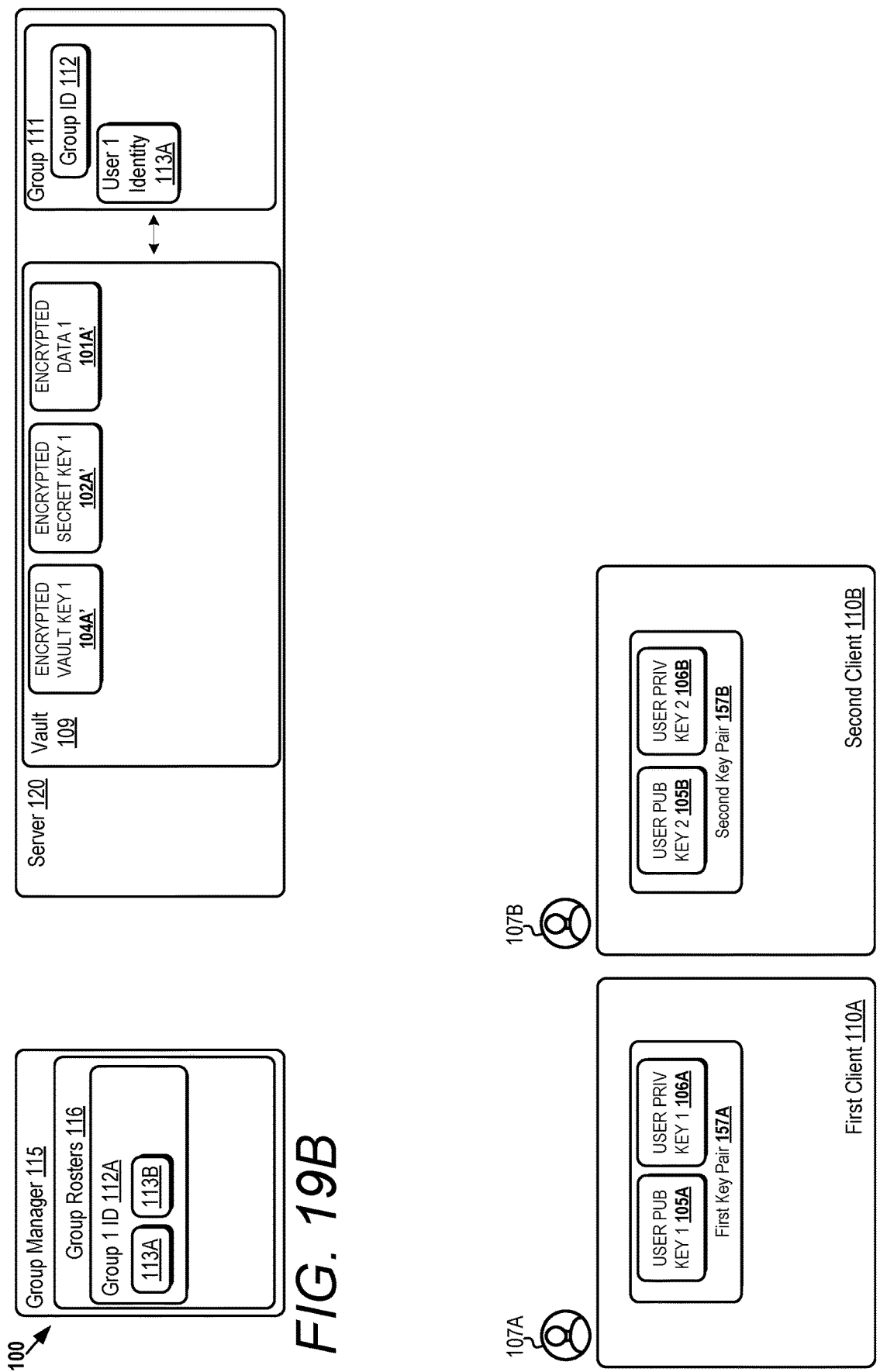
FIG. 19B shows aspects of a process where a second user is added to a group.
Figure 19C:
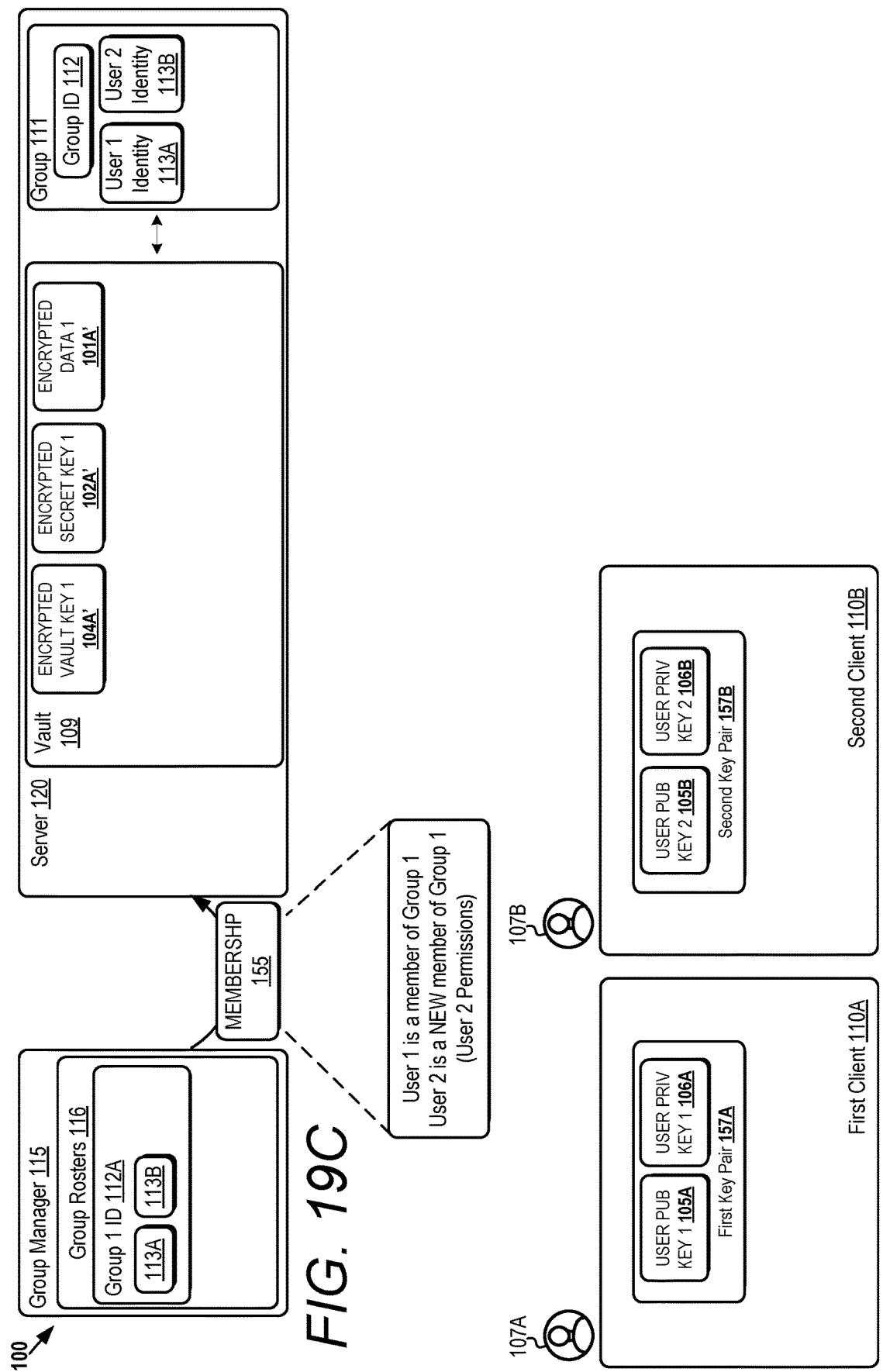
FIG. 19C shows aspects of a process where membership data is communicated from a group manager to a storage server.
Figure 19D:
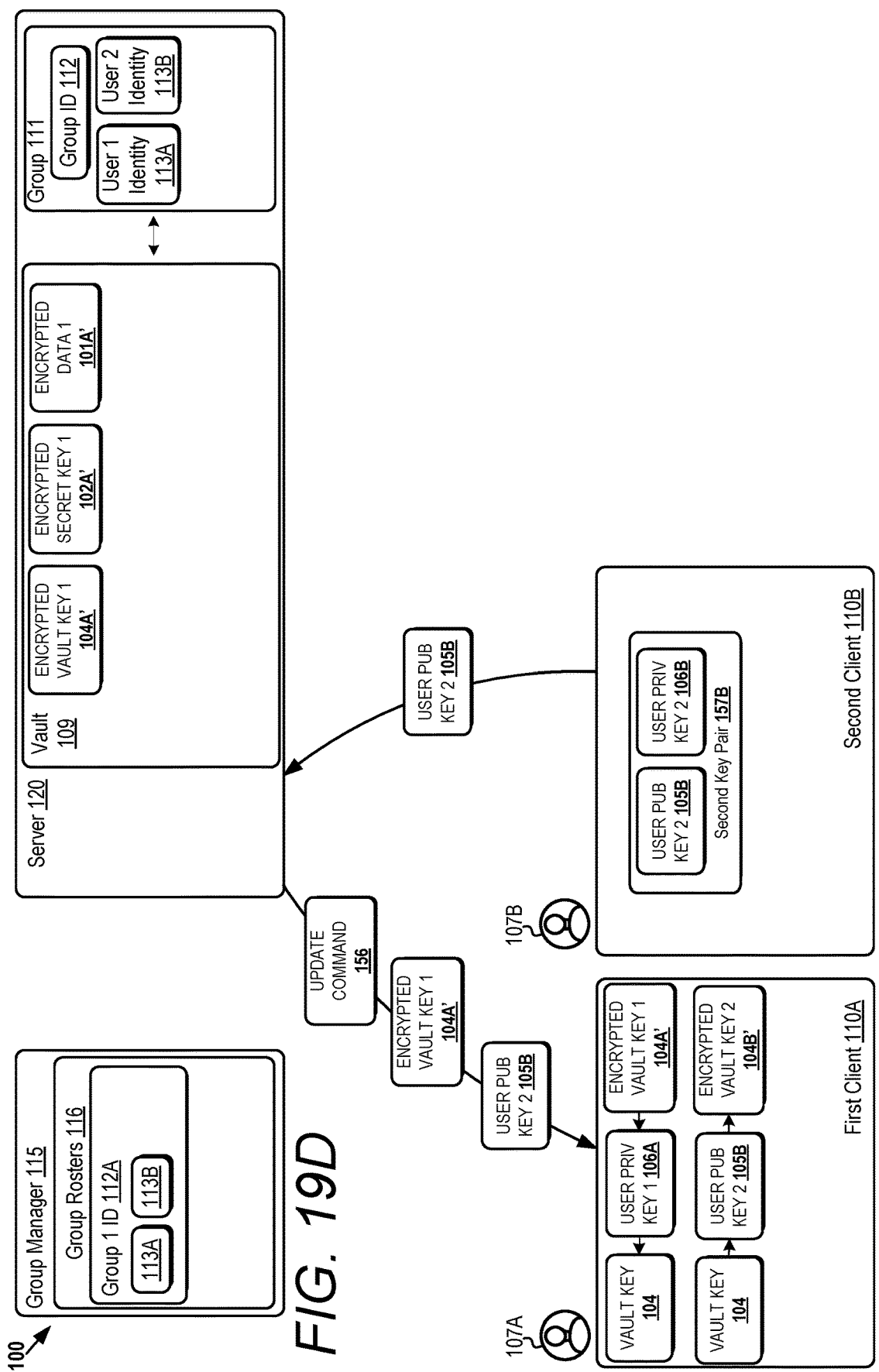
FIG. 19D shows aspects of a process where update commands are sent from a stored server to a client computer.

FIG. 19B illustrates aspects of a process for adding a person to the user group 111. In this example, in response to detecting that a user has been added, the group manager 115 sends membership data 155 indicating new members of the user group 111. The membership data 155 can also indicate people who have been dropped from a group 111. In addition, the membership data 155 can also indicate permission changes with respect to members of the user group 111. In the example of FIG. 19C, the membership data 155 indicates that the first user, User 1, is a current member of the group 111, Group 1. In addition, the membership data 165 indicates that the second user is a new member of the group. This example is provided for illustrative purposes and is not to be construed as limiting. It can be appreciated that the membership data 155 indicating a new user of a group can be provided by any computing device, including a client device. In such embodiments, when membership data 155 is received from a client device, the server 120 can verify that a user sending the membership data 155 is still an active member of the group before allowing the server to take action on the membership data. In addition, the server 120 can also determine if the user sending the membership data 155 has appropriate administrative rights to add users to the vault. The server can deny any action based on the membership data 155 if a user associated with the membership data 155 does not have the appropriate permissions.

Users can be added to a group using a number of different methods. For instance, an administrator of the group, such as the first user 107A, can allow new users to join the group. In such embodiments, an administrator can add identities of new users and also define one or more permissions. In other embodiments, users can join public groups without requiring a member to certify or approve a join request.

There are a number of techniques for adding users to a group. In one illustrative example, a first method involves a process that is initiated by a group owner. When an administrator adds a person to a group, such as a channel, the group owner can cause a system to collect public keys of the new users. The group owner can then cause the system to encrypt a vault key for each new user by each user's public key. Each new user can gain access to a unique data structure that allows them to access shared data of that group.

A second method involves a process that is initiated when a public join link is created, e.g., anyone can join a Seattle Running Club Channel using a link. The system can allow access to the secret data by collecting a public key from any new user and encrypting a vault key with that public key. The system can allow any member of the group to approve entry of a new user, not just the group manager.

In response to receiving the membership data 155 indicating the addition of the second user 107B of the group 111, the sever 120 can also configure the vault to allow storage of encrypted data in association with the second user 107B by associating a second identity 113B with the vault 109. The vault 109 can be configured to grant the second user 107B permission to store the encrypted data while the second user 107B is a current member of the user group 111.

In addition, once the server 120 receives an indication of a new member of a user group, the server 120 can issue one or more commands causing a client device of a current member to generate a vault key from their encrypted vault key, and cause the generation of an encrypted vault using a public key of the new member. In the present example at the stage shown in FIG. 19D, in response to receiving the membership data 155 indicating the addition of the second user 107B of the group 111, the sever 120 can communicate an update command 156 to the client device 110A associated with a current member, e.g., the first user 107A. The update command 156 causes the client device 110A to generate an encrypted vault key 2 104B' by encrypting the vault key 104 using a public key 2 105B of a second private-public key pair 157B associated with the second user 107B of the user group 111. The server 120 can provide the public key 2 105B of a second private-public key pair 157B with the update command 156, or the public key 2 105B can be obtained by the client device 110A from another resource, such as the second client 110B or a key service. If the vault key does not exist on the client computer 110A, the server 120 can provide the encrypted vault key 1, which can be decrypted by the first user's private key. The encrypted vault key 1 can also be provided by the first client device 110A or by a service, such as a remote key storage service.

In some configurations, a single client device or a selected group of client devices can be selected to generate encrypted data for new users. The selection of devices used for generating encrypted data can be based on roles or permissions for each member. For instance, if a user is a designated administrator for a group, that user and/or that user's corresponding device can be selected for providing an encrypted vault key for a new user. In other configurations, client devices can communicate with one another on a peer-to-peer basis to determine which device is to generate an encrypted vault key for the new user. The devices can be selected based on activity of the device or one or more capabilities of individual devices. For instance, if it is determined that a particular computing device remains online for a period of time versus other devices, that particular computing device can be selected to generate the new user's encrypted vault key. In another example, if it is determined that a particular computing device has an architecture that's more conducive to generating a key, e.g., a desktop having a particular processor versus a mobile device, that particular computing device can be selected over a pool of other candidate devices.

Figure 19E:
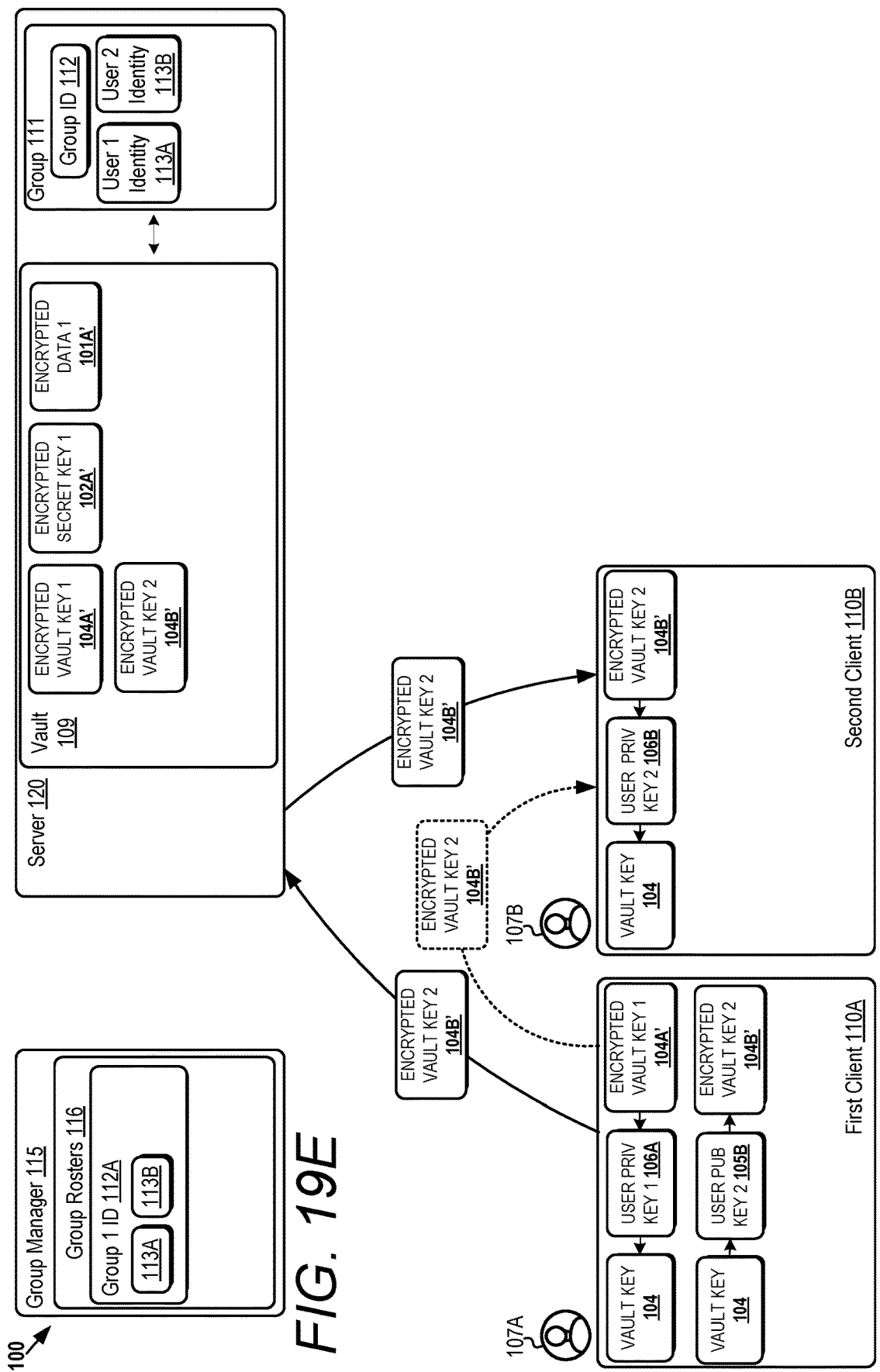
FIG. 19E shows aspects of a process where encryption keys are communicated from a client computer to a server and/or a client computer of a new group member.
Figure 19F:
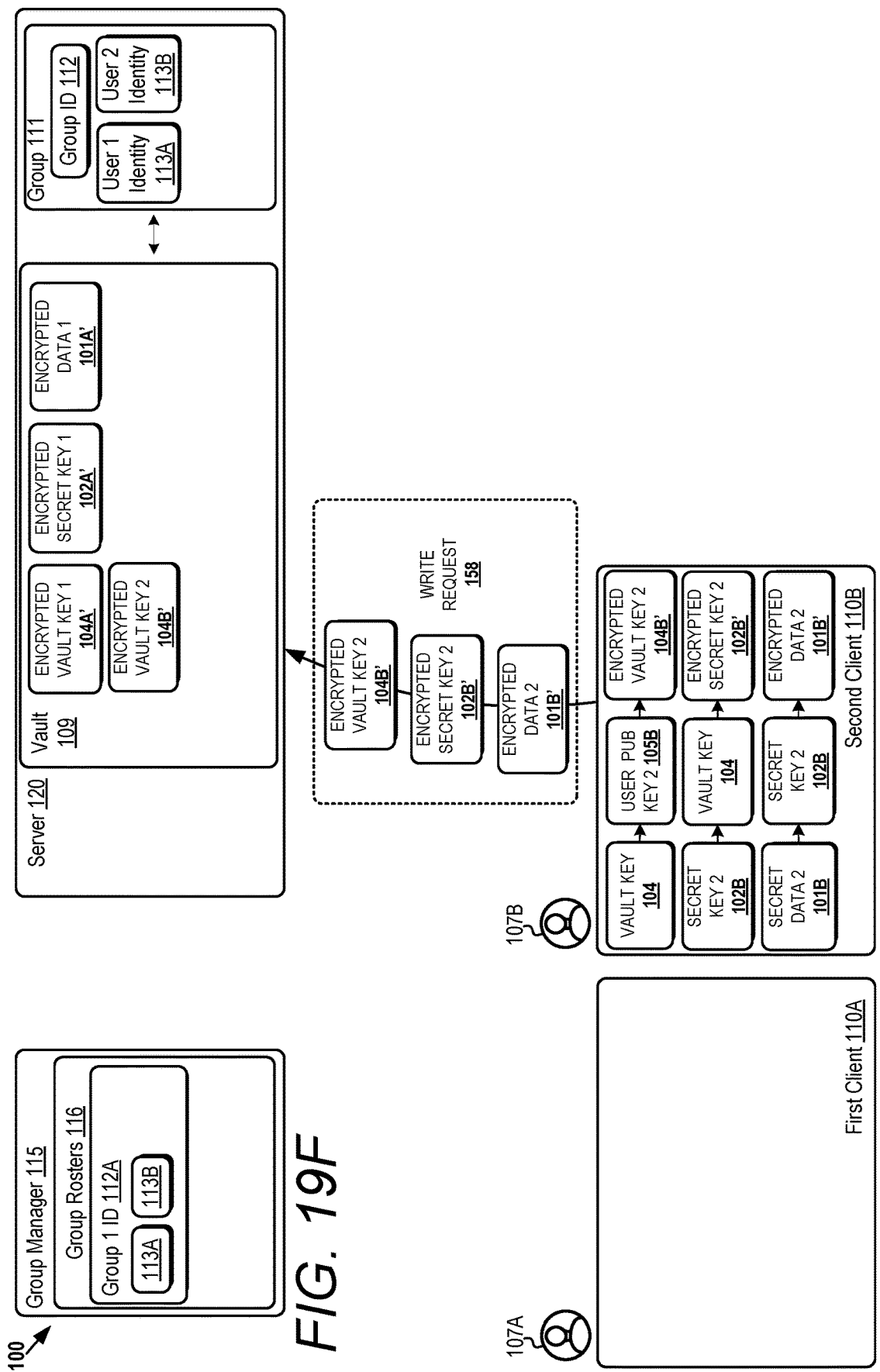
FIG. 19F shows aspects of a process where a new member of a group can store communicate encrypted data to a server.
Figure 19G:
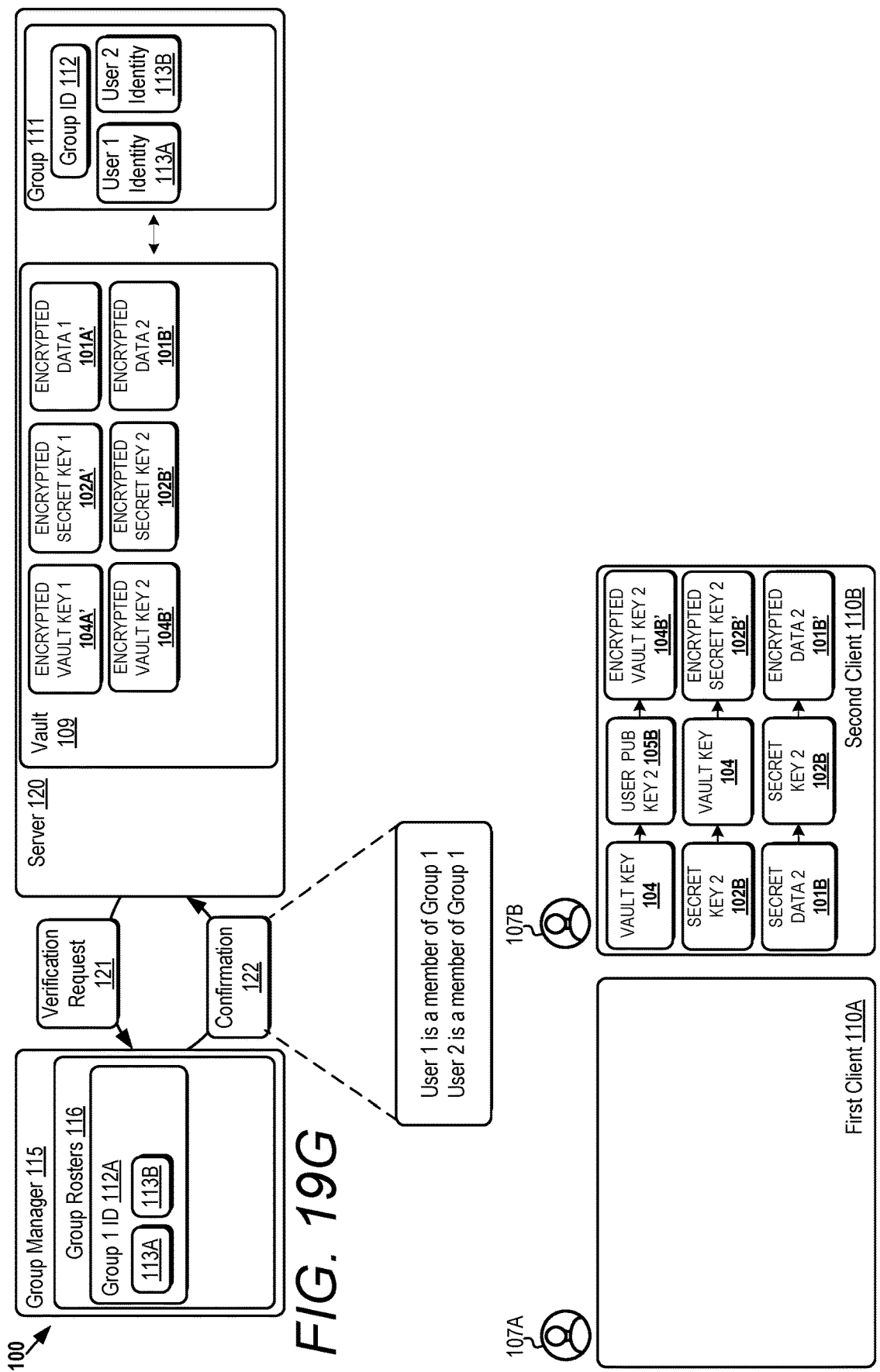
FIG. 19G shows aspects of a process where a new member of a group can store encrypted data on a server based on membership data received from a group manager.

As shown in FIG. 19E, the new user's vault key can be communicated to the client device 110B of the new user directly from the first client 110A, as shown with the dashed lines, or by the use of another resource such as a key service. The new user's vault key can also be communicated to the server for storage in the vault 109 and/or communicated to the client device 110B of the new user from the server 120. In the present example, as shown in FIG. 19F, the encrypted vault key 2 104B' can be stored at the server and/or communicated to the client device 110B. The encrypted vault key 2 104B' is configured to generate the vault key 104 at the second client device 110B by the use of a private key 2 106B of the second private-public key pair 157B. The vault key 104 can then enable the second client device 110B to generate an encrypted secret key 2 102B' from a secret key 2 102B, the secret key 2 102B enabling the second client device 110B to generate encrypted secret data 2 101B' from secret data 2 101B.

To store the encrypted data at the server 120, the client device 110B can send a write request 158 the server requesting the server 120 to store the encrypted secret data 2 101B', the encrypted secret key 2 102B', and the encrypted vault key 2 104B' in the vault 109 in association with the second user 107B. The write request 158 can include the encrypted data (as shown) or the write request 158 can be sent independently from the encrypted data.

As shown in FIG. 19F, in response to the write request 158, the server can determine if the second user 107B is a current member of the user group 111 using confirmation data 122 from the group manager. The confirmation data 122 can be sent to the server in response to a verification request 121. If the confirmation data 122 confirms that the requesting user, the second user 107B, is a current member of the group 111, the server 120 can store the encrypted secret data 2 101B', the encrypted secret key 2 102B' and the encrypted vault key 2 104B' in the vault 109. However, if the confirmation data 122 shows that the requesting user, e.g., the second user 107B, is no longer a member of the group, the server 120 deny the write request by restricting the second user from storing the encrypted secret data 2 101B' and the encrypted secret key 2 102B' in the vault 109 if the second user 107B does not have write access or if the second user 107B is not a current member of the group 111.

This embodiment also allows users to share data, with reference to FIGS. 2D-2G, a process for sharing data between the users can happen after a new user has been added. Thus, in the current example, once the second user has been added to the group, the server 120 can receive an access request associated with the second user, where the access request requests the encrypted secret data 101A' stored in the vault in association with the first user. In response to the access request, the server 120 can communicate a verification request to the group manager 115. The verification request can include the identity of the second user and a group identifier associated with the group and the vault. The group manager 115 can check one or more records and send a roster or an access confirmation to the server. The roster or the access confirmation can indicate that the second user is a current member of the group, or that the second user is not a current member of the group. In response to determining that the second user is a current member of the group, the server 120 can permit a communication of the encrypted secret data 1 101A', the encrypted secret key 1 102A', and the encrypted vault key 2 104B' to a requesting client device associated with the access request. The encrypted vault key 2 104B' can be configured to allow the generation of the vault key 104 at the requesting client device using a private key 2 106B of the second private-public key pair 157B The vault key 104 can allow the generation of the secret key 1 and the secret key 1 can allow the generation of the secret data 1 101A.

Figure 20:
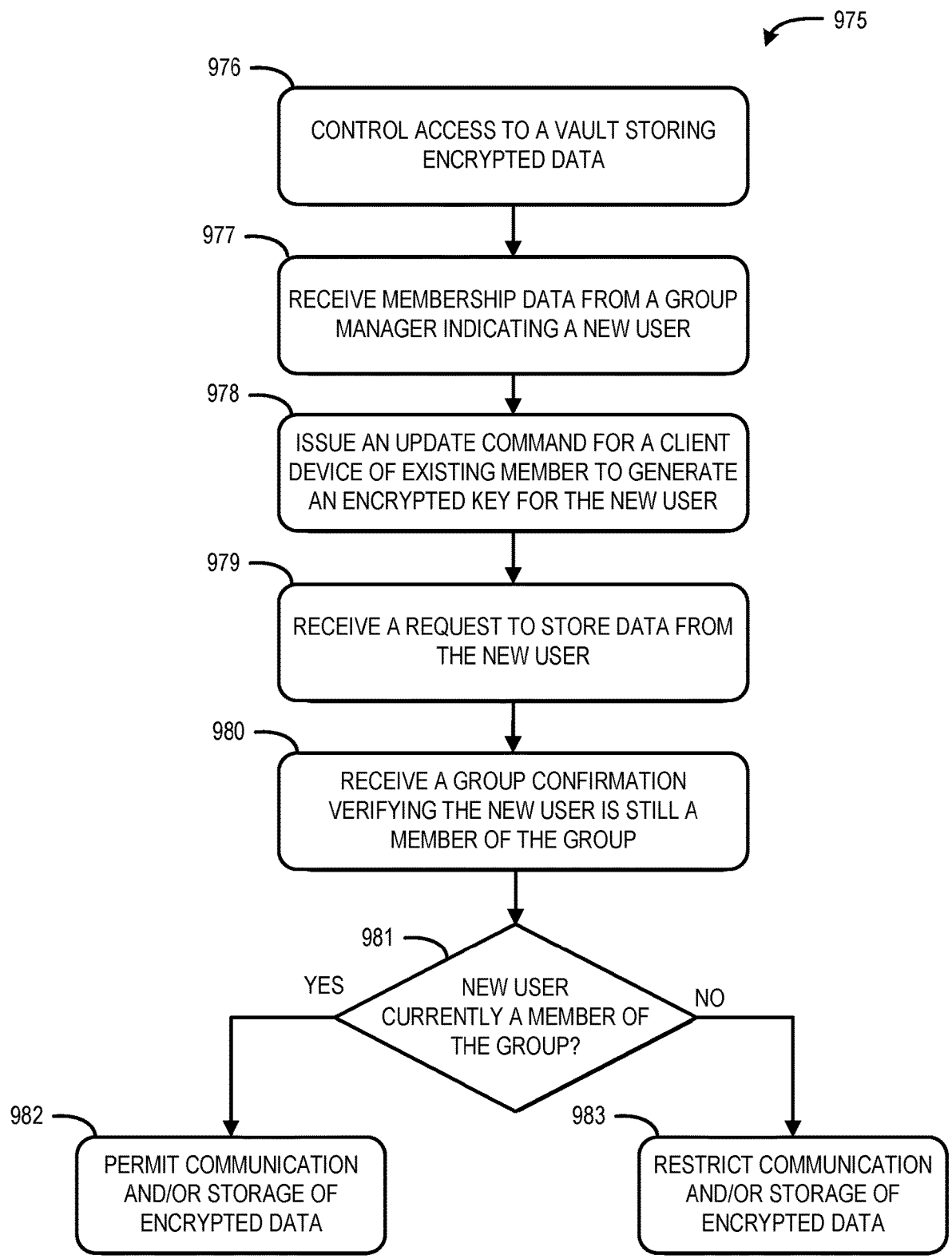
FIG. 20 is a process flow diagram illustrating aspects of a process for updating permissions for users based on a membership of a group.

With reference to FIG. 20, a routine 975 for managing user permissions of a vault system based on group membership activity is shown and described below. The routine 975 begins at operation 976, where the program module 623 controls access to a vault 109 storing encrypted data, e.g., encrypted secret data 1 101A', encrypted secret key 1 102A', and encrypted vault key 1 104'. The encrypted secret data 1 101A' is generated by encrypting secret data 1 101A using a secret key 1 102A, the encrypted secret key 1 102A' is generated by encrypting the secret key 1 102A using a vault key 104 that is associated with a user group 111, and the encrypted vault key 1 104' is generated by encrypting the vault key 104 using a public key 1 105A of a first private-public key pair 157A associated with a first user 107A of the user group 111. The access for individual users to the vault 109 is controlled based on a membership status with the user group 111 and permissions that can be provided by the group manager.

A "user group" defined herein can include a group of computer users that are listed as a member in a roster of a communication session or a meeting. A communication session can be managed by a system that can share text messages, data files, video fees, live video and audio or other forms of data. Each user can join a group manually, be invited by a member, and/or permissions to participate in a communication session can be granted by a system administrator. Each member can be authenticated by the use of any suitable credentials to participate in a communication session. A user can leave a group by an input command issued by the member, by a group member, and/or by a system administrator.

At operation 977, the program module 623 receives membership data 155 indicating the addition of a new member of the group, e.g., the second user 107B. In operation 977, the sever 120 can also configure the vault to allow storage of encrypted data in association with the new member, e.g., the second user 107B by associating a second identity 113B with the vault 109. The vault 109 can be configured to grant the second user 107B permission to store the encrypted data while the second user 107B is a current member of the user group 111.

At operation 978, the program module 623 can issue one or more update commands causing a client device of a current member to generate a vault key from their encrypted vault key. The command can also cause the generation of an encrypted vault using a public key of the new member. As described in the example of FIG. 19D, in response to receiving the membership data 155 indicating the addition of the second user 107B of the group 111, the sever 120 can communicate an update command 156 to the client device 110A associated with a current member, e.g., the first user 107A. The update command 156 causes the client device 110A to generate an encrypted vault key 2 104B' by encrypting the vault key 104 using a public key 2 105B of a second private-public key pair 157B associated with the second user 107B of the user group 111. The server 120 can provide the public key 2 105B of a second private-public key pair 157B with the update command 156, or the public key 2 105B can be obtained by the client device 110A from another resource, such as the second client 110B or a key service. If the vault key does not exist on the client computer 110A, the server 120 can provide the encrypted vault key 1, which can be decrypted by the first user's private key. The encrypted vault key 1 can also be provided by the first client device 110A or by a service, such as a remote key storage service.

At operation 979, the program module 623 receives write request 158 the server requesting the server 120 to store encrypted data. In one example, request can include or refer to the encrypted secret data 2 101B', the encrypted secret key 2 102B', and the encrypted vault key 2 104B' and direct such data for storage in the vault 109 in association with the second user 107B. The write request 158 can include the encrypted data or the write request 158 can be sent independently from the encrypted data.

At operation 980, the program module 623 receives a confirmation from the group manager 115 indicating a membership status of one or more users. In one illustrative example, a confirmation can include a Group ID and a membership status of at least one User ID, e.g., that the first user 107A is current member, or that the first user 107A is not a current member. The confirmation can also include one or more permissions for each user. For instance, a confirmation can include a User ID and indicate whether that user ID is associated with read and/or write permissions. The confirmation can also describe roles or other attributes associated with individual User IDs. In one illustrative example, with reference to FIG. 1, a computing device can receive group confirmation 122 from the group management system 115, and the group confirmation 122 can indicate a status of the first user 107 and one or more group identifiers 112.

At operation 981, in response to receiving a group confirmation 112 indicating that a user, such as the second user 107B, is associated with a particular group, the routine 975 proceeds to operation 982 where the program module 623 can take a number of actions to permit the communication and/or storage of the encrypted data, e.g., the encrypted secret data, encrypted secret key, and the encrypted vault key. However, if the group confirmation 112 indicates that a user, such as the second user 107B, is not associated with a particular group, the routine 975 proceeds to operation 983 where the program module 623 can take a number of actions to restrict the communication and/or storage of the encrypted data, e.g., the encrypted secret data, encrypted secret key, and the encrypted vault key.

Figure 21:
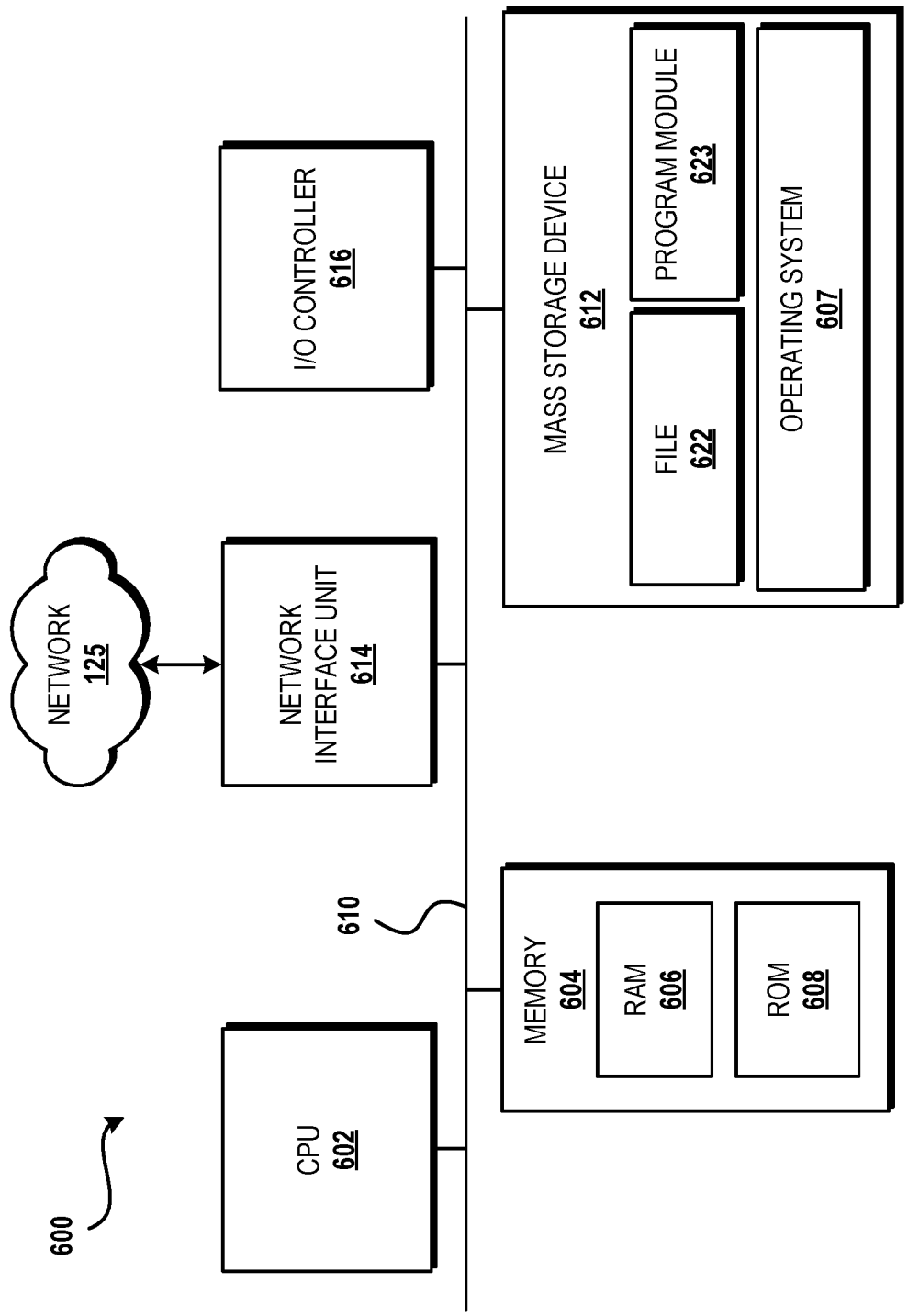
FIG. 21 is a computer architecture diagram illustrating an illustrative computer hardware and software architecture for a computing system capable of implementing aspects of the techniques and technologies presented herein.

FIG. 21 shows additional details of an example computer architecture 600 for a computer, such as the server 120 or one of the client devices 110 (FIG. 1), capable of executing the program components described above for providing enhanced security for encrypted data. Thus, the computer architecture 600 illustrated in FIG. 21 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 21 includes a central processing unit 602 ("CPU"), a system memory 604, including a random access memory 606 ("RAM") and a read-only memory ("ROM") 606, and a system bus 610 that couples the memory 604 to the CPU 602. A basic input/output system containing the basic routines that help to transfer information between elements within the computer architecture 600, such as during startup, is stored in the ROM 606. The computer architecture 600 further includes a mass storage device 612 for storing an operating system 607, and one or more application programs including but not limited to the program module 623. The illustrated mass storage device 612 may also store a file 622, which may include an encryption key, encrypted data, or other data needed to execute the techniques described herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 125 and/or another network (not shown). The computer architecture 600 may connect to the network 125 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 21). Similarly, the input/output controller 616 may provide output to a display screen, a printer, or other type of output device (also not shown in FIG. 21).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 21, may include other components that are not explicitly shown in FIG. 21, or may utilize an architecture completely different than that shown in FIG. 21.

Figure 22:
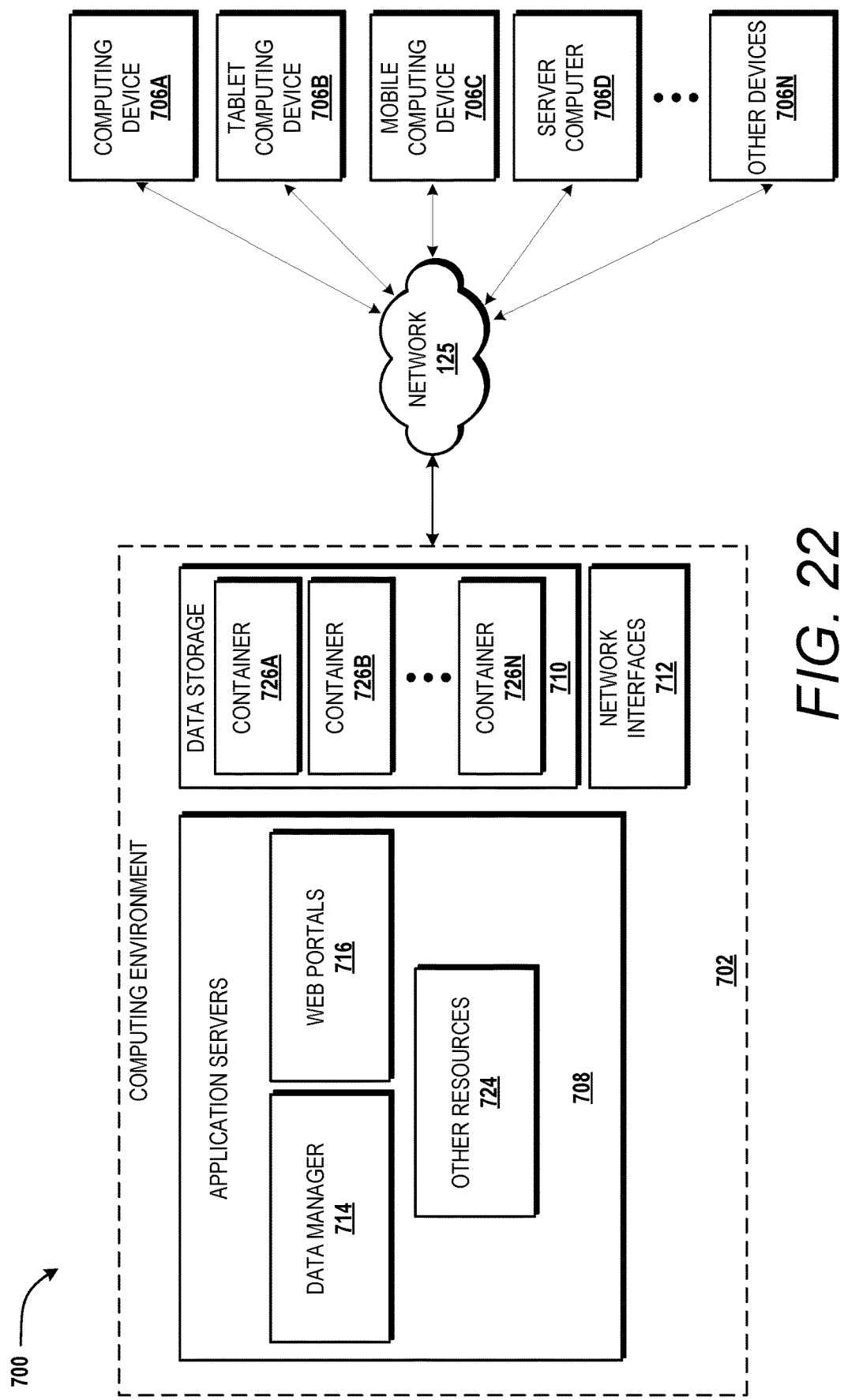
FIG. 22 is a diagram illustrating a distributed computing environment capable of implementing aspects of the techniques and technologies presented herein.

FIG. 22 depicts an illustrative distributed computing environment 700 capable of executing the software components described herein for providing enhanced security for encrypted data, among other aspects. Thus, the distributed computing environment 700 illustrated in FIG. 22 can be utilized to execute any aspects of the software components presented herein. For example, the distributed computing environment 700 can be utilized to execute aspects of the program module 623 and/or other software components described herein.

According to various implementations, the distributed computing environment 700 includes a computing environment 702 operating on, in communication with, or as part of the network 125. The network 125 may be or may include the network 125, described above with reference to FIG. 21. The network 125 also can include various access networks.

One or more client devices 706A-706N (hereinafter referred to collectively and/or generically as "clients 706") can communicate with the computing environment 702 via the network 125 and/or other connections (not illustrated in FIG. 22). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 125. The application servers 708 can host various services, virtual machines, portals, and/or other resources. In the illustrated configuration, the application servers 708 may host one or more virtual machines for executing applications or other functionality. According to various implementations, the virtual machines may execute one or more applications and/or software modules for providing enhanced security for encrypted data. It should be understood that this configuration is illustrative, and should not be construed as being limiting in any way. The application servers 708 also host or provide access to one or more portals, link pages, Web sites, and/or other information ("Web portals") 716. The Web portals 716 may be used to communicate with one or more client computer.

As shown in FIG. 22, the application servers 708 also can host other services, applications, portals, and/or other resources ("other resources") 724. The other resources 724 may deploy a service-oriented architecture or any other client-server management software. It thus can be appreciated that the computing environment 702 can provide integration of the concepts and technologies disclosed herein provided herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 125. The functionality of the data storage 710 also can be provided by one or more server computers configured to host data for the computing environment 702. The data storage 710 can include, host, or provide one or more real or virtual containers 726A-726N (hereinafter referred to collectively and/or generically as "containers 726"). The containers 726, which may be used to form a vault, are configured to host data used or created by the application servers 708 and/or other data. Although not illustrated in FIG. 22, the containers 726 also can host or store data structures and/or algorithms for execution by a module, such as the program module 623. Aspects of the containers 726 may be associated with a database program, file system and/or any program that stores data with secure access features. Aspects of the containers 726 may also be implemented using products or services, such as ACTIVE DIRECTORY, DKM, ONEDRIVE, DROPBOX or GOOGLEDRIVE.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing enhanced security for encrypted data, among other aspects. In one specific example, as summarized above, techniques described herein may be implemented, at least in part, by a web browser application that may work in conjunction with the application servers 708 of FIG. 22.

Figure 23:
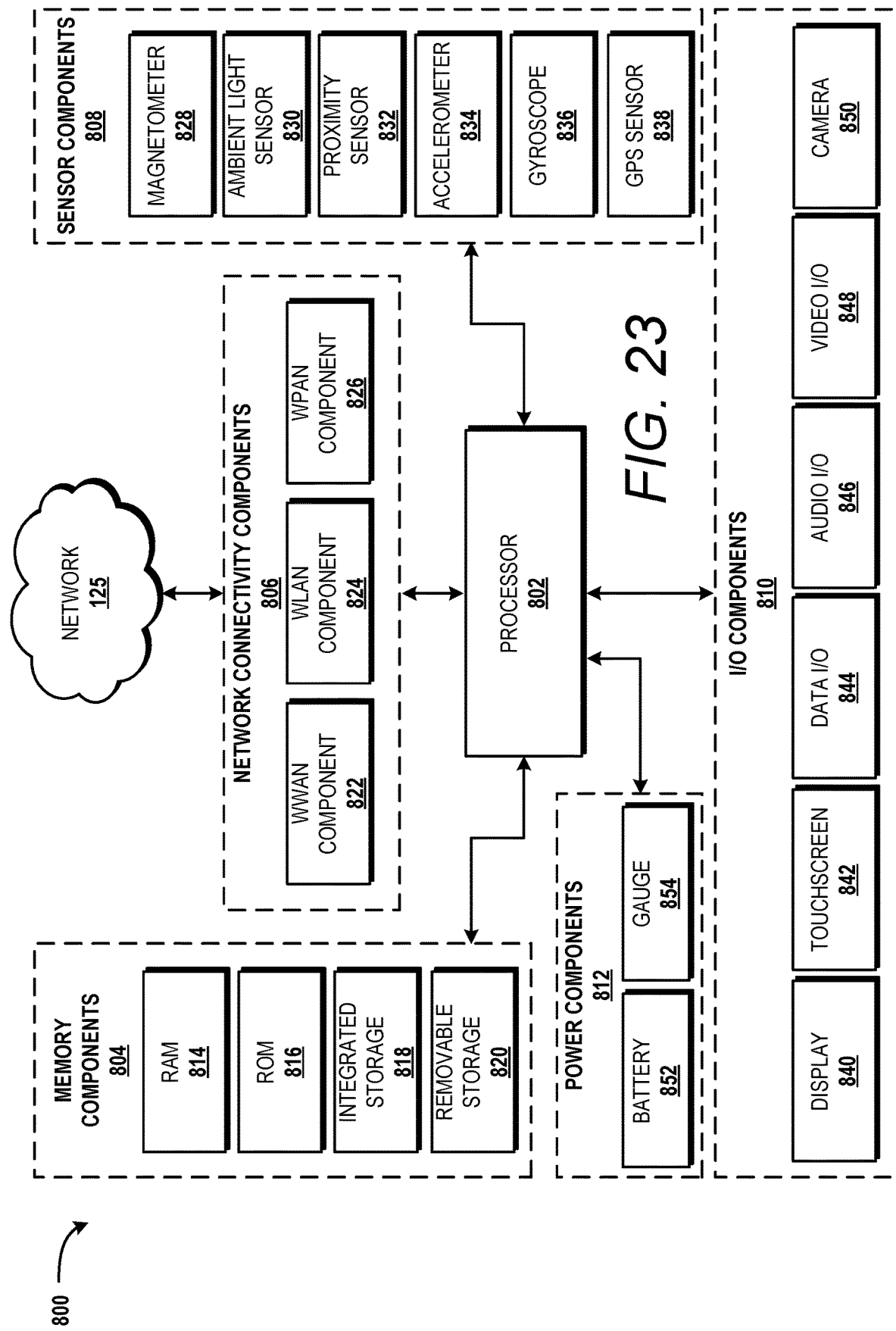
FIG. 23 is a computer architecture diagram illustrating a computing device architecture for a computing device capable of implementing aspects of the techniques and technologies presented herein.

Turning now to FIG. 23, an illustrative computing device architecture 800 for a computing device that is capable of executing various software components described herein for providing enhanced security for encrypted data. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the clients 706 shown in FIG. 22. Moreover, aspects of the computing device architecture 800 may be applicable to traditional desktop computers, portable computers (e.g., laptops, notebooks, ultra-portables, and netbooks), server computers, and other computer systems, such as described herein with reference to FIG. 23. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 23 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 23, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, California and others. In some configurations, the processor 802 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, SYMBIAN OS from SYMBIAN LIMITED, WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, California, BLACKBERRY OS from Research In Motion Limited of Waterloo, Ontario, Canada, IOS from Apple Inc. of Cupertino, California, and ANDROID OS from Google Inc. of Mountain View, California Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 125 or another network, which may be a WWAN, a WLAN, or a WPAN. Although only the network 125 is illustrated, the network connectivity components 806 may facilitate simultaneous communication with multiple networks, including the network 125 of FIG. 20. For example, the network connectivity components 806 may facilitate simultaneous communications with multiple networks via one or more of a WWAN, a WLAN, or a WPAN.

The network 125 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 125 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 125 may be configured to provide voice and/or data communications with any combination of the above technologies. The network 125 may be configured to or adapted to provide voice and/or data communications in accordance with future generation technologies.

In some configurations, the WWAN component 822 is configured to provide dual-multi-mode connectivity to the network 125. For example, the WWAN component 822 may be configured to provide connectivity to the network 125, wherein the network 125 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 125 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 125 via the WI-FI access points. Such connections may be secured via various encryption technologies including, but not limited, WI-FI Protected Access ("WPA"), WPA2, Wired Equivalent Privacy ("WEP"), and the like.

The network 125 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 828 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component.

The disclosure presented herein may be considered in view of the following clauses.

Clause A: A method of managing secret data using a vault key for a group 111 of users, the method performed by a data processing system 120 comprising: receiving encrypted secret data 101A' generated on a remote computing device from secret data 101A by the use of a secret key 102A; receiving an encrypted secret key 102A' generated from the secret key 102A by the use of a vault key 104 that is associated with the group of users; receiving an encrypted vault key 104' generated from the vault key 104 by the use of a public key 105A of a private-public key pair associated with a first user 107A of the group 111 of users; communicating a verification request 121 to a group management system 115, the verification request 121 comprising an identity 113 of the first user 107A and a group identifier 112 associated with the group 111; receiving a confirmation 122 from the group management system 115, the confirmation 122 indicating a membership status of the first user 107A for the group 111 associated with the group identifier 112; and in response to receiving the confirmation 112 indicating that the first user 107A is a current member of the group 111, storing the encrypted secret data 101A', encrypted secret key 102A', and the encrypted vault key 104' in a vault 109 configured to permit write access to members of the group 111.

Clause B: The method of clause A, further comprising: in response to receiving the confirmation indicating that the first user is not a current member of the group, restricting storage of the encrypted secret data, encrypted secret key, and the encrypted vault key in the vault.

Clause C: The method of clauses A and B, further comprising: receiving an access request from a computing device associated with the first user, the access request requesting at least one of the encrypted secret data, encrypted secret key, and the encrypted vault key; in response to the access request, communicating a verification request to the group management system, the verification request comprising the identity of the first user and the group identifier associated with the group and the vault; receiving an access confirmation from the group management system, the access confirmation indicating the membership status of the first user for the group associated with the group identifier; and in response to receiving the access confirmation indicating that the first user is a current member of the group, communicating the encrypted secret data, encrypted secret key, and the encrypted vault key from the vault to a client computer associated with the first user, wherein encrypted vault key is configured to be decrypted using a private key of the private-public key pair to generate the vault key.

Clause D: The method of clauses A-C, further comprising: receiving an access request from a computing device associated with the first user, the access request requesting at least one of the encrypted secret data, encrypted secret key, and the encrypted vault key; in response to the access request, communicating a verification request to the group management system, the verification request comprising the identity of the first user and the group identifier associated with the group and the vault; and receiving an access confirmation from the group management system, the access confirmation indicating the membership status of the first user for the group associated with the group identifier; and restricting access to the encrypted secret data, encrypted secret key, and the encrypted vault key stored in the vault, in response to receiving the access confirmation indicating that the first user is not a current member of the group.

Clause E: The method of clauses A-D, further comprising: receiving updated encrypted secret data from a computing device associated with the first user, the updated encrypted data generated on the computing device using the secret key; communicating a subsequent verification request to the group management system, the subsequent verification request comprising the identity of the first user and the group identifier associated with the group and the vault; receiving a subsequent access confirmation from the group management system, the subsequent access confirmation indicating the membership status of the first user for the group associated with the group identifier; and if the subsequent access confirmation indicates that the first user is a current member of the group, storing the updated encrypted secret data in the vault, wherein the updated encrypted secret data is restricted from storage in the vault if the subsequent access confirmation indicates that the first user is not a current member of the group.

Clause F: The method of clauses A-E, further comprising: receiving updated encrypted secret data from a computing device associated with the first user, the updated encrypted data generated on the computing device using an updated secret key; receiving an encrypted updated secret key that is encrypted from the updated secret key using the vault key; communicating a subsequent verification request to the group management system, the subsequent verification request comprising the identity of the first user and the group identifier associated with the group and the vault; receiving a subsequent access confirmation from the group management system, the subsequent access confirmation indicating the membership status of the first user for the group associated with the group identifier; and if the subsequent access confirmation indicates that the first user is a current member of the group, storing the updated encrypted secret data and the encrypted updated secret key in the vault, wherein the updated encrypted secret data and the encrypted updated secret key are restricted from storage in the vault if the subsequent access confirmation indicates that the first user is not a current member of the group.

Clause G: The method of clauses A-F, further comprising: receiving updated encrypted vault key from the computing device associated with the first user, the updated encrypted vault key generated from the vault key using an updated public key from an updated private-public pair associated with the user, wherein the updated encrypted vault key is configured to be decrypted by the use of an updated private key from the updated private-public pair.

Clause H: The method of clauses A-G further comprising: receiving updated encrypted vault key associated with the first user, the updated encrypted vault key generated from the vault key using an updated public key from an updated private-public pair associated with the user; and if the subsequent access confirmation indicates that the first user is a current member of the group, storing the updated encrypted vault key in the vault, wherein the updated encrypted vault key is restricted from storage in the vault if the subsequent access confirmation indicates that the first user is not a current member of the group.

Clause I: The method of clauses A-H wherein the vault stores thereupon a second encrypted vault key associated with a second user, the second encrypted vault key configured to be decrypted by the use of a private key associated with the second user to generate the vault key, the method further comprising: receiving an access request from a computing device associated with a second user, the access request requesting the encrypted secret data stored in association with the first user; in response to the access request, communicating a verification request to the group management system, the verification request comprising the identity of the second user and the group identifier associated with the group and the vault; receiving an access confirmation from the group management system, the access confirmation indicating a membership status of the second user for the group; and in response to receiving the access confirmation indicating that the second user is a current member of the group, communicating the encrypted secret data, encrypted secret key, and the second encrypted vault key from the vault to a client computer associated with the second user.

Clause J: The method of clauses A-I, further comprising: in response to receiving the access confirmation indicating that the first user is not a current member of the group, restricting a computing device associated with the second user from accessing to the encrypted secret data, encrypted secret key, and the encrypted vault key stored in the vault.

Clause K: A computer 110A, comprising: a processor 602; and a computer-readable storage medium 604 in communication with the processor 602, the computer-readable storage medium 604 having computer-executable instructions stored thereupon which, when executed by the processor 602, cause the computer 110A to generating encrypted secret data 101A' from secret data 101A using a secret key 102A; generating an encrypted secret key 102A' from the secret key 102A using a vault key 104 that is associated with a group 111 of users; generating an encrypted vault key 104' from the vault key 104 using a public key 105A of a private-public key pair associated with a first user 107A of the group 111 of users; and communicating the encrypted secret data 101A', encrypted secret key 102A', and the encrypted vault key 104' to a server 120 for storage in a vault 109, the communication causing the server 120 to use a confirmation 112 defining a membership status of the first user from a group manager 115 to determine if the first user 107A is a current member of the group 111, the server 120 permitting the first user 107A to store data to the vault 109 if the confirmation 112 indicates that the first user 107A is a current member of the group 111.

Clause L: The computer of clause K, wherein the instructions further cause the computer to perform a process for sharing a single key with multiple devices for a single user, wherein the method comprises: encrypt a private key of the private-public key pair using a symmetric key to generate an encrypted private key; communicating the symmetric key in a secure service executing on a remote device, wherein the secure service provides access to the symmetric key by the use of one or more credentials associated with the first user; and communicating the encrypted private key to a secure storage associated with an operating system of one or more computing devices, wherein the encrypted private key is secured using the one or more credentials associated with the first user.

Clause M: The computer of clauses K and L, wherein the instructions further cause the computer to: send an access request to the server requesting at least one of the encrypted secret data, encrypted secret key, and the encrypted vault key, wherein the access request causes the server to use a subsequent confirmation defining the membership status of the first user from a group manager to determine if the first user is a current member of the group, the server communicating the at least one of the encrypted secret data, the encrypted secret key, and the encrypted vault key to the computer if the subsequent confirmation indicates that the first user is a current member of the group; and receiving the at least one of the encrypted secret data, the encrypted secret key, and the encrypted vault key at the computer.

Clause N: The computer of clauses K-M, wherein the instructions further cause the computer to: send an access request to the server requesting at least one of the encrypted secret data, encrypted secret key, and the encrypted vault key, wherein the access request causes the server to use a subsequent confirmation defining the membership status of the first user from a group manager to determine if the first user is a current member of the group, the server denying communication of the at least one of the encrypted secret data, the encrypted secret key, and the encrypted vault key to the computer if the subsequent confirmation indicates that the first user is not a current member of the group; and receiving a notification indicating a status of the access request at the computer.

Clause O: The computer of clauses K-N, wherein the instructions further cause the computer to: encrypt updated secret data to generate encrypted secret data using the secret key; communicating a subsequent verification request to the group management system, the subsequent verification request comprising the identity of the first user and the group identifier associated with the group and the vault; receiving a subsequent access confirmation from the group management system, the subsequent access confirmation indicating the membership status of the first user for the group associated with the group identifier; and if the subsequent access confirmation indicates that the first user is a current member of the group, storing the updated encrypted secret data in the vault, wherein the updated encrypted secret data is restricted from storage in the vault if the subsequent access confirmation indicates that the first user is not a current member of the group.

Clause P: A computer system 120 comprising: means for receiving encrypted secret data 101A' generated on a remote computing device from secret data 101A by the use of a secret key 102A; means for receiving an encrypted secret key 102A' generated from the secret key 102A by the use of a vault key 104 that is associated with the group of users; means for receiving an encrypted vault key 104' generated from the vault key 104 using a public key 105A of a private-public key pair associated with a first user 107A; means for communicating a verification request 121 to a group management system 115, the verification request 121 comprising an identity 113 of the first user 107A and a group identifier 112 associated with the group 111; means for receiving a confirmation 122 from the group management system 115, the confirmation 122 indicating a membership status of the first user 107A for the group 111 associated with the group identifier 112; and means for storing the encrypted secret data 101A', encrypted secret key 102A', and the encrypted vault key 104' in a vault 109 associated with the group identifier 112 if the confirmation 112 indicating that the first user 107A is a current member of the group 111.

Clause Q: The system of clause P, further comprising: means for restricting storage of the encrypted secret data, encrypted secret key, and the encrypted vault key in the vault when the confirmation indicates that the first user is not a current member of the group.

Clause R: The system of clauses P and Q, further comprising: means for receiving an access request from a computing device associated with the first user, the access request requesting at least one of the encrypted secret data, encrypted secret key, and the encrypted vault key; means for communicating a verification request to the group management system, the verification request comprising the identity of the first user and the group identifier associated with the group and the vault; means for receiving an access confirmation from the group management system, the access confirmation indicating the membership status of the first user for the group associated with the group identifier; and means for communicating the encrypted secret data, encrypted secret key, and the encrypted vault key from the vault to a client computer associated with the first user when the access confirmation indicates that the first user is a current member of the group, wherein encrypted vault key is configured to be decrypted using a private key of the private-public key pair to generate the vault key.

Clause S: The system of clauses P-R, further comprising: means for receiving an access request from a computing device associated with the first user, the access request requesting at least one of the encrypted secret data, encrypted secret key, and the encrypted vault key; means for communicating a verification request to the group management system, the verification request comprising the identity of the first user and the group identifier associated with the group and the vault; means for receiving an access confirmation from the group management system, the access confirmation indicating the membership status of the first user for the group associated with the group identifier; and means for restricting access to the encrypted secret data, encrypted secret key, and the encrypted vault key stored in the vault, the restriction invoked in response to receiving the access confirmation indicating that the first user is not a current member of the group.

Clause T: The system of clauses P-S, further comprising: means for receiving updated encrypted secret data from a computing device associated with the first user, the updated encrypted data generated on the computing device using the secret key; means for communicating a subsequent verification request to the group management system, the subsequent verification request comprising the identity of the first user and the group identifier associated with the group and the vault; means for receiving a subsequent access confirmation from the group management system, the subsequent access confirmation indicating the membership status of the first user for the group associated with the group identifier; and means for storing the updated encrypted secret data in the vault if the subsequent access confirmation indicates that the first user is a current member of the group, wherein the updated encrypted secret data is restricted from storage in the vault if the subsequent access confirmation indicates that the first user is not a current member of the group.

Based on the foregoing, it should be appreciated that concepts and technologies have been disclosed herein that provide enhanced security for encrypted data. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing system for automatically enabling members of a user group to control access rights of a vault to new members of the user group without relying on a designated group manager, comprising:
   a processor; and
   a computer-readable storage medium in communication with the processor, the computer-readable storage medium having computer-executable instructions stored thereupon which, when executed by the processor, cause the computer to:
   control access to a vault storing encrypted secret data generated by encrypting secret data using a secret key, wherein a first encrypted secret key is generated by encrypting the secret key using a vault key that is associated with the user group, and wherein a first encrypted vault key generated by encrypting the vault key using a first public key of a first private-public key pair associated with a first identity of a first user of the user group, wherein access for individual users to the vault is controlled by a membership status with the user group;
   receive membership data controlling communication between individual users of the user group in a communication session, the membership data indicating a second identity of a second user of the user group;
   in response to receiving the membership data indicating the addition of the second user of the user group, communicate an update command to a first client device associated with the first user, the update command causing the first client device to generate a second encrypted vault key by encrypting the vault key using a second public key of a second private-public key pair associated with the second identity of the second user of the user group; and
      receive the second encrypted vault key for storage of the second encrypted vault key in the vault in association with the second identity of the second user, the vault granting the second user access to the second encrypted vault key based on a membership status with the user group, wherein the membership data indicating the second identity of the second user and the second encrypted vault key enables the second client device of the second user to encrypt a new vault key for a third user to provide the third user with access to the secret data.

2. The computing system of claim 1, wherein the computer-executable instructions further cause the computer to: in response to receiving membership data indicating that the second user is not a current member of the group, restrict storage or access of the encrypted secret data or the second encrypted vault key in the vault for the second user.

3. The computing system of claim 1, wherein the computer-executable instructions further cause the computer to: in response to receiving membership data indicating that the third user is not a current member of the group, restrict storage or access of the encrypted secret data or the second encrypted vault key in the vault for the third user.

4. The computing system of claim 1, wherein the computer-executable instructions further cause the computer to: in response to receiving membership data indicating that the third user is not a current member of the group, restrict the second client device of the second user from generating or storing the new vault key for the third user.

5. The computing system of claim 1, wherein the computer-executable instructions further cause the computer to: in response to receiving membership data indicating that the third user is not a current member of the group, restrict the second client device of the second user from communicating the new vault key from the second client device to a third client device for the third user.

6. The computing system of claim 1, wherein the computer-executable instructions further cause the computer to: in response to receiving membership data indicating that the third user is not a current member of the group, restrict the second client device of the second user from communicating the new vault key from the second client device to a third client device for the third user thereby restricting the third client device from accessing the secret data.

7. The computing system of claim 1, wherein the vault key is encrypted on the second client device of the second user using a public key associated with the third user to generate the new vault key, wherein the new vault key is communicated to the third client device for the third user to decrypt the new vault key using a public key associated with the third user, the new vault key allows the third client to access to the secret data, wherein the computer-executable instructions further cause the computer to:
   receive an access request from a third client device associated with the third user, the access request requesting the encrypted secret data;
   in response to the access request, communicate a verification request to a group management system, the verification request comprising the identity of the third user and a group identifier associated with the user group and the vault;
   receive an access confirmation from the group management system, the access confirmation indicating the membership status of the third user for the user group associated with the group identifier; and
   in response to receiving the access confirmation indicating that the third user is a current member of the group, communicate a new encrypted vault key to a third client device of the third user, wherein the encrypted vault key is generated by encrypting the vault key on the second client device.

8. A computer-readable storage medium for automatically enabling members of a user group to control access rights of a vault to new members of the user group without relying on a designated group manager, the computer-readable storage medium in communication with a processor of a computer, the computer-readable storage medium having computer-executable instructions stored thereupon which, when executed by the processor, cause the computer to:
   control access to a vault storing encrypted secret data generated by encrypting secret data using a secret key, wherein a first encrypted secret key is generated by encrypting the secret key using a vault key that is associated with the user group, and wherein a first encrypted vault key generated by encrypting the vault key using a first public key of a first private-public key pair associated with a first identity of a first user of the user group, wherein access for individual users to the vault is controlled by a membership status with the user group;

receive membership data controlling communication between individual users of the user group in a communication session, the membership data indicating a second identity of a second user of the user group;

in response to receiving the membership data indicating the addition of the second user of the user group, communicate an update command to a first client device associated with the first user, the update command causing the first client device to generate a second encrypted vault key by encrypting the vault key using a second public key of a second private-public key pair associated with the second identity of the second user of the user group; and receive the second encrypted vault key for storage of the second encrypted vault key in the vault in association with the second identity of the second user, the vault granting the second user access to the second encrypted vault key based on a membership status with the user group, wherein the membership data indicating the second identity of the second user and the second encrypted vault key enables the second client device of the second user to encrypt a new vault key for a third user to provide the third user with access to the secret data.

9. The computer-readable storage medium of claim 8, wherein the computer-executable instructions further cause the computer to: in response to receiving membership data indicating that the second user is not a current member of the group, restrict storage or access of the encrypted secret data or the second encrypted vault key in the vault for the second user.

10. The computer-readable storage medium of claim 8, wherein the computer-executable instructions further cause the computer to: in response to receiving membership data indicating that the third user is not a current member of the group, restricting storage or access of the encrypted secret data or the second encrypted vault key in the vault for the third user.

11. The computer-readable storage medium of claim 8, wherein the computer-executable instructions further cause the computer to: in response to receiving membership data indicating that the third user is not a current member of the group, restrict the second client device of the second user from generating or storing the new vault key for the third user.

12. The computer-readable storage medium of claim 8, wherein the computer-executable instructions further cause the computer to: in response to receiving membership data indicating that the third user is not a current member of the group, restrict the second client device of the second user from communicating the new vault key from the second client device to a third client device for the third user.

13. The computer-readable storage medium of claim 8, wherein the computer-executable instructions further cause the computer to: in response to receiving membership data indicating that the third user is not a current member of the group, restrict the second client device of the second user from communicating the new vault key from the second client device to a third client device for the third user thereby restricting the third client device from accessing the secret data.

14. The computer-readable storage medium of claim 8, wherein the computer-executable instructions further cause the computer to:

receive an access request from a third client device associated with the third user, the access request requesting the encrypted secret data;

in response to the access request, communicate a verification request to a group management system, the verification request comprising the identity of the third user and a group identifier associated with the user group and the vault;

receive an access confirmation from the group management system, the access confirmation indicating the membership status of the third user for the user group associated with the group identifier; and in response to receiving the access confirmation indicating that the third user is a current member of the group, communicate a new encrypted vault key to a third client device of the third user, wherein the encrypted vault key is generated by encrypting the vault key on the second client device.

15. A method executing on a computer for automatically enabling members of a user group to control access rights of a vault to new members of the user group without relying on a designated group manager, the method comprising:

controlling access to a vault storing encrypted secret data generated by encrypting secret data using a secret key, wherein a first encrypted secret key is generated by encrypting the secret key using a vault key that is associated with the user group, and wherein a first encrypted vault key generated by encrypting the vault key using a first public key of a first private-public key pair associated with a first identity of a first user of the user group, wherein access for individual users to the vault is controlled by a membership status with the user group;

receiving membership data controlling communication between individual users of the user group in a communication session, the membership data indicating a second identity of a second user of the user group;

in response to receiving the membership data indicating the addition of the second user of the user group, communicating an update command to a first client device associated with the first user, the update command causing the first client device to generate a second encrypted vault key by encrypting the vault key using a second public key of a second private-public key pair associated with the second identity of the second user of the user group; and receiving the second encrypted vault key for storage of the second encrypted vault key in the vault in association with the second identity of the second user, the vault granting the second user access to the second encrypted vault key based on a membership status with the user group, wherein the membership data indicating the second identity of the second user and the second encrypted vault key enables the second client device of the second user to encrypt a new vault key for a third user to provide the third user with access to the secret data.

16. The method of claim 15, further comprising: in response to receiving membership data indicating that the second user is not a current member of the group, restricting storage or access of the encrypted secret data or the second encrypted vault key in the vault for the second user.

17. The method of claim 15, further comprising: in response to receiving membership data indicating that the third user is not a current member of the group, restricting storage or access of the encrypted secret data or the second encrypted vault key in the vault for the third user.

18. The method of claim 15, wherein the computer-executable instructions further cause the computer to: further comprising: in response to receiving membership data indicating that the third user is not a current member of the group, restricting the second client device of the second user from generating or storing the new vault key for the third user.

19. The method of claim 15, wherein the computer-executable instructions further cause the computer to: further comprising: in response to receiving membership data indicating that the third user is not a current member of the group, restricting the second client device of the second user from communicating the new vault key from the second client device to a third client device for the third user.

20. The method of claim 15, wherein the computer-executable instructions further cause the computer to: further comprising: in response to receiving membership data indicating that the third user is not a current member of the group, restricting the second client device of the second user from communicating the new vault key from the second client device to a third client device for the third user thereby restricting the third client device from accessing the secret data.

* * * * *